US010662274B2

(12) United States Patent
Kohl et al.

(10) Patent No.: US 10,662,274 B2
(45) Date of Patent: May 26, 2020

(54) SELF-IMMOLATIVE POLYMERS, ARTICLES THEREOF, AND METHODS OF MAKING AND USING SAME

(71) Applicant: Georgia Tech Research Corporation, Atlanta, GA (US)

(72) Inventors: Paul A. Kohl, Atlanta, GA (US); Oluwadamilola Phillips, Atlanta, GA (US); Jared Schwartz, Atlanta, GA (US); Gerald Gourdin, Columbus, OH (US); Anthony Engler, Atlanta, GA (US); Jisu Jiang, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 15/830,864

(22) Filed: Dec. 4, 2017

(65) Prior Publication Data

US 2018/0155483 A1 Jun. 7, 2018

Related U.S. Application Data

(60) Provisional application No. 62/429,440, filed on Dec. 2, 2016.

(51) Int. Cl.
*C08G 6/00* (2006.01)
*C08K 5/01* (2006.01)
(Continued)

(52) U.S. Cl.
CPC ............... *C08G 6/00* (2013.01); *B32B 27/08* (2013.01); *B32B 27/42* (2013.01); *C08G 2/20* (2013.01);
(Continued)

(58) Field of Classification Search
CPC .................................. C08G 2/20; C08G 6/00
(Continued)

(56) References Cited

U.S. PATENT DOCUMENTS

| 4,250,053 A | 2/1981 | Smith |
| 5,627,010 A | 5/1997 | Pai et al. |

(Continued)

FOREIGN PATENT DOCUMENTS

| WO | 2014169218 | 10/2014 |
| WO | 2016109532 | 7/2016 |
| WO | 2017046602 | 3/2017 |

OTHER PUBLICATIONS

Kaitz et al; Functional Phthaldehyde polymers by copolymerization with substituted benzaldehydes; Feb. 2013; Macromolecules; 46, 608-612. (Year: 2013).*

(Continued)

*Primary Examiner* — Duc Truong
(74) *Attorney, Agent, or Firm* — Meunier Carlin & Curfman LLC

(57) ABSTRACT

Self-immolative polymers and compositions comprising such polymers are described. The polymers are copolymers of phthalaldehyde and one or more additional aldehydes and can degrade/decompose upon exposure to a desired stimulus, like light, heat, sound, or chemical trigger. The copolymers can be linear or cyclic, and can be crosslinked or uncrosslinked. Polymer compositions, including multilayered and multiregioned compositions, containing the copolymers are disclosed. These compositions can contain agents such as crosslinking agents, crosslinking catalysts, photocatalysts, thermocatalyst, sensitizers, chemical amplifiers, freezing point depressing agent, photo-response delaying agents, and the like. Methods of making and using the copolymers are also described.

46 Claims, 12 Drawing Sheets

(51) Int. Cl.
*C08K 5/03* (2006.01)
*B32B 27/42* (2006.01)
*B32B 27/08* (2006.01)
*C08J 3/24* (2006.01)
*C08G 2/20* (2006.01)
*C08K 5/17* (2006.01)
*C08K 5/55* (2006.01)
*C08K 5/10* (2006.01)
*C08K 5/42* (2006.01)
*C08K 5/00* (2006.01)

(52) U.S. Cl.
CPC .............. *C08J 3/24* (2013.01); *C08K 5/01* (2013.01); *C08K 5/03* (2013.01); *C08K 5/10* (2013.01); *C08K 5/17* (2013.01); *C08K 5/42* (2013.01); *C08K 5/55* (2013.01); *B32B 2307/54* (2013.01); *B32B 2307/716* (2013.01); *C08J 2361/02* (2013.01); *C08K 5/0008* (2013.01); *C08K 5/0016* (2013.01); *C08K 5/0025* (2013.01)

(58) Field of Classification Search
USPC ........................................................ 528/230
See application file for complete search history.

(56) References Cited

U.S. PATENT DOCUMENTS

| | | |
|---|---|---|
| 6,004,724 A | 12/1999 | Yamato et al. |
| 6,165,890 A | 12/2000 | Kohl et al. |
| 6,849,384 B2 | 2/2005 | Iwasa et al. |
| 7,300,747 B2 | 11/2007 | Okazaki et al. |
| 7,393,627 B2 | 7/2008 | Ober et al. |
| 7,833,690 B2 | 11/2010 | Gonsalves et al. |
| 8,192,590 B1 | 6/2012 | Belfield et al. |
| 8,268,531 B2 | 9/2012 | Ober et al. |
| 8,329,771 B2 | 12/2012 | Shiraishi et al. |
| 8,685,616 B2 | 4/2014 | Gonsalves et al. |
| 8,821,965 B2 | 9/2014 | Kuemin et al. |
| 8,957,212 B2 | 2/2015 | Kuramoto et al. |
| 9,067,909 B2 | 6/2015 | Kaur et al. |
| 9,217,050 B2 | 12/2015 | Fornof et al. |
| 9,383,644 B2 | 7/2016 | Zhang et al. |
| 9,496,229 B2 | 11/2016 | Rogers et al. |
| 9,580,553 B2 | 2/2017 | Boydston et al. |
| 9,691,873 B2 | 6/2017 | Rogers et al. |
| 2014/0193752 A1 | 7/2014 | Brainard et al. |
| 2017/0123313 A1 | 5/2017 | Kaur et al. |

OTHER PUBLICATIONS

Ammann, C., et al., "A simple multinuclear NMR thermometer", J. Magn. Reson., 1982, 46, 319-321.
Aso, C., et al., "Polymerization of Aromatic Aldehydes. III. The Cyclopolymerization of Phthaldehyde and the Structure of the Polymer", Macromolecules, 1969, 3, 414-419.
Aso, C., et al., "Polymerization of aromatic aldehydes. II. Cationic cyclopolymerization of phthalaldehyde", J. Polym. Sci. Part A-1, 1969, 7, 497-511.
Cheng, H., et al., "Recent Development of Transient Electronics", Theor. Appl. Mech. Lett. 2016, 6 (1), 21-31.
Crivello J.V., et al., "Anthracene electron-transfer photosensitizers for onium salt induced cationic photopolymerizations", J. Photochem. Photobiol. A Chem., 2003, 159, 173-188.
Crivello J.V., et al., "Curcumin: A naturally occurring long-wavelength photosensitizer for diaryliodonium salts," J. Polym. Sci. Part A Polym. Chem., 2005, 43, 5217-5231.
Crivello, J.V.; et al., "Design and Synthesis of Photoacid Generating Systems", J. Photopolym. Sci. Technol., 2008, 21, 493-497.
Dainton, F. S., et al., "Reversibility of the Propagation Reaction in Polymerization Processes and its Manifestation in the Phenomenon of a 'Ceiling Temperature'", Nature, 1948, 162, 705-707.
Dainton, F. S., Ivin, K. J. "The kinetics of the photochemical gas-phase reactions between sulphur dioxide and n-butane and 1-butene respectively", Trans. Faraday Soc., 1950, 46, 374-382.
DiLauro, A. M., et al., "Self-Immolative Poly(4,5-dichloro phthalaldehyde) and its Applications in Multi-Stimuli-Responsive Macroscopic Plastics", Angew. Chemie Int. Ed., 2015, 54, 6200-6205.
Duda, A., et al., "Kinetics of the Ring-Opening Polymerization of 6-, 7-, 9-, 12-, 13-, 16-, and 17-Membered Lactones. Comparison of Chemical and Enzymatic Polymerizations", Macromolecules, 2002, 35, 4266-4270.
Freund, et al., "Synthesis and Anionic Polymerization of 2-Isopropenylquinoline", J. Polym. Bull., 1985, 14, 73-77.
Fu, K.K., et al., "Transient Electronics: Materials and Devices," Chem. Mater., 2016, 28(11), 3527-3539.
Gajewski, J. J., et al., "Equilibrium Constants between Boron Trifluoride Etherate and Carbonyl Compounds in Chloroform Solution", Org. Lett., 2000, 2, 2813-2815.
Hashimoto, K.; et al., Equilibrium Cyclotrimerization of N-Butyraldehyde. J. Polym. Sci., 1977, 15(7), 1609-1618.
Hernandez, H. L., et al., "Triggered Transience of Metastable Poly(phthalaldehyde) for Transient Electronics", Adv. Mater., 2014, 26 (45), 7637-7642.
Hua, et al., "Photodefinable Thermally Sacrificial Polycarbonate Materials and Methods for MEMS and Microfluidic Device Fabrication," ECS 2006, 3(10), 389-397.
Hwang, S. et al., "A Physically Transient Form of Silicon Electronics with Integrated Sensors, Actuators and Power Supply", Science, 2013, 337, 1640-1644.
Hwang, S., et al., "Biodegradable elastomers and silicon nanomembranes/nanoribbons for stretchable, transient electronics, and biosensors", Nano Lett., 2015, 15 (5), 2801-2808.
Hwang, S., et al., "Materials for Programmed, Functional Transformation in Transient Electronic Systems", Adv. Mater., 2015, 27 (1), 47-52.
Ito, H., et al., "Chemical amplification in the design of dry developing resist materials", Polym. Eng. Sci., 1983, 23, 1012-1018.
Jayachandran, J.P., et al., "Air-channel fabrication for microelectromechanical systems via sacrificial photosensitive polycarbonates," J. Microelectromechanical Syst., 2003, 12 (2), 147-159.
Kaitz J.A., et al., "Copolymerization of o-Phthalaldehyde and Ethyl Glyoxylate: Cyclic Macromolecules with Alternating Sequence and Tunable Thermal Properties," Macromolecules, 2014, 47, 5509-5513.
Kaitz, J. A., et al., "Dynamic Covalent Macrocyclic Poly(phthalaldehyde)s: Scrambling Cyclic Homopolymer Mixtures Produces Multi-Block and Random Cyclic Copolymers", Macromolecules, 2013, 46 (20), 8121-8128.
Kaitz, J.A., et al., "End Group Characterization of Poly(phthalaldehyde): Surprising Discovery of a Reversible, Cationic Macrocyclization Mechanism", J. Am. Chem. Soc., 2013, 135 (34), 12755-12761.
Kaitz, J. A., et al., "Functional Phthalaldehyde Polymers by Copolymerization with Substituted Benzaldehydes", Macromolecules, 2013, 46 (3), 608-612.
Kruger, et al., "Catalytic and Autocatalytic Mechanisms of Acid Amplifiers for Use in EUV Photoresists", Chem. Mater., 2010, 22 (19), 5609-5616.
Kubisa, P., et al., "Polymerization of Higher Aldehydes", Polymer (Guildf). 1980, 21 (12), 1433-1447.
Maria, P. C., et al., "A Lewis basicity scale for nonprotogenic solvents: enthalpies of complex formation with boron trifluoride in dichloromethane", J. Phys. Chem., 1985, 89, 1296-1304.
Martello, M. T., et al., "Bulk Ring-Opening Transesterification Polymerization of the Renewable δ-Decalactone Using an Organocatalyst", ACS Macro Lett., 2012, 1, 131-135.
McBride, R. A., et al., "Kinetics of Self-Immolative Degradation in a Linear Polymeric System: Demonstrating the Effect of Chain Length", Macromolecules 2013, 46 (13), 5157-5166.
McCormick, H. W., "Ceiling temperature of α-methylstyrene", J. Polym. Sci., 1957, 25, 488-490.

(56) References Cited

OTHER PUBLICATIONS

Monajemi, P., et al., "Characterization of a Polymer-Based MEMS Packaging Technique," in 2006 11th International Symposium on Advanced Packaging Materials: Processes, Properties and Interface, pp. 139-144.
Park, C.W., t al., "Thermally Triggered Degradation of Transient Electronic Devices," Adv. Mater., 2015, 3783-3788.
Peterson, G. I., et al., "Controlled Depolymerization: Stimuli-Responsive Self-Immolative Polymers", Macromolecules 2012, 45(18), 7317-7328.
Phillips, O., et al., "Phototriggerable Transient Electronics: Materials and Concepts," Proc.—Electron. Components Technol. Conf., 2017, pp. 772-779.
Phillips, S. T., et al., "Amplified Responses in Materials Using Linear Polymers That Depolymerize from End-to-End When Exposed to Specific Stimuli", J. Appl. Polym. Sci., 2014, 131 (19), 40992.
Sagi, A., et al., "Self-Immolative Polymers", J. Am. Chem. Soc., 2008, 130 (16), 5434-5435.
Saha, R., et al., "Packaging-compatible wafer level capping of MEMS devices," Microelectron. Eng., 2013, 104, 75-84.
Schneiderman, D. K., et al., "Aliphatic Polyester Block Polymer Design", Macromolecules, 2016, 49, 2419-2428.
Schwartz, J. M., et al., "Determination of Ceiling Temperature and Thermodynamic Properties of Low Ceiling Temperature Polyaldehydes", J. Polym. Sci. Part A Polym. Chem., 2017, 221-228.
Schwartz, J.M., et al. "Stable High Molecular-Weight Poly(phthalaldehyde)", J. Polym. Sci. Part A Poly. Chem. 2016, 55, 1166-1172.
Strahan, J. R. Advanced Organic Materials for Lithographic Applications, University of Texas at Austin, 2010, 270 pages, Dissertation.
Sun, et al., "Bicyclic guanidinium tetraphenylborate: A photobase generator and a photocatalyst for living anionic ring-opening polymerization and cross-linking of polymeric materials containing ester and hydroxy groups," J. Am. Chem. Soc., 2008, 130, 8130-8131.
Sun, X.; et al., "Development of Tetraphenylborate-based Photobase Generators and Sacrificial Polycarbonates for Radiation Curing and Photoresist Applications", Carleton University, 2008, 221 pages, Dissertation.
Tubert-Brohman, et al., "Improved Docking of Polypeptides with Glide", J. Chem. Inf. Model., 2013, 53(10), 1689-1699.
Uzunlar, E., et al., "Decomposable and Template Polymers: Fundamentals and Applications", J. Electron. Packag., 2016, 138 (2), 20802.
Uzunlar, et al., "Size-Compatible, Polymer-Based Air-Gap Formation Processes, and Polymer Residue Analysis for Wafer-Level MEMS Packaging Applications", J. Electron. Packag., 2015, 137, 41001.
Vogl, O. "Addition Polymers of Aldehydes", J. Polym. Sci. Part A Polym. Chem. 2000, 38 (13), 2293-2299.
Vogl, O. "Polymerization of Higher Adlehydes. IV. Crystalline Isotactic Polyaldehydes: Anionic and Cationic Polymerization", J. Polym. Sci. Part A Polym. Chem. 1964, 2, 4607-4620.
Vogl, O.; Bryant, W. Polymerization of Higher Aldehydes. VI. Mechanism of Aldehyde Polymerization. J. Polym. Sci. Part A Poly. Chem. 1964, 2, 4633-4645.
Wallraff, et al., "Chemically Amplified Photoresist for Visible Laser Direct Imaging," J. Imag. Sci. Technol., 1992, 36, 468-467.
Wang, W., et al., "Self-Immolative Polymers", Angew. Chemie—Int. Ed., 2008, 47 (41), 7804-7806.
Wong, A. D., et al., "Multiresponsive Azobenzene End-Cap for Self-Immolative Polymers", ACS Macro Lett., 2014, 3, 1191-1195.
Wu, X.; et al. "Fabrication of Microchannels using Polynorbornene Photosensitive Sacrificial Materials", J. Electrochem. Soc. 2003, 150(9):H205-H213.
Yin, L., et al., "Materials and Fabrication Sequences for Water Soluble Silicon Integrated Circuits at the 90 Nm Node", Appl. Phys. Lett. 2015, 106 (1), 14105.
Yin, L., et al., "Mechanisms for Hydrolysis of Silicon Nanomembranes as Used in Bioresorbable Electronics", Adv. Mater. 2015, 27 (11), 1857-1864.
Zhu, C., et al., "Photoreconfigurable Polymers for Biomedical Applications: Chemistry and Macromolecular Engineering", Biomacromolecules 2014, 15, 3474-3494.

\* cited by examiner

SELF-IMMOLATIVE POLYMERS, ARTICLES THEREOF, AND METHODS OF MAKING AND USING SAME

CROSS REFERENCE TO RELATED APPLICATIONS

This application claims the benefit of priority to U.S. Provisional Application No. 62/429,440, filed Dec. 2, 2016, which is incorporated by reference herein in its entirety.

STATEMENT REGARDING FEDERALLY FUNDED RESEARCH

This invention was made with government support under grant number W31P4Q-14-C-0118 awarded by the Defense Advanced Research Projects Agency. The government has certain rights in the invention.

BACKGROUND

Self-immolative polymers are polymers that irreversibly disassemble into one or more compounds spontaneously or when triggered by a specific external stimulus or catalyst. Self-immolative polymers that decompose or depolymerize into small molecules or revert back to their monomer units can be used in applications such as time-release drug delivery, dry developing photoresists in the manufacture of integrated circuits or other similar devices, decomposable plastic items, or transient electronics. Self-immolative polymers are also sometimes referred to as sacrificial polymers. The transient nature of the device eliminates the concern of filling land-fills with long-lived garbage. Also, the transient nature of the device can be of high-value when recovery or detection of the device is not desired or possible. Devices which decompose by themselves or when triggered by an external stimulus prevent detection recovery and reverse engineering by competitors or hostile agents.

U.S. Pat. No. 9,496,229 discloses materials for transient electronic devices. The destruction or partial destruction of inorganic or hybrid inorganic/organic substrates is achieved by transforming the material into an inoperable state. Inorganic metals and semiconductors can be rendered inoperable by changing their oxidation state (i.e., oxidizing them) or dissolving them so that the solid-state properties are disrupted when the material is dissolved. U.S. Pat. No. 6,165,890 teaches that polymeric materials, such as poly(propylene carbonate) (PPC) can be transformed into gaseous products producing enclosed air cavities. The small molecule products produced upon polymer degradation can permeate through a wide variety of encapsulants. Both these patents describe inorganic and organic materials that are triggered into decomposition by chemical, thermal, or photo-triggers. However, the stimulus is applied to the whole material such that the structure is decomposed part-by-part or molecule-by-molecule. In the case of PPC, the temperature of the polymer must be raised to a value where the trigger or catalyst is effective—where the PPC is suitably energized so that once decomposition in initiated, complete disposal of the polymer can occur. In the case of inorganic materials, such as metals or semiconductors, enough reactant and energy of activation must be provided so that at least partial decomposition of the material is achieved, such as at least 20%. While these materials and methods of destruction may render a device inactive, they require a considerable amount of reactant be provided so that each layer or molecule of the device is treated or activated. In addition, the thermal activation must be at a minimum temperature, often over 100° C., for an extended period of time so that each chemical bond that needs to be broken has an opportunity to react. The time delay is sometimes an advantage as in the case of the slow release of gas from a buried air-cavity where excessive pressure build up would destroy the delicate overcoat structure as described in: Wu, X.; et al. Fabrication of Microchannels using Polynorbornene Photosensitive Sacrificial Materials. *J. Electrochem. Soc.* 2003, 150(9):H205-H213. In addition to the above mentioned problems, transient materials which require a large quantity of reactant or high temperatures or other excessive triggering conditions are not fail-safe. That is, if the reactant is depleted or the accelerating condition is inadequate, the transience process will terminate leaving the device vulnerable to capture, reverse-engineering, or simply defeat the intended transient purpose.

Thermodynamically unstable polymers have emerged in applications where a catalytic response to a small trigger is adequate to initiate the decomposition of a large quantity of material resulting in essentially full destruction. Low ceiling temperature polymers, which have a ceiling temperature ($T_c$) below, e.g., ambient, are especially valuable. $T_c$ is the temperature where below it, the polymer state is favored and above $T_c$ the monomer or depolymerized state is favored. Low $T_c$ materials can be stable at temperatures above $T_c$ if they are kinetically trapped in the polymer state. Kinetic trapping means that the mechanism of decomposition or depolymerization is slow, or essentially zero, unless catalyzed. When $T_c$ is below the ambient temperature, only a single bond in a long polymer chain may be to be broken to overcome the kinetic trapping. This may lead to fail-safe decomposition of the device because the material is thermodynamically unstable at the target ambient temperature. It may also lead to vanishingly small amounts of a trigger, whether it is a chemical, thermal, photoactivated or other trigger.

While low $T_c$ polymers are of interest, they can be difficult to control due to short shelf-life. In addition, it is difficult to synthesize nonphthalaldehyde-based copolymers and only aryl or ester copolymers of phthalaldehyde have been made (Kaitz et al., *Macromolecules*, 2014, 47:5509-5513). However, the ceiling temperature of glyoxylate-based polymers is too high; the molecular weight of the polymers is very low (less than 19.7 kDa); the rate of depolymerization is very slow, and the vapor pressure for some of the products is not adequate. There is also a lack of suitable triggering mechanisms, especially at low temperatures, such as e.g. 0° C., even though this may be above $T_c$.

What are thus needed are self-immolative polymers that have suitable mechanical properties and yet degrade/decompose completely upon exposure to a desired stimulus. Methods of making such polymers and articles comprising such polymers are also needed. The compositions, articles, and methods disclosed herein address these and other needs.

SUMMARY

Disclosed herein are compounds, compositions, methods for making and using such compounds and compositions. In further aspects, disclosed herein are self-immolative polymers and compositions comprising such polymers. The disclosed polymers can degrade/decompose upon exposure to a desired stimulus, like light, heat, sound, or chemical trigger. In specific aspects, disclosed herein are copolymers comprising a repeating unit as shown in Formula I:

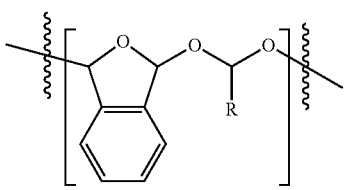

Formula I wherein R is substituted or unsubstituted $C_1$-$C_{20}$ alkyl, $C_1$-$C_{20}$ alkoxyl, $C_2$-$C_{20}$ alkenyl, $C_2$-$C_{20}$ alkynyl, $C_6$-$C_{10}$ heteroaryl, $C_3$-$C_{10}$ cycloalkyl, $C_3$-$C_{10}$ cycloalkenyl, $C_3$-$C_{10}$ heterocycloalkyl, or $C_3$-$C_{10}$ heterocycloalkenyl; and, when substituted, R is substituted with $C_1$-$C_{20}$ alkyl, $C_1$-$C_{20}$ alkoxy, $C_2$-$C_{20}$ alkenyl, $C_2$-$C_{20}$ alkynyl, $C_6$-$C_{10}$ aryl, $C_6$-$C_{10}$ heteroaryl, aldehyde, amino, sulfonic acid, sulfinic acid, fluoroacid, phosphonic acid, ether, halide, hydroxy, ketone, nitro, cyano, azido, silyl, sulfonyl, sulfinyl, or thiol. The disclosed copolymers can be linear or cyclic. The disclosed copolymers can be crosslinked or uncrosslinked.

In further aspects, disclosed herein are compositions and devices that comprise the disclosed copolymers. These compositions or devices can comprise additional agents that can alter the physical, chemical, mechanical and/or degradation properties of the copolymers. Examples of such agents disclosed herein are crosslinking agents, crosslinking catalysts, photocatalysts, thermocatalyst, sensitizers, chemical amplifiers, freezing point depressing agent, photo-response delaying agents, and the like.

In still further aspects, disclosed herein are methods of making self-immolative polymers that comprise contacting a phthalaldehyde and one or more additional aldehydes in the presence of a solvent and Lewis acid base. Methods of crosslinking such polymers are also disclosed.

In yet further aspects, disclosed herein are multilayer structures comprising the polymers disclosed herein. Also, disclosed are compositions having multiple regions, or gradients, where one region of portion of the composition has a different composition than another. Devices made from such multilayer or multiregioned structures are also disclosed.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the invention.

DETAILED DESCRIPTION

Figure 1:
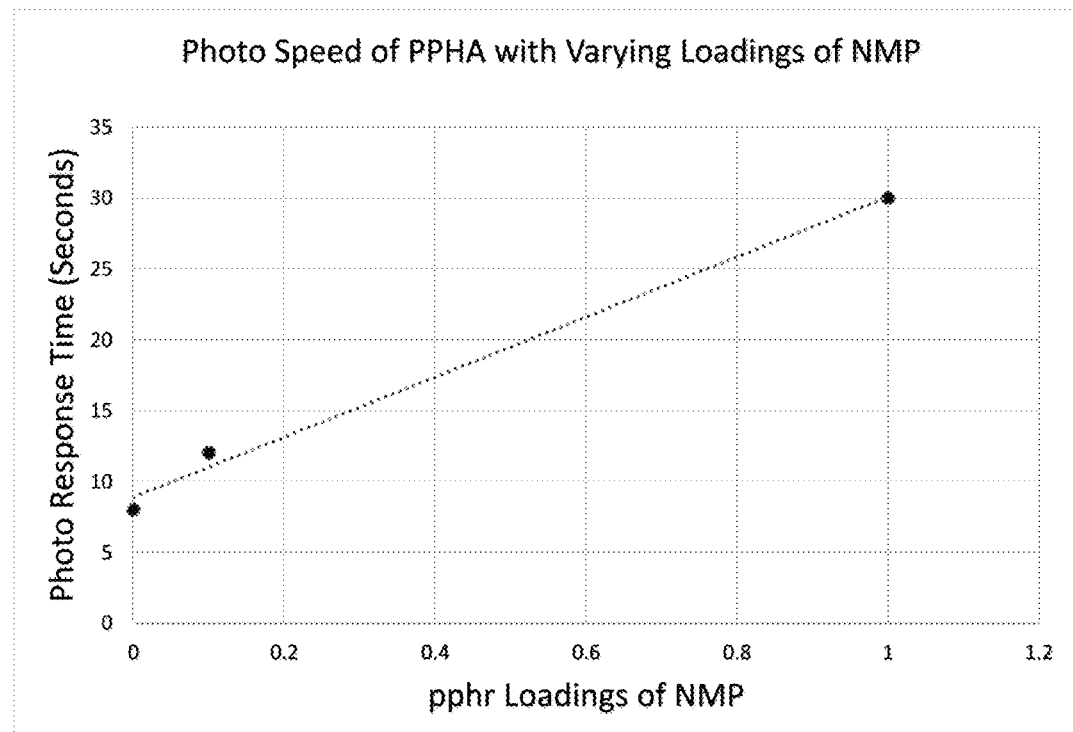
FIG. 1 is a graph showing the effects of the amount of NMP on photo response time.

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

General Definitions

In this specification and in the claims that follow, reference will be made to a number of terms, which shall be defined to have the following meanings:

Throughout the specification and claims the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the polymer" includes mixtures of two or more such polymers, and the like.

"Optional" or "optionally" means that the subsequently described event or circumstance can or cannot occur, and that the description includes instances where the event or circumstance occurs and instances where it does not.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used. Further, ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. Unless stated otherwise, the term "about" means within 5% (e.g., within 2% or 1%) of the particular value modified by the term "about."

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Chemical Definitions

As used herein, the term "composition" is intended to encompass a product comprising the specified ingredients in the specified amounts, as well as any product which results, directly or indirectly, from combination of the specified ingredients in the specified amounts.

References in the specification and concluding claims to parts by weight of a particular element or component in a composition denotes the weight relationship between the element or component and any other elements or components in the composition or article for which a part by weight is expressed. Thus, in a mixture containing 2 parts by weight of component X and 5 parts by weight component Y, X and Y are present at a weight ratio of 2:5, and are present in such ratio regardless of whether additional components are contained in the mixture.

A weight percent (wt. %) of a component, unless specifically stated to the contrary, is based on the total weight of the formulation or composition in which the component is included.

A mole percent (mol %) of a component, unless specifically stated to the contrary, is based on the total number of moles of each unit of the formulation or composition in which the component is included.

As used herein, "molecular weight" refers to number-average molecular weight which is sometimes measured by $^1$H NMR spectroscopy or other analytical methods, unless clearly indicated otherwise.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

The term "monomer" as used herein refers to one of the constituent units used to synthesize a polymer.

The term "photocatalyst" as used herein refers a molecule, ion, complex, or other chemical unit capable of catalyzing a reaction where the photocatalyst is formed by the absorption of electromagnetic radiation, whether the electromagnetic radiation is absorbed directly by that molecule or another with energy transfer between the two.

The term "thermocatalyst" as used herein refers a molecule, ion, complex, or other chemical unit capable of catalyzing a reaction where the thermocatalyst is formed by the application of heat.

The term "sensitizer" as used herein refers a molecule, ion, complex, or other chemical unit which can absorb energy, such as electromagnetic radiation, and transfer that energy to another chemical unit, such as a photocatalyst or thermocatalyst.

The term "ionic liquid" as used herein refers a molecule (a salt) which is in the form of a liquid at temperatures below 100° C., where at least part of the liquid is in the form of ions.

The term "chemical amplifier" as used herein refers a molecule, ion, complex, or other chemical unit capable of generating one or more of a particular species when activated by a similar species.

The term "acid amplifier" as used herein refers a molecule, ion, complex, or other chemical unit capable of generating one or more Lewis or Bronsted acids when activated by a Lewis or Bronsted acid.

The term "crosslinking catalyst" as used herein refers a molecule, ion, complex, or other chemical unit capable of catalyzing the chemical reaction between two moieties of the polymer resulting in linking two parts of the same polymer chain or two different chemical chains.

The term "crosslinking agent" as used herein refers a molecule, ion or other chemical unit capable of forming a chemical unit linking two parts of the same polymer chain or two different chemical chains.

The term "aliphatic" as used herein refers to a non-aromatic hydrocarbon group and includes branched and unbranched, alkyl, alkenyl, or alkynyl groups.

The term "alkyl" as used herein is a branched or unbranched saturated hydrocarbon group of 1 to 20 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The alkyl group can be substituted with one or more groups including, but not limited to, alkyl, alkoxy, alkenyl, alkynyl, aryl, heteroaryl, aldehyde, amino, carboxylic acid, sulfonic acid, sulfinic acid, fluoroacid, phosphonic acid, ester, ether, halide, hydroxy, ketone, nitro, cyano, azido, silyl, sulfonyl, sulfinyl, or thiol, as described below.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "heteroalkyl" as used herein is a branched or unbranched saturated hydrocarbon group of 1-20 carbon atoms where one or more of the carbon atoms and its attached hydrogen atoms, if any, have been replaced by an O, S, N, or NH. The heteroalkyl group can be substituted with one or more groups including, but not limited to, alkyl, alkoxy, alkenyl, alkynyl, aryl, heteroaryl, aldehyde, amino, carboxylic acid, sulfonic acid, sulfinic acid, fluoroacid, phosphonic acid, ester, ether, halide, hydroxy, ketone, nitro, cyano, azido, silyl, sulfonyl, sulfinyl, or thiol, as described below.

The symbols $A^n$ is used herein as merely a generic substituent in the definitions below.

The term "alkoxy" as used herein is an alkyl group bound through a single, terminal ether linkage; that is, an "alkoxy" group can be defined as $-OA^1$ where $A^1$ is alkyl as defined above.

The term "alkenyl" as used herein is a branched or unbranched hydrocarbon group of from 2 to 20 carbon atoms with a structural formula containing at least one carbon-carbon double bond. Asymmetric structures such as $(A^1A^2)C=C(A^3A^4)$ are intended to include both the E and Z isomers. This may be presumed in structural formulae herein wherein an asymmetric alkene is present, or it may be explicitly indicated by the bond symbol C=C. Non-limiting examples of alkenyl include ethenyl (vinyl), 1-propenyl, 2-propenyl (allyl), iso-propenyl, 2-methyl-1-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl, 5-hexenyl, 1-heptenyl, 2-heptenyl, 3-heptenyl, 4-heptenyl, 5-heptenyl, 6-heptenyl, 1-octenyl, 2-octenyl, 3-octenyl, 4-octenyl, 5-octenyl, 6-octenyl, 7-octenyl, 1-nonenyl, 2-nonenyl, 3-nonenyl, 4-nonenyl, 5-nonenyl, 6-nonenyl, 7-nonenyl, 8-nonenyl, 1-decenyl, 2-decenyl, 3-decenyl, 4-decenyl, 5-decenyl, 6-decenyl, 7-decenyl, 8-decenyl, 9-decenyl, 1-undecenyl, 2-undecenyl, 3-undecenyl, 4-undecenyl, 5-undecenyl, 6-undecenyl, 7-undecenyl, 8-undecenyl, 9-undecenyl, 10-undecenyl, 1-dodecenyl, 2-dodecenyl, 3-dodecenyl, 4-dodecenyl, 5-dodecenyl, 6-dodecenyl, 7-dodecenyl, 8-dodecenyl, 9-dodecenyl, 10-dodecenyl, and 11-dodecenyl. The alkenyl group can be substituted with one or more groups including, but not limited to, alkyl, alkoxy, alkenyl, alkynyl, aryl, heteroaryl, aldehyde, amino, carboxylic acid, sulfonic acid, sulfinic acid, fluoroacid, phosphonic acid, ester, ether, halide, hydroxy, ketone, nitro, cyano, azido, silyl, sulfonyl, sulfinyl, or thiol, as described below.

The term "alkynyl" as used herein is a branched or unbranched hydrocarbon group of 2 to 20 carbon atoms with a structural formula containing at least one carbon-carbon triple bond. Non-limiting examples of $C_2$-$C_{12}$ alkenyl include ethynyl, propynyl, butynyl, pentynyl and the like. The alkynyl group can be substituted with one or more groups including, but not limited to, alkyl, alkoxy, alkenyl, alkynyl, aryl, heteroaryl, aldehyde, amino, carboxylic acid, sulfonic acid, sulfinic acid, fluoroacid, phosphonic acid, ester, ether, halide, hydroxy, ketone, nitro, cyano, azido, silyl, sulfonyl, sulfinyl, or thiol, as described below.

The term "aryl" as used herein is a group that contains any carbon-based aromatic group having 6-10 carbon atoms and including, but not limited to, benzene, naphthalene, phenyl, biphenyl, phenoxybenzene, aceanthrylene, acenaphthylene, acephenanthrylene, anthracene, azulene, chrysene, fluoranthene, fluorene, as-indacene, s-indacene, indane, indene, phenalene, phenanthrene, pleiadene, pyrene, and triphenylene, and the like. The term "heteroaryl" is defined as a group that contains an aromatic group with 6-10 carbon atoms that has at least one heteroatom incorporated within the ring of the aromatic group. Examples of heteroatoms include, but are not limited to, nitrogen, oxygen, sulfur, and phosphorus. Examples of heteroaryls include, but are not limited to, azepinyl, acridinyl, benzimidazolyl, benzothiazolyl, benzindolyl, benzodioxolyl, benzofuranyl, benzooxazolyl, benzothiazolyl, benzothiadiazolyl, benzo[b][1,4]dioxepinyl, 1,4-benzodioxanyl, benzonaphthofuranyl, benzoxazolyl, benzodioxolyl, benzodioxinyl, benzopyranyl, benzopyranonyl, benzofuranyl, benzofuranonyl, benzothienyl (benzothiophenyl), benzotriazolyl, benzo[4,6]imidazo[1,2-a]pyridinyl, carbazolyl, cinnolinyl, dibenzofuranyl, dibenzothiophenyl, furanyl, furanonyl, isothiazolyl, imidazolyl, indazolyl, indolyl, indazolyl, isoindolyl, indolinyl, isoindolinyl, isoquinolyl, indolizinyl, isoxazolyl, naphthyridinyl, oxadiazolyl, 2-oxoazepinyl, oxazolyl, oxiranyl, 1-oxidopyridinyl, 1-oxidopyrimidinyl, 1-oxidopyrazinyl, 1-oxidopyridazinyl, 1-phenyl-1H-pyrrolyl, phenazinyl, phenothiazinyl, phenoxazinyl, phthalazinyl, pteridinyl, purinyl, pyrrolyl, pyrazolyl, pyridinyl, pyrazinyl, pyrimidinyl, pyridazinyl, quinazolinyl, quinoxalinyl, quinolinyl, quinuclidinyl, isoquinolinyl, tetrahydroquinolinyl, thiazolyl, thiadiazolyl, triazolyl, tetrazolyl, triazinyl, and thiophenyl (i.e. thienyl). The term "non-heteroaryl," which is included in the term "aryl," defines a group that contains an aromatic group that does not contain a heteroatom. The aryl and heteroaryl group can be substituted or unsubstituted. The aryl and heteroaryl group can be substituted with one or more groups including, but not limited to, alkyl, alkoxy, alkenyl, alkynyl, aryl, heteroaryl, aldehyde, amino, carboxylic acid, sulfonic acid, sulfinic acid, fluoroacid, phosphonic acid, ester, ether, halide, hydroxy, ketone, nitro, cyano, azido, silyl, sulfonyl, sulfinyl, or thiol, as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of 3-10 carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, aldehyde, amino, carboxylic acid, sulfonic acid, sulfinic acid, fluoroacid, phosphonic acid, ester, ether, halide, hydroxy, ketone, nitro, cyano, azido, silyl, sulfonyl, sulfinyl, or thiol, as described herein.

The term "heterocycloalkyl" is a type of cycloalkyl group as defined above where at least one of the carbon atoms and its attached hydrogen atoms, if any, are replaced by O, S, N, or NH. The heterocycloalkyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, sulfonic acid, sulfinic acid, fluoroacid, phosphonic acid, ester, ether, halide, hydroxy, ketone, nitro, cyano, azido, silyl, sulfonyl, sulfinyl, or thiol, as described herein.

The term "cycloalkenyl" as used herein is a non-aromatic carbon-based ring composed of 3-10 carbon atoms and containing at least one double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, and the like.

The term "heterocycloalkenyl" is a type of cycloalkenyl group as defined above where at least one of the carbon atoms of the ring is substituted with O, S, N, or NH. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, aldehyde, amino, carboxylic acid, sulfonic acid, sulfinic acid, fluoroacid, phosphonic acid, ester, ether, halide, hydroxy, ketone, nitro, cyano, azido, silyl, sulfonyl, sulfinyl, or thiol, as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "aldehyde" as used herein is represented by the formula —C(O)H. Throughout this specification "C(O)" is a short hand notation for C=O, which is also referred to as a carbonyl.

The terms "amine" or "amino" as used herein are represented by the formula $NA^1A^2A^3$, where $A^1$, $A^2$, and $A^3$ can be, independently, hydrogen, an alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH. A "carboxylate" as used herein is represented by the formula —C(O)O—. The term "ester" as used herein is represented by the formula —OC(O)$A^1$ or —C(O)O$A^1$, where $A^1$ can be an alkyl, alkenyl, alkynyl, aryl, heteroaryl, cycloalkyl, cycloalkenyl, heterocycloalkyl, or heterocycloalkenyl group described above.

The term "ether" as used herein is represented by the formula $A^1OA^2$, where $A^1$ and $A^2$ can be, independently, an alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $A^1C(O)A^2$, where $A^1$ and $A^2$ can be, independently, an alkyl, halogenated alkyl, alkenyl, alkynyl, aryl, heteroaryl, cycloalkyl, cycloalkenyl, heterocycloalkyl, or heterocycloalkenyl group described above.

The term "halide" as used herein refers to the halogens fluorine, chlorine, bromine, and iodine.

The term "hydroxyl" as used herein is represented by the formula —OH.

The term "nitro" as used herein is represented by the formula —$NO_2$.

The term "cyano" as used herein is represented by the formula —CN

The term "azido" as used herein is represented by the formula —$N_3$.

The term "sulfonyl" is used herein to refer to the sulfo-oxo group represented by the formula —$S(O)_2A^1$, where $A^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term "sulfinyl" is used herein to refer to the sulfo-oxo group represented by the formula —$S(O)A^1$, where $A^1$ can be hydrogen, an alkyl, halogenated alkyl, alkenyl, alkynyl, aryl, heteroaryl, cycloalkyl, cycloalkenyl, heterocycloalkyl, or heterocycloalkenyl group described above.

The term sulfinic acid" as used herein is represented by the formula —S(O)OH.

The term "sulfonic acid" as used herein is represented by the formula —S(O)$_2$OH.

The term "phosphonic acid" as used herein is represented by the formula —P(O)(OH)$_2$.

The term "thiol" as used herein is represented by the formula —SH.

The term "copolymer" is used herein to refer to a macromolecule prepared by polymerizing two or more different monomers. The copolymer can be a random, block, or graph copolymer.

The term "quaternary ammonium" as used herein is represented by the formula NA$_4^+$ where A can be hydrogen or hydrocarbons.

The term "sulfonium" as used herein is represented by the formula SA$_3^+$ where A can be hydrogen or hydrocarbons.

It is to be understood that the compounds provided herein may contain chiral centers. Such chiral centers may be of either the (R—) or (S—) configuration. The compounds provided herein may either be enantiomerically pure, or be diastereomeric or enantiomeric mixtures. It is to be understood that the chiral centers of the compounds provided herein may undergo epimerization in vivo. As such, one of skill in the art will recognize that administration of a compound in its (R—) form is equivalent, for compounds that undergo epimerization in vivo, to administration of the compound in its (S—) form.

As used herein, substantially pure means sufficiently homogeneous to appear free of readily detectable impurities as determined by standard methods of analysis, such as thin layer chromatography (TLC), nuclear magnetic resonance (NMR), gel electrophoresis, high performance liquid chromatography (HPLC) and mass spectrometry (MS), gas-chromatography mass spectrometry (GC-MS), and similar, used by those of skill in the art to assess such purity, or sufficiently pure such that further purification would not detectably alter the physical and chemical properties, such as enzymatic and biological activities, of the substance. Both traditional and modern methods for purification of the compounds to produce substantially chemically pure compounds are known to those of skill in the art. A substantially chemically pure compound may, however, be a mixture of stereoisomers.

Unless stated to the contrary, a formula with chemical bonds shown only as solid lines and not as wedges or dashed lines contemplates each possible isomer, e.g., each enantiomer, diastereomer, and meso compound, and a mixture of isomers, such as a racemic or scalemic mixture.

As used herein, the symbol

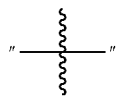

(hereinafter can be referred to as "a point of attachment bond") denotes a bond that is a point of attachment between two chemical entities, one of which is depicted as being attached to the point of attachment bond and the other of which is not depicted as being attached to the point of attachment bond. For example,

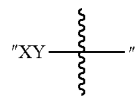

indicates that the chemical entity "XY" is bonded to another chemical entity via the point of attachment bond. Furthermore, the specific point of attachment to the non-depicted chemical entity can be specified by inference. For example, the compound CH$_3$-A$^1$, wherein A$^1$ is H or

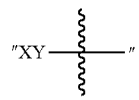

infers that when A$^1$ is "XY", the point of attachment bond is the same bond as the bond by which A$^1$ is depicted as being bonded to CH$_3$.

Reference will now be made in detail to specific aspects of the disclosed materials, compounds, compositions, articles, and methods, examples of which are illustrated in the accompanying Examples.

Polyaldehyde Copolymers

Polymers with a low ceiling temperature are of value in components where the planned depolymerization of the polymer is desirable. Exemplary devices include polymer-based components and enclosures for electronic sensors, unmanned aircraft, and parachutes. Other applications include drug delivery, dry developing photoresists, transient electronics, and recyclable plastics. In each of these devices or applications, it may be desirable to have the polymer disappear through depolymerization and evaporation of the volatile monomer, or simply have the monomer liquid flow harmlessly into the ground. The disappearance of the polymer device avoids disposal in a landfill or avoids detection of even the presence of the device. Depolymerization can be triggered by thermal, chemical, photo, or acoustic events. Polymers where decomposition is a planned event are sometimes called sacrificial polymers.

Polyaldehydes have been shown to have a low ceiling temperature and can be synthesized with a high molecular weight (Schwartz, J. M.; et al., Determination of ceiling temperature and thermodynamic properties of low ceiling temperature polyaldehydes. *J. Polym. Sci. Part A: Polym. Chem.* 2017, doi:10.1002/pola.28888). However, in order to be useful in specific applications requiring mechanical strength or toughness, the physical properties of the polyaldehyde polymer need to be improved. Poly(phthalaldehyde) has a low ceiling temperature of about −40° C., above which the polymer can rapidly depolymerize back to monomer; however, it has only modest elastic modulus and toughness. One measure of the toughness is the elongation-to-break, which can be measured by stretching it and recording the percent elongation at brittle fracture.

Selecting aldehyde monomers with high vapor pressure at the desired transience temperature, which can also be kinetically trapped as polymers with suitable mechanical properties until triggered (above T$_c$), is challenging. Aliphatic aldehydes have a tendency to form highly crystalline polymers that become insoluble in common organic solvents (Strahan, J. R. Advanced Organic Materials for Lithographic Applications, University of Texas at Austin, 2010; Vogl, O., Polymerization of Higher Adlehydes, IV. Crystalline Isotactic Polyaldehydes: Anionic and Cationic Polymerization.

J. Polym. Sci. Part A Polym. Chem. 1964, 2:4607-4620). This insolubility can cause growing chains to precipitate out of solution during polymerization before being kinetically stabilized, especially at high molecular weights. Further, solvent insolubility prevents solvent casting the polymer into its functional shapes. Monomers that form an amorphous polymer, which remain solvent soluble, tend to have low vapor pressure (Id.). Low vapor pressure limits the applications of the transient polymer to situations that allow long times for transience. One approach to avoiding polymer crystallization and long monomer evaporation time is to use copolymers with one monomer that forms amorphous polymers and another that has high vapor pressure. The crystallinity of the polymer can be disrupted by a larger monomer increasing solubility and maintaining moderate vapor pressure at the transient temperature.

High molecular weight polyaldehydes have not been achieved through anionic polymerization of aliphatic aldehydes (Vogl, O.; Bryant, W. Polymerization of Higher Aldehydes. VI. Mechanism of Aldehyde Polymerization. J. Polym. Sci. Part A Poly. Chem. 1964, 2:4633-4645). The acidic α-protons of the aldehyde inhibits chain propagation and acts as a chain transfer agent, creating a new initiation site for polymer propagation (Id.). This interruption of a growing chain causes the molecular weights to be relatively low and creates high dispersity. On the other hand, a cationic growth mechanism is capable of achieving high molecular weight polyaldehydes.

The challenges of preparing and utilizing polyaldehydes are addressed herein, resulting in various self-immolative polyaldehyde copolymers that have sufficient strength and toughness for a variety of applications, and that can be triggered to decompose with a variety of stimuli. Specifically, disclosed herein are cyclic copolymers of phthalaldehyde (PHA) and one or more different aldehyde monomers. The second (and further) monomer(s) can be used to improve the evaporation rate of the depolymerized polymer or used to carry out cross-linking of the polymer, thus changing its mechanical properties. The second (and further) monomer(s) can also be used to depress the freezing point of the decomposed materials, or to delay the depolymerization rate. In specific aspects, the disclosed copolymers comprises monomers of phthalaldehyde and one or more different aldehyde monomers, with substantially no other types of monomer residues besides aldehydes, e.g., there is less than 5 mol %, less than 4 mol %, less than 3 mol %, less than 2 mol %, less than 1 mol %, less than 0.5 mol %, or 0 mol % of monomer residues in the copolymer other than phthalaldehyde and the other aldehyde monomer(s). Of course, compositions can be prepared with the disclosed copolymers and the compositions can comprise additional materials and agents to modify the composition as disclosed herein.

In certain aspects, the disclosed copolymers can have a repeating unit as shown in Formula I:

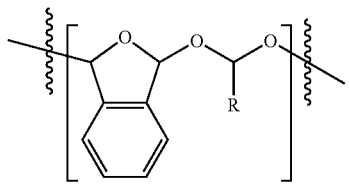

Formula I wherein R can be substituted or unsubstituted $C_1$-$C_{20}$ alkyl, $C_1$-$C_{20}$ alkoxyl, $C_2$-$C_{20}$ alkenyl, $C_2$-$C_{20}$ alkynyl, $C_6$-$C_{10}$ heteroaryl, $C_3$-$C_{10}$ cycloalkyl, $C_3$-$C_{10}$ cycloalkenyl, $C_3$-$C_{10}$ heterocycloalkyl, or $C_3$-$C_{10}$ heterocycloalkenyl; and, when substituted, R can be substituted with $C_1$-$C_{20}$ alkyl, $C_1$-$C_{20}$ alkoxy, $C_2$-$C_{20}$ alkenyl, $C_2$-$C_{20}$ alkynyl, $C_6$-$C_{10}$ aryl, $C_6$-$C_{10}$ heteroaryl, aldehyde, amino, sulfonic acid, sulfinic acid, fluoroacid, phosphonic acid, ether, halide, hydroxy, ketone, nitro, cyano, azido, silyl, sulfonyl, sulfinyl, or thiol. The indicated repeating unit can be present in the disclosed polymers from 1 to 100,000 times.

In some examples, the disclosed copolymers are linear or branched copolymers. In other examples, the copolymers disclosed herein can have a cyclic structure. That is, the copolymers contain substantially no reactive end groups on the polymer backbone. The lack of aldehyde end groups can be confirmed by $^1$H-NMR analysis of low-molecular weight polyaldehydes that reveal only the chemical shifts associated with the aldehyde backbone. Thus, when cyclic, the disclosed copolymers can be represented by Formula II:

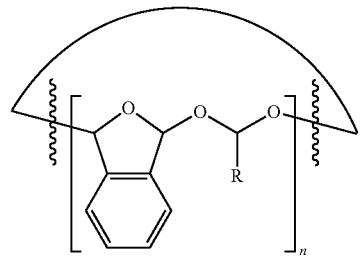

Formula II wherein n can be an integer from 1 to 100,000; R is substituted or unsubstituted $C_1$-$C_{20}$ alkyl, $C_1$-$C_{20}$ alkoxyl, $C_2$-$C_{20}$ alkenyl, $C_2$-$C_{20}$ alkynyl, $C_6$-$C_{10}$ heteroaryl, $C_3$-$C_{10}$ cycloalkyl, $C_3$-$C_{10}$ cycloalkenyl, $C_3$-$C_{10}$ heterocycloalkyl, or $C_3$-$C_{10}$ heterocycloalkenyl; and, when substituted, R can be substituted with $C_1$-$C_{20}$ alkyl, $C_1$-$C_{20}$ alkoxy, $C_2$-$C_{20}$ alkenyl, $C_2$-$C_{20}$ alkynyl, $C_6$-$C_{10}$ aryl, $C_6$-$C_{10}$ heteroaryl, aldehyde, amino, sulfonic acid, sulfinic acid, fluoroacid, phosphonic acid, ether, halide, hydroxy, ketone, nitro, cyano, azido, silyl, sulfonyl, sulfinyl, or thiol; and

represents the polymeric backbone, which is not limited by length or arrangement of aldehyde monomers. In some examples,

can comprise any one or any combination of the following repeating units:

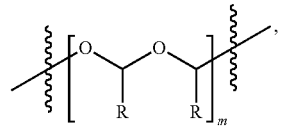

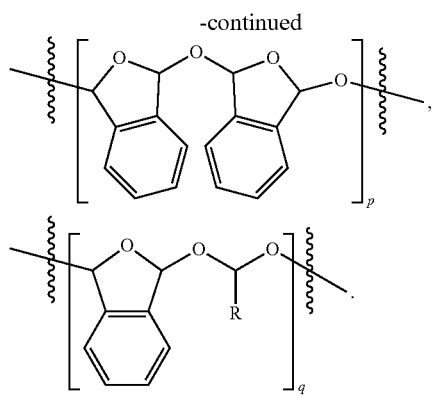

where m can be an integer from 1 to 100,000; p can be an integer from 1 to 100,000; and q can be an integer from 1 to 100,000. In these examples, the disclosed copolymers can be a copolymer of phthalaldehyde and one other aldehyde.

In other examples, the disclosed copolymers can be a copolymer of phthalaldehyde and two different aldehydes (i.e., a terpolymer). In still other examples, the disclosed copolymers can be a copolymer of phthalaldehyde and three or more different aldehydes. In some examples where the disclosed copolymers comprise repeating units derived from three different aldehyde monomers, PHA and two other aldehydes. These copolymers can also be linear or branched copolymers. In some examples, these copolymers can be cyclic and can have Formula III:

Formula III

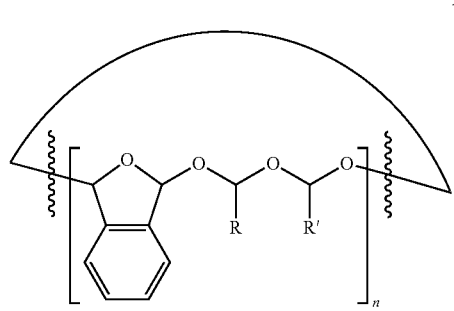

wherein n can be an integer of from 1 to 100,000; R and R' can be different; R can be chosen from $C_1$-$C_{20}$ alkyl, $C_1$-$C_{20}$ alkoxyl, $C_2$-$C_{20}$ alkenyl, $C_2$-$C_{20}$ alkynyl, $C_6$-$C_{10}$ heteroaryl, $C_3$-$C_{10}$ cycloalkyl, $C_3$-$C_{10}$ cycloalkenyl, $C_3$-$C_{10}$ heterocycloalkyl, or $C_3$-$C_{10}$ heterocycloalkenyl; and, when substituted, R can be substituted with $C_1$-$C_{20}$ alkyl, $C_1$-$C_{20}$ alkoxy, $C_2$-$C_{20}$ alkenyl, $C_2$-$C_{20}$ alkynyl, $C_6$-$C_{10}$ aryl, $C_6$-$C_{10}$ heteroaryl, aldehyde, amino, sulfonic acid, sulfinic acid, fluoroacid, phosphonic acid, ether, halide, hydroxy, ketone, nitro, cyano, azido, silyl, sulfonyl, sulfinyl, or thiol; and R' can be chosen from substituted or unsubstituted $C_1$-$C_{20}$ alkyl, $C_1$-$C_{20}$ alkoxyl, $C_2$-$C_{20}$ alkenyl, $C_2$-$C_{20}$ alkynyl, $C_6$-$C_{10}$ aryl, $C_6$-$C_{10}$ heteroaryl, $C_3$-$C_{10}$ cycloalkyl, $C_3$-$C_{10}$ cycloalkenyl, $C_3$-$C_{10}$ heterocycloalkyl, or $C_3$-$C_{10}$ heterocycloalkenyl; and, when substituted, R' can be substituted with $C_1$-$C_{20}$ alkyl, $C_1$-$C_{20}$ alkoxy, $C_2$-$C_{20}$ alkenyl, $C_2$-$C_{20}$ alkynyl, $C_6$-$C_{10}$ aryl, $C_6$-$C_{10}$ heteroaryl, aldehyde, amino, carboxylic acid, sulfonic acid, sulfinic acid, fluoroacid, phosphonic acid, ester, ether, halide, hydroxy, ketone, nitro, cyano, azido, silyl, sulfonyl, sulfinyl, or thiol. In these examples, the backbone of the copolymer, again represented by can comprise any one or any combination of the following repeating units:

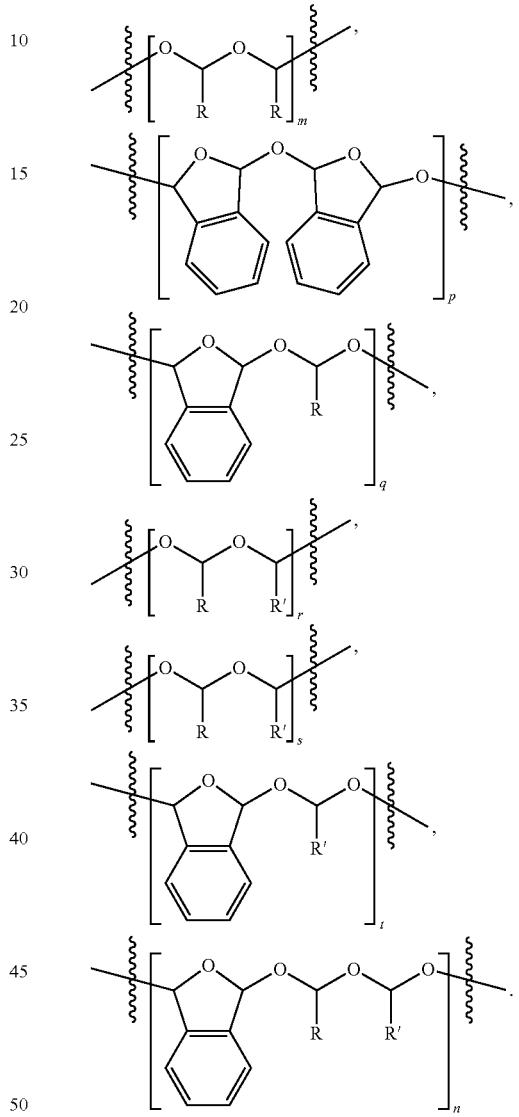

where n can be an integer from 1 to 100,000; m can be an integer from 1 to 100,000; p can be an integer from 1 to 100,000; q can be an integer from 1 to 100,000; r can be an integer from 1 to 100,000; s can be an integer from 1 to 100,000; and t can be an integer from 1 to 100,000.

In specific examples of copolymers disclosed herein, R and/or R' can be chosen from $C_1$-$C_{10}$ alkyl, $C_2$-$C_{10}$ alkenyl, or $C_2$-$C_{10}$ alkynyl, or cycloalkenyl, or heterocycloalkenyl. In more specific examples, R and/or R' can be $C_1$-$C_6$ alkyl or $C_1$-$C_6$ alkenyl. In other examples, the disclosed copolymer is a copolymer of PHA and one or more of acetaldehyde, propanal, butanal, pentanal, hexanal, heptanal, octanal, nonanal, decanal, undecanal, propenal, butenal, pentenal, hexenal, heptenal, octenal, nonenal, decenal, undecenal, and any combination thereof.

The disclosed copolymers can have a ratio of phthalaldehyde units to other aldehyde units of from about 1:50 to about 50:1. By phthaldehyde units is meant:

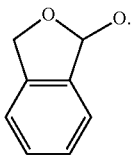

By aldehyde unit is meant:

where R is as defined herein. For example, the ratio of phthalaldehyde units to other aldehyde units is about 1:50; 1:45; 1:40; 1:35; 1:30; 1:25; 1:20; 1:15; 1:10; 1:5; 1:1, 5:1; 10:1; 15:1; 20:1; 25:1; 30:1; 35:1; 40:1; 45:1, or 50:1. In more specific examples, the ratio of phthalaldehyde units to other aldehyde units is about 25:1 to about 1:1, from about 15:1 to about 5:1, or from about 10:1 to about 5:1.

In further examples, the disclosed copolymers can comprise 30 mol % or more phthalaldehyde units based on total monomer weight (e.g., 35 mol % or more, 40 mol % or more, 45 mol % or more, 50 mol % or more, 55 mol % or more, 60 mol % or more, 65 mol % or more, 70 mol % or more, 75 mol % or more, 80 mol % or more, 85 mol % or more, 90 mol % or more, 95 mol % or more, 97 mol % or more, or 99 mol % or more). In some examples, the copolymer can comprise from 99 mol % or less phthalaldehyde units based on the total monomer weight (e.g., 97 mol % or less, 95 mol % or less, 90 mol % or less, 85 mol % or less, 80 mol % or less, 75 mol % or less, 70 mol % or less, 65 mol % or less, 60 mol % or less, 55 mol % or less, 50 mol % or less, 45 mol % or less, 40 mol % or less, or 35 mol % or less). The amount of phthalaldehyde units in the copolymer can range from any of the minimum values described above to any of the maximum values described above. For example, the copolymer can comprise from 30 mol % to 99 mol % phthalaldehyde units based on the total monomer content (e.g., from 60 mol % to 99 mol %, from 70 mol % to 97 mol %, from 80 mol % to 95 mol %, from 85 mol % to 99 mol %, from 90 mol % to 99 mol %, or from 80 mol % to 90 mol %).

In certain examples, the other aldehyde(s) in the copolymer can be selected from substituted or unsubstituted $C_1$-$C_{20}$ alkyl aldehyde, $C_2$-$C_{20}$ alkenyl aldehyde, $C_2$-$C_{20}$ alkynyl aldehyde, $C_6$-$C_{10}$ aryl aldehyde, $C_6$-$C_{10}$ heteroaryl aldehyde, $C_3$-$C_{10}$ cycloalkyl aldehyde, $C_3$-$C_{10}$ cycloalkenyl aldehyde, $C_3$-$C_{10}$ heterocycloalkyl aldehyde, and $C_3$-$C_{10}$ heterocycloalkenyl aldehyde. In particular examples, the other aldehyde can be a $C_2$-$C_{10}$ alkyl aldehyde, e.g., propylaldehyde, butylaldehyde, pentylaldehyde, or hexylaldehyde. In still other examples, the other aldehyde can be $C_3$-$C_{10}$ alkenyl aldehyde or $C_3$-$C_{10}$ alkynyl aldehyde. The presence of unsaturation in these monomers can be useful for crosslinking or other modifications as disclosed elsewhere herein. In further examples, the other aldehyde can be $C_2$-$C_{10}$ alkyl aldehyde substituted with a reactive group such as an alcohol, thiol, amine, azide, nitrile, carbonyl, imine, or halogen. In further examples, the other aldehyde (e.g., R) can be $C_2$-$C_{10}$ alkyl aldehyde substituted with acid, e.g., a sulfonic acid, sulfinic acid, fluoroacid, or phosphonic acid.

Molecular weight of the disclosed copolymers can be 2,000 g/mol or more (e.g., 4,000 g/mol or more; 6,000 g/mol or more; 8,000 g/mol or more; 10,000 g/mol or more; 12,000 g/mol or more; 14,000 g/mol or more; 16,000 g/mol or more; 18,000 g/mol or more, 20,000 g/mol or more, 25,000 g/mol or more, 30,000 g/mol or more, 50,000 g/mol or more; 100,000 g/mol or more; 150,000 g/mol or more; 200,000 g/mol or more; 250,000 g/mol or more; 500,000 g/mol or more; 1,000,000 g/mol or more; 1,500,000 g/mol or more; or 2,000,000 g/mol or more).

In some examples, the disclosed copolymers can have a molecular weight of 2,000,000 g/mol or less (e.g., 1,500,000 g/mol or less; 1,000,000 g/mol or less; 500,000 g/mol or less; 250,000 g/mol or less; 200,000 g/mol or less; 150,000 g/mol or less; 100,000 g/mol or less; 50,000 g/mol or less; 30,000 g/mol or less, 25,000 g/mol or less, 20,000 g/mol or less; 18,000 g/mol or less; 16,000 g/mol or less; 14,000 g/mol or less; 12,000 g/mol or less; 10,000 g/mol or less; 8,000 g/mol or less; 6,000 g/mol or less; 4,000 g/mol or less; or 2,000 g/mol or less).

The molecular weight of the disclosed copolymers can range from any of the minimum values described above to any of the maximum values described above. For example, the molecular weight of the copolymer can be from 2,000 g/mol to 2,000,000 g/mol (e.g., from 2,000 g/mol to 1,500,000 g/mol; from 10,000 g/mol to 1,000,000 g/mol; from 20,000 g/mol to 500,000 g/mol; from 50,000 g/mol to 250,000 g/mol; from 100,000 g/mol to 2,000,000 g/mol; from 5,000 g/mol to 18,000 g/mol; from 12,000 g/mol to 50,000 g/mol; from 2,000 g/mol to 50,000 g/mol, from 2,000 g/mol to 25,000 g/mol, from 2,000 g/mol to 20,000 g/mol, from 5,000 g/mol to 20,000 g/mol, from 5,000 g/mol to 15,000 g/mol, or from 10,000 g/mol to 20,000 g/mol).

The disclosed copolymers have can have a ceiling temperature below ambient temperature, e.g., 0° C. or below, −10° C. or below, −20° C. or below, −30° C. or below, −40° C. or below, or −50° C. or below. In specific examples, the disclosed copolymers can have a ceiling temperature of from ambient temperature to −50° C., from ambient temperature to −40° C., from ambient temperature to −30° C., from ambient temperature to −20° C., from ambient temperature to −10° C., from ambient temperature to 0° C., from 0° C. to −50° C., from 0° C. to −40° C., from 0° C. to −30° C., from 0° C. to −20° C., from 0° C. to −10° C., from −10° C. to −50° C., from −10° C. to −40° C., from −10° C. to −30° C., from −10° C. to −20° C., from −20° C. to −50° C., from −20° C. to −40° C., from −20° C. to −30° C., from −30° C. to −50° C., from −30° C. to −40° C., or from −40° C. to −50° C. Ceiling temperatures can be measured from in-situ NMR polymerization by measuring equilibrium monomer concentrations at various temperatures where polymer can form. They are also measured by polymer yield experiments from polymerizations run to equilibrium at various temperatures.

The disclosed copolymers, in some examples, can also have low polydispersity or be substantially monodisperse. The terms "low polydispersity" and "substantially monodisperse" are used interchangeably to refer to a polydispersity index (PDI), defined as the ratio of the weight average molecular weight to the number average molecular weight, of from 1 to 3.0. In certain examples, the disclosed copolymers can have a PDI, of 1 or more (e.g., 1.1 or more, 1.2 or more, 1.3 or more, 1.4 or more, 1.5 or more, 1.6 or more, 1.7 or more, 1.8 or more, 1.9 or more, 2.0 or more, 2.2 or more, or 2.5 or more). In some examples, the copolymers can have a PDI of 3.0 or less (e.g., 3.0 or less, 2.5 or less, 2.2 or less, 2.0 or less. 1.9 or less, 1.8 or less, 1.7 or less, 1.6 or less, 1.5 or less, 1.4 or less, 1.3 or less, 1.2 or less, 1.1 or less, or 1.05 or less). The PDI of the disclosed copolymers can range from any of the minimum values described above to any of the maximum values described above. For example, the composite prepolymer can have a PDI from 1 to 3.0 (e.g., from 1.05 to 2.0, from 1.2 to 1.9, from 1 to 1.9, from 1.1 to 1.8 from 1.2 to 1.7, from 1.3 to 1.6, from 1.4 to 1.5, from 1.5 to 2.0, from 1.7 to 2.0, from 1 to 1.3, or from 1.5 to 1.8). In other examples, the disclosed copolymers can have high polydispersity (e.g., PDI greater than 3.0), especially when the copolymers are intercollated.

In some examples, the disclosed copolymers can have a strength of 1 gigapascals (GPa) or more (e.g., 1.5 GPa or more, 2 GPa or more, 2.5 GPa or more, 3 GPa or more, 3.5 GPa or more, 4 GPa or more, 4.5 GPa or more, 5 GPa or more, 5.5 GPa or more, 6 GPa or more, 6.5 GPa or more, 7 GPa or more, 7.5 GPa or more, 8 GPa or more, 8.5 GPa or more, 9 GPa or more, or 9.5 GPa or more). In some examples, the disclosed copolymers can have a strength of 10 GPa or less (e.g., 9.5 GPa or less, 9 GPa or less, 8.5 GPa or less, 8 GPa or less, 7.5 GPa or less, 7 GPa or less, 6.5 GPa or less, 6 GPa or less, 5.5 GPa or less, 5 GPa or less, 4.5 GPa or less, 4 GPa or less, 3.5 GPa or less, 3 GPa or less, 2.5 GPa or less, 2 GPa or less, or 1.5 GPa or less). The strength of the disclosed copolymers can range from any of the minimum values described above to any of the maximum values described above, for example from 1 GPa to 10 GPa (e.g., from 1 GPa to 5 GPa, from 5 GPa to 10 GPa, from 1 GPa to 2.5 GPa, from 2.5 GPa to 5 GPa, from 5 GPa to 7.5 GPa, from 7.5 GPa to 10 GPa, from 2 GPa to 9 GPa, or from 2 GPa to 3 GPa).

In some examples, the disclosed copolymers can have an elongation to break of 0.3% or more, e.g., 0.4% or more, 0.5% or more, 0.6% or more, 0.7% or more, 0.8% or more, 0.9% or more, 1.0% or more, 1.1% or more, 1.2% or more, 1.3% or more, or 1.4% or more. In further examples, the disclosed copolymer can have an elongation to break of 1.5% or less, e.g., 1.4% or less, 1.3% or less, 1.2% or less, 1.1% or less, 1.0% or less, 0.9% or less, 0.8% or less, 0.7% or less, 0.6% or less, 0.5% or less, or 0.4% or less. The elongation to break of the disclosed copolymers can range from any of the minimum values described above to any of the maximum values described above, for example from 0.3% to 1.5%, for example, from 0.3% to 1.2%, or from 0.3% to 1.0%.

In some examples, the disclosed copolymers can have an elastic modulus of 0.5 GPa or more, e.g., 0.6 GPa or more, 0.7 GPa or more, 0.8 GPa or more, 0.9 GPa or more, 1.0 GPa or more, 1.1 GPa or more, 1.2 GPa or more, 1.3 GPa or more, 1.4 GPa or more, 1.5 GPa or more, 1.6 GPa or more, 1.7 GPa or more, 1.8 GPa or more, 1.9 GPa or more, 2.0 GPa or more, 2.1 GPa or more, 2.2 GPa or more, 2.3 GPa or more, 2.4 GPa or more, 2.5 GPa or more, 2.6 GPa or more, 2.7 GPa or more, 2.9 GPa or more, or 2.9 GPa or more. In other examples, the disclosed copolymer can have an elastic modulus of 3.0 GPa or less, e.g., 2.9 GPa or less, 2.8 GPa or less, 2.7 GPa or less, 2.6 GPa or less, 2.5 GPa or less, 2.4 GPa or less, 2.3 GPa or less, 2.2 GPa or less, 2.1 GPa or less, 2.0 GPa or less, 1.9 GPa or less, 1.8 GPa or less, 1.7 GPa or less, 1.6 GPa or less, 1.5 GPa or less, 1.4 GPa or less, 1.3 GPa or less, 1.2 GPa or less, 1.1 GPa or less, 1.0 GPa or less, 0.9 GPa or less, 0.8 GPa or less, 0.7 GPa or less, or 0.6 GPa or less. The elastic modulus of the disclosed copolymers can range from any of the minimum values described above to any of the maximum values described above, for example from 0.5 GPa to 3.0 GPa, from 1.0 GPa to 2.5 GPa, from 1.3 GPa to 2.2 GPa.

The benefit of incorporating low molecular weight aldehyde monomer in the copolymer can be seen in the evaporation time of the depolymerized copolymer. The melting point of phthalaldehyde, pentanal, butanal, propanal and ethanal are 55° C., −60° C., −97° C., −81° C., and −123°, respectively. After exposure to an acid, the homopolymer of poly(phthalandehyde) takes 2.5 days for 90% weight loss whereas the poly(phthalaldehyde-butanal) copolymer took only 5.25 h for 90% weight loss.

The toughness of the poly(aldehyde) copolymer was tougher than that of the poly(phthalaldehyde) polymer, as measured by elongation to break in a stress-strain measurement. Poly(phthalaldehyde) had an elongation to break below 1% whereas the 50 g/mole poly(phthalaldehyde-butanal) copolymer had an elongation to break of >1.2%

Crosslinked Polyaldehyde Copolymers

Crosslinking is the act of chemically bonding one polymer chain to another or alternatively, one part of a chemical chain to another part of the same chain. Crosslinking polymers can modify the mechanical properties by creating new bonds that alter how the polymer behaves under mechanical stresses. Variables such as the crosslink density and the chemical nature of the crosslink can further alter the polymer's final properties.

The disclosed copolymers can be crosslinked in various ways. For example, by incorporating a reactive group in one or more of the different aldehyde monomers, the reactive groups can be used to form crosslinks with the same or different polymer. Such reactions are sometimes initiated by heat or a catalyst. Alternatively, a crosslinking agent can be used where the crosslinking agent would have a two or more functional groups which each react with a chemical site on the polymer chain. The end result is to create a chemical crosslink incorporating the crosslinking agent. In some specific examples, R in any of the formula disclosed herein can comprise a reactive group that can i) react with another R or R' group on a different aldehyde monomer; ii) convert into a different reactive group, which is then reacted with another R or R' group on a different aldehyde monomer; and/or iii) react with a crosslinking agent.

Examples of crosslinking reactions that can be used to crosslink the disclosed copolymers include, but are not limited to, photocuring, free radical polymerization, cationic polymerization, anionic polymerization, coordination polymerization, ring-opening polymerization, chain-growth polymerization, chain transfer polymerization, emulsion polymerization, ionic polymerization, solution polymerization, step-growth polymerization, suspension polymerization, radical polymerization, condensation reactions, cycloaddition reactions, electrophilic additions, and nucleophilic additions (e.g., Michael additions).

As a specific example, Scheme 1 shows the copolymerization of phthalaldehyde and 4-pentenal (4PE). The terminal, unsaturated, carbon-carbon double bond on the 4PE can be used to cross-link the PHA-4PE containing copolymer through a number of different mechanisms including but not limited to: radical based reactions that can be thermally or photolytically induced from initiators, thiol-alkene reactions, and vulcanization. Additionally, the unsaturated bond can be reacted into a different functional group that is capable of crosslinking, such as transforming the alkene into an epoxide, aldehyde, ester, alcohol, thiol, amine, or halide group. This permits additional chemistries to be used crosslinking.

Scheme 1: Reaction scheme for copolymerization of PHA and 4 PE followed by the free radical crosslinking of the 4PE moieties.

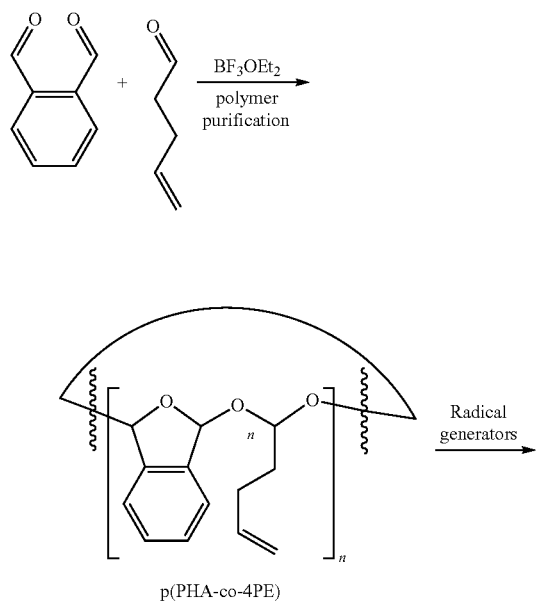

p(PHA-co-4PE)

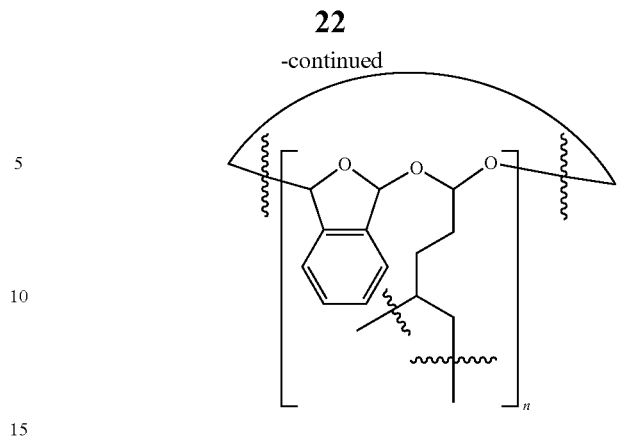

Another example is incorporating an aldehyde with a furan group into the copolymer. Furan can participate in Diels-Alder reactions with a dienophile, such as maleimides. If multi-functional dienophiles are loaded into the copolymer containing furan reactive groups then the Diels-Alders reactions can create covalent crosslinks between polymer chains. This example is illustrated in Scheme 2. These reactions can occur at modest temperatures, about 60° C. At higher temperatures, >110° C., the retro Diels-Alder reaction can occur and undue the covalent crosslinks. This is highly favorable for disappearing devices as it minimizes the high molecular weight residue that often accompanies cross-linked polymers.

Scheme 2: Reaction scheme for forward and retro Diels-Alder between furan containing aldehyde copolymers and maleimides

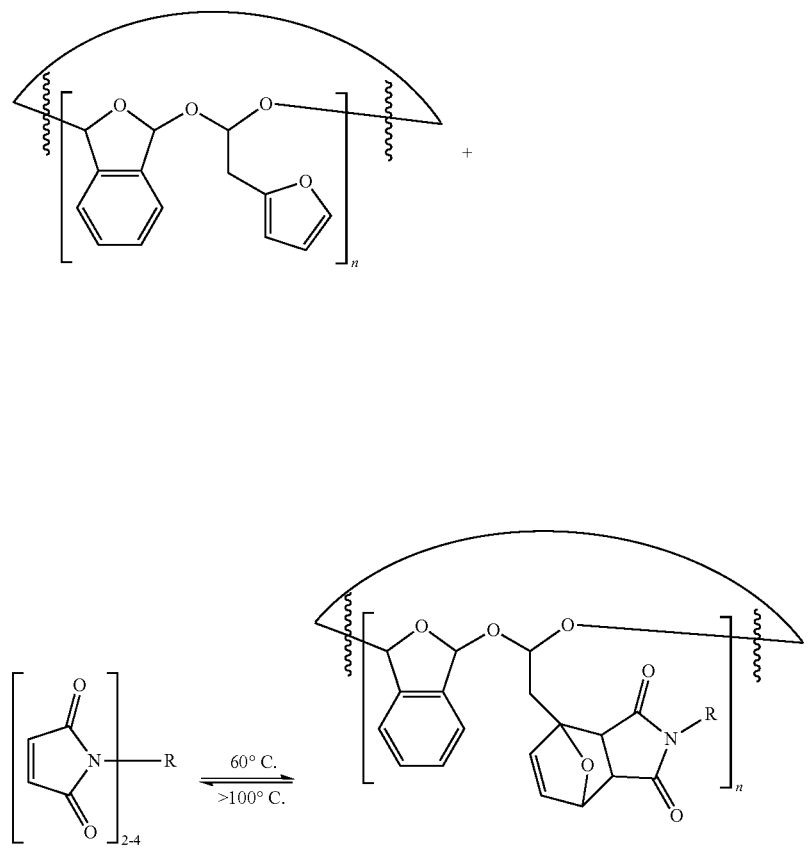

Aldehyde monomers containing other functional groups can be incorporated into the copolymer leading to other crosslinking mechanisms. In additional examples, the disclosed copolymers can have reactive groups that are pendant on the polymer backbone (e.g., R and/or R') that are available for bond formation. The disclosed copolymers can be reacted with a crosslinking agent that reacts with reactive groups on separate copolymers or on the same copolymer to form a crosslink. Alternatively, the disclosed copolymers can have reactive groups that are pendant on the polymer backbone that are converted into different reactive groups, which are then reacted with other reactive groups on the same copolymer, or a different copolymer or with a crosslinking agent.

Examples of suitable reactive groups for crosslinking that can be incorporated into the copolymer include nucleophilic groups, electrophilic groups, or radical generating groups. Thus, disclosed herein are copolymers of phthalaldehyde and one or more different aldehydes wherein the one or more different aldehydes comprise a nucleophilic group, electrophilic group, or radical generating group. Referring to Formula I and II, specific examples of these copolymers can have R and/or R' as an unsubstituted $C_2$-$C_{20}$ alkenyl, unsubstituted $C_2$-$C_{20}$ alkynyl, unsubstituted, cycloalkenyl, unsubstituted heterocycloalkenyl, $C_6$-$C_{10}$ aryl, $C_6$-$C_{10}$ heteroaryl; or R and/or R' can be $C_1$-$C_{20}$ alkyl, $C_3$-$C_{10}$ cycloalkyl, or $C_3$-$C_{10}$ heterocycloalkyl substituted with amino, carboxylic acid, sulfonic acid, sulfinic acid, fluoroacid, phosphonic acid, ester, halide, hydroxyl, ketone, nitro, cyano, azido, or thiol.

In some specific examples, the disclosed copolymers can comprise thiol groups. In some examples, the disclosed copolymer can comprise hydroxyl groups. In some examples, the disclosed copolymer can comprise ene or yne groups. In some examples, the disclosed copolymer can comprise epoxide groups.

In certain examples, a crosslinking agent can be used to crosslink the copolymers. The crosslinking agent can have reactive groups that are available for bond formation; that is, the crosslinking agent can be reacted with the reactive groups (e.g., R and/or R' or other aldehyde monomer) of the copolymer. Examples of reactive groups on a suitable crosslinking agent include nucleophilic groups, electrophilic groups, or radical generating groups. The reactive groups of the crosslinking agent can be complementary to the reactive groups of the copolymer. For example, the reactive groups of the copolymer can comprise nucleophilic reactive groups and the crosslinking agent can comprise electrophilic reactive groups. Alternatively, the reactive groups of the copolymer can comprise electrophilic reactive groups and the crosslinking agent can comprise nucleophilic reactive groups.

In some examples, the crosslinking agent can comprise two or more reactive groups (e.g., 3 or more, 4 or more, or 5 or more). In some examples the crosslinking agent can comprise 6 or less reactive groups (e.g., 5 or less, 4 or less, or 3 or less). The number of reactive groups of the crosslinking agent can range from any of the minimum values described above to any of the maximum values described above, for example from 2 to 6 (e.g., from 2 to 4, from 4 to 6, from 3 to 5, from 2 to 3, from 3 to 4, from 4 to 5, or from 5 to 6).

In some examples, the crosslinking agent can comprise a Michael acceptor. In some examples, the crosslinking agent can comprise a multifunctional (meth)acrylate or a multifunctional allylate. In some examples, the crosslinking agent can comprise a polyisocyanate. In other examples, the crosslinking agent can comprise a dienophile.

The amount of crosslinking, and thus the amount of reactive groups in the copolymer involved in reactions, can be controlled by selecting the desired amount of crosslinking agent. That is, the stoichiometry of the reagents can be used to dictate the extent of crosslinking. The amount of crosslinking can be monitored by various analytical techniques, such as TLC, IR spectroscopy, and NMR.

By incorporating minor amounts of aldehyde monomers with reactive groups into the disclosed copolymers, the degree of crosslinking can be minimized. For example, using less than 1 mol % of aldehyde monomers with reactive groups, e.g., less than 0.5 mol %, or less than 0.1 mol %, the degree of crosslinking can be minor. In contrast, using significant amounts of aldehyde monomer with reactive groups can lead to highly crosslinked copolymers. For example, using 5% mole of aldehyde monomers with reactive groups, e.g., 10 mol % or more, or 15 mol % or more, the degree of crosslinking can be significant.

In some examples, crosslinking the copolymer can comprise a Michael addition. In some examples, the copolymer can comprise thiol groups on the aldehyde units and crosslinking the copolymer can comprise base-catalyzed Michael addition of the thiol groups of the copolymer with electrophilic reactive groups (e.g., a Michael acceptor such as an ene or yne group) of the crosslinking agent. Alternatively, the copolymer can comprise a Michael acceptor group on the aldehyde units and the crosslinking agent can comprise a thiol groups. Further, the copolymer can contain aldehyde units with Michael acceptors and Michael donors and the copolymer can be crosslinked with itself.

In some examples, crosslinking the copolymer can comprise a substitution reaction. The copolymer can comprise aldehyde units having an alcohol, amine, or thiol and the crosslinking agent can comprise a polyisocyanate, such that the crosslinked copolymer can include urethane, urea, or thiourea linkages. Alternatively, the crosslinking agent can comprise an alcohol, amine, or thiol and the copolymer can comprise aldehyde units having a polyisocyanate. Further, the copolymer can contain aldehyde monomers with a polyisocyanate and either one or more of alcohol, amine, or thiol groups and the copolymer can be crosslinked with itself.

Further examples, include a crosslinking reaction between an epoxide, carbonyl, ester, or halogen with an alcohol, amine, or thiol. That is, the aldehyde units in the copolymer can contain (or be converted to contain) an epoxide, carbonyl, ester, or halogen and the crosslinking agent can comprise an alcohol, amine, or thiol. Alternatively, the crosslinking agent can contain an epoxide, carbonyl, ester, or halogen and the aldehyde units in the copolymer can comprise an alcohol, amine, or thiol. Further, the aldehyde units in the copolymer can contain (or be converted to contain) an epoxide, carbonyl, ester, or halogen, an alcohol, amine, or thiol and the copolymer can be crosslinked with itself.

In still further examples, crosslinking the copolymer can comprise a cycloaddition. In some examples, the copolymer can comprise aldehyde units having unsaturated (diene, diyne, or azide)) groups and crosslinking the copolymer can comprise reacting these groups with a dienophile of the crosslinking agent. Alternatively, the copolymer can comprise aldehyde units having a dienophile and the crosslinking agent can comprise an unsaturated groups (diene, diyne, or azide). Further, the copolymer can comprise aldehyde units having a dienophile and dienes and the copolymer can be crosslinked with itself.

In yet further examples, crosslinking the copolymer can comprise a radical polymerization. Here, the aldehyde units can comprise a radical generator, e.g., an unsaturated group, and the radical can be generated by application of a radical initiator. This can be done in the presence or absence of a crosslinking agent.

The amount of crosslinking agent used in the crosslinking reactions can be 0.05% or more based on the total amount of the monomers to be polymerized (e.g., 0.1% or more, 0.2% or more, 0.3% or more, 0.4% or more, 0.5% or more, 0.6% or more, 0.7% or more, 0.8% or more, 0.9% or more, 1% or more, 1.1% or more, 1.2% or more, 1.3% or more, 1.4% or more, 1.5% or more, 1.6% or more, 1.7% or more, or 1.8% or more). In some examples, the amount of crosslinking agent used can be 2% or less based on the total amount of the monomers to be polymerized (e.g., 1.9% or less, 1.8% or less, 1.7% or less, 1.6% or less, 1.5% or less, 1.4% or less, 1.3% or less, 1.2% or less, 1.1% or less, 1% or less, 0.9% or less, 0.8% or less, 0.7% or less, 0.6% or less, 0.5% or less, 0.4% or less, 0.3% or less, or 0.2% or less). The amount of crosslinking agent used can range from any of the minimum values described above to any of the maximum values described above. For example, the amount of crosslinking agent used can be from 0.05% to 2% based on the total amount of monomers to be polymerized (e.g., from 0.05% to 1%, from 1% to 2%, from 0.05% to 0.5%, from 0.5% to 1%, from 1% to 1.5%, from 1.5% to 2%, or from 0.1% to 1.9%).

Photocatalysts and Thermocatalysts

The disclosed copolymers can be triggered to undergo depolymerization by a variety of stimuli, e.g., light, heat, chemical, or sound. In some examples, a reliable environmental trigger in the form of sunlight or heat can be used to induce the 'disappearance' of the disclosed copolymers. The term light is used here to include all forms of electromagnetic radiation, not simply visible light. Ultraviolet radiation is especially effective activating the the photocatalysts used here. The ability to decompose these polymers in ambient temperature with environmental conditions such as sunlight or controlled, specific LED wavelengths can lead to many applications, e.g., in the emerging field of transient electronics, or stealth devices that are not to be recovered. Alternatively, an instantaneous pulse of heat can also be used to create the depolymerization trigger. The disclosed copolymers can be highly sensitive to acid or bases and can be promptly depolymerized into volatile monomer units by end-cap removal or direct chain attack at temperatures above about −4° C., after triggering the photocatalyst or thermocatalyst.

Onium salts are commonly used in the microlithographic industry for chemically amplified photoresists and photoinitators for polymerizations (Crivello, J. V.; et al., "Design and Synhesis of Photoacid Generating Systems,"*J. Photopolym. Sci. Technol.*, 2008, 21:493-497; Crivello, J. V.; et al., "Anthracene electron-transfer photosensitizers for onium salt induced cationic photopolymerizations," *J. Photochem. Photobiol. A Chem.*, 2003, 159:173-188; J. V. Crivello and U. Bulut, "Curcumin: A naturally occurring long-wavelength photosensitizer for diaryliodonium salts," *J. Polym. Sci. Part A Polym. Chem.*, 2005, 43:5217-5231). The most efficient photo-acid generators are the diaryliodonium and triarylsulfonium salts. The presence of the aryl groups of the onium cation make the photo-acid generators absorb strongly in the short wavelength region of the ultraviolet spectrum. Photo-base generators based on tetraphenylborate salts have also seen some interest in past literature for anionic polymerizations (Sun, X.; et al., "Bicyclic guanidinium tetraphenylborate: A photobase generator and a photocatalyst for living anionic ring-opening polymerization and cross-linking of polymeric materials containing ester and hydroxy groups," *J. Am. Chem. Soc.* 2008, 130:8130-8131; Sun, X.; et al., "Development of Tetraphenylborate-based Photobase Generators and Sacrificial Polycarbonates for Radiation Curing and Photoresist Applications," Carleton University, 2008). The tetraphenylborate salts undergo a rearrangement that abstracts a proton from its cation neighbor, releasing a strong guanidine base. The tetraphenylborate anion is responsible for the absorbance in the short wavelength region of the ultraviolet spectrum of these photo-base generators. As a result, most of the energy emitted from broadband light sources is wasted with these photo-acid/base generators. Sensitizing the onium and tetraphenylborate salts to longer wavelengths of light can capture a higher fraction of energy from these light sources leading to a more efficient photolysis. Sunlight is one example of a broadband light source that is a reliable environmental trigger for transient devices that can initiate the decomposition of the polymer. Sensitization to longer wavelengths of light is desired as there is not enough deep ultraviolet light in natural sunlight to activate the photo-acid/base generators. Alternatively, the photoactive compound can be active by heat. A pulse of heat to a high enough temperature can accomplish the same chemical reaction as light. In particular, onion salts are thermally activated at about 180° C.

An attractive quality of these onium salts is the ability to extend their spectral sensitivity to longer wavelengths of light via electron-transfer photosensitization (Crivello, J. V.; et al., *J. Photochem. Photobiol. A Chem.* 2003, 159:173-188). A simplified scheme is shown below. In the Scheme 3, MtXn- represents the nucleophilic counterion such as $BF_4^-$, $PF_6^-$, $SbF_6^-$, $(C_6F_5)_4B^-$. The photo-induced electron transfer begins from the absorption of light by the photosensitizer, transitioning the PS to the excited state species [PS]*. The excited species PS undergoes an encounter complex by colliding with an onium salt generating an excited complex state (exciplex). The onium is reduced by a formal one electron-transfer reaction. The electron-transfer reaction is rendered irreversible due to the rapid decay of the onium radical as shown in eq4. The photosensitizer cation radical can decay in a number of ways to produce a strong Bronsted acid.

Disclosed herein are copolymers of phthalaldehyde and one or more other aldehydes and a photocatalyst, which can trigger the depolymerization of the copolymer by the application of light. In specific examples, the photocatalyst is a photo-acid generator (PAG), especially photo-active generators that are active at a wavelength in the visible spectrum. Other photo-acid generators that are active at a wavelength in the UV, IR, or X-rays can be used when depolymerization is desired to be triggered by these stimuli. In other examples, the photocatalyst is a photo-base generator (PBG), especially photo-base generators that are active at a wavelength in the visible spectrum. Other photo-base generators that are active at a wavelength in the UV, IR, or X-rays can be used when depolymerization is desired to be triggered by these stimuli.

Examples on suitable photo-acid generators are onium salts, such as iodonium salts and sulfonium salts having perfluorinated anions, bissulfonyldiazomethane compounds, N-sulfonyloxydicarboximide compounds, and O-arylsulfonyloxime compounds. Further examples of photo-acid generators are tetrakis-(pentafluorophenyl)borate-4-methylphenyl[4-(1-methylethyl)phenyl]iodonium (Rhodorsil-FABA), tris(4-tert-butylphenyl)sulfonium tetrakis-(pentafluorophenyl) borate (TTBPS-FABA), triphenylsulfonium tetrakis-(pentafluorophenyl) borate (TPS-FABA), bis(4-tert-butylphenyl)iodonium triflate (BTBPI-TF), tert-(butoxycarbonylmethoxynaphthyl)-diphenylsulfonium triflate (TBOMDS-TF), N-hydroxynaphthalimide triflate (NHN-TF), diphenyliodonium perfluoro-1-butanesulfonate (DPI-NF), tris(4-tert-butylphenyl)sulfonium perfluoro-1-butanesulfonate (TTBPS-NF), N-hydroxynaphthalimide perfluoro-1-butanesulfonate (NHN-NF), N-hydroxy-5-norbornene-2,3-dicarboximide perfluoro-1-butanesulfonate (NHNDC-NF), bis(4-tert-butylphenyl)iodonium tris(perfluoromethanesulfonyl) methide, (BTBPI-TMM), bis(4-tert-butylphenyl)iodonium bis(perfluorobutanesulfonyl) imide (BTBPI-BBI), diphenyliodonium 9,10-dimethoxyanthracene-2-sulfonate (DPI-DMOS), bis(4-tert-butylphenyl) iodonium p-toluenesulfonate (BTBPI-PTS), a non-ionic PAG such as Ciba IRGACURE™ PAG 263 (III) and bis(4-tert-butylphenyl)iodonium perfluoro-1-octanesulfonate (BT-BPI-HDF). Other examples of photo-acid generators are disclosed in U.S. Pat. Nos. 6,004,724, 6,849,384, 7,393,627, 7,833,690, 8,192,590, 8,685,616, 8,268,531, 9,067,909, and 9,383644, which are incorporated by reference herein froth their teachings of photo-acid generators.

Examples of suitable photo-base generators include photoactive carbamates such as benzyl carbamates and benzoin carbamates, O-carbamoylhydroxylamines, O-carbamoyloximes, aromatic sulfonamides, alpha-lactams, and amides such N-(2-arylethyenyl)amides. Other examples of photobase generators are disclosed in U.S. Pat. Nos. 5,627,010, 7,300,747, 8,329,771, 8,957,212, and 9,217,050, which are incorporated by reference herein froth their teachings of photo-base generators.

Thermal acid generators can be any of the photo-acid generators described herein, that when heated to a certain temperature will decompose to release an acid. Other examples of such compounds include ammonium salts, sulfonyl esters, and acid amplifiers. Further examples, are disclosed in U.S. Publication Nos. 2017/0123313 and 2014/0193752, which are incorporated by reference herein in their entireties their teachings of acid generators.

Thermal base generators can be any photo-base generators described herein, that when heated to a certain temperature will decompose to release a base. These compounds can be, but not limited to, carboxylic salts of an amidine, imidazole, guandine, or a phosphazene derivative. Additional thermal base generators are disclosed in WO 2016109532, which is incorporated by reference herein in its entirety for its teachings of base generators.

The photo and thermocatalysts can be added to the disclosed copolymers prior to or after polymerization. The amount of photo or thermocatalyst present can vary depending on the intended purpose of the copolymer. In some examples, the amount of photo or thermocatalyst can be from 0.01 mol % to 10 mol % based on the total monomer mol %, e.g., from 0.01 to 5, from 0.1 to 1, from 1 to 5, or from 5 to 10 mol %.

Photosensitizers

The disclosed copolymers can also comprise a photosensitizer to facilitate photo-catalytic triggering of decomposition. The role of the photosensitizer is to extend the wavelength range of the photocatalyst to wavelengths which the photocatalyst does not absorb or absorbs only weakly. Molecular compounds such as modified polyaromatic hydrocarbons or fused aromatic rings can be suitable photosensitizers for the onium and tetraphenylborate salts, as well as other photo-acid and photo-base generators disclosed herein. However, photo-induced electron transfer between photosensitizer and photo-acid/base generator is not always certain. This electron transfer is typically described between a donor and its acceptor. The donor (sensitizer) is at a ground-state with two electrons in the highest occupied molecular orbital (HOMO). The oxidation potential of the donor (sensitizer) is increased over its ground state from the absorption of a photon thereby transitioning an electron to the lowest unoccupied molecular orbital (LUMO). The reduction potential of the accepter (PBG or PAG) must be lower than the oxidation potential of the donor. The photosensitizer and photo-catalyst can create an excited complex as shown in Scheme 3 eq 3, where an electron is transferred to the LUMO of the photo-catalyst. As a result of the excitation of the photo-catalyst, a strong acid or base is released.

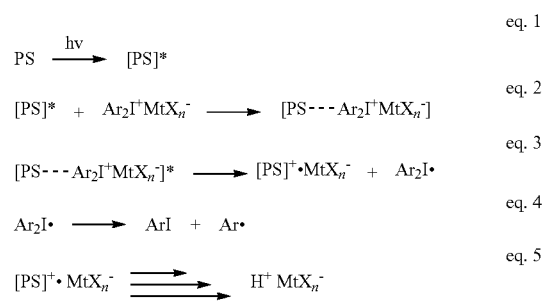

Scheme 3: Mechanism for photo-induced electron transfer of onium salts where PS is the photosensitizer.

Photosensitizers can range from aromatic hydrocarbons, isobenzofurans, carbocyanines, metal pthalocyanines, carbazoles, olefins, phenothiazines, acridines, stilbenes. Additional photosensitizers are disclosed in U.S. Pat. No. 4,250,053, and Crivello, J. V.; et al., *J. Photochem. Photobiol. A Chem.* 2003, 159:173-188, which are incorporated by reference herein for its teachings of photosensitizers.

Freezing Point Depression

In certain circumstances, the disclosed copolymers degrade into small molecules (oligomers) or monomers upon exposure to an external/internal trigger. These small molecules or monomers can have low vapor pressure and evaporation of the monomer is slow. Further, these monomers can have a tendency to be in a solid form in various environments, which can be undesirable if detection of the decomposed polymer is not desired. Freezing point depression can therefore be used to keeping monomer units in liquid form once the polymer has been triggered to decompose. The monomer can remain in liquid-state and absorb into the surrounding environment. This reduces the chance of detection where the monomer can evaporate over time.

In some examples, the disclosed copolymers can comprise a freezing point depressing agent. The freezing point depressing agents can be present in the disclosed copolymers as additives to a composition comprising the copolymer, or as a covalently bound moiety onto the copolymer. In certain embodiments, additives with the monomer units can be used to reduce the monomers freezing point and maintain liquid state at low temperatures. Examples of suitable agents include, but are not limited to, traditional and non-traditional plasticizers, photo-catalysts, and any combination of these additives. Types of traditional plasticizer include, but are not limited to, adipates (bis(2-ethylhexyl)adipate, dimethyl adipate, monomethyl adipate, dioctyl adipate), azelates, citrates, ether-esters, glutarates, isobutyrates, phosphates, sebacates (dibutyl sebacate), maleates, tertiary amines, quaternary ammonium compounds, diethylene glycol dibenzoate, dipropylene glycol dibenzoate, tripropylene glycol dibenzoate, butyl benzyl phthalate, phosphonium compounds, sulfonium compounds, or a combination thereof. Additional plasticizers include bis(2-ethylhexyl)phthalate, bis(2-propylheptyl)phthalate, diisononyl phthalate, dibutylphthalate, diisodecyl phthalate, diisooctyl phthalate, diethyl phthalate, diisobutyl phthalate, dihexylphthalate. Further examples include tirmethyl trimellitate, tri(2-ethylhexyl) trimellitate, tri(octyl,decyl)trimellitate, tri(heptyl,nonyl) trimellitate, octyltrimellitate. Further examples include sulfonamides, organophosphates, glycols and polyethers. Types of non-traditional plasticizers include, but are not limited to, ionic liquids, surfactants, and acid amplifiers. Suitable ionic liquids can include, but are not limited to, salts having as a cation imidazolium, alkyl-imidazole, alkyl-ammonium, alkyl-sulfonium, alkyl-piperidinium, alkyl-pyridinium, alkyl-phosphonium, or alkyl-pyrrolidinium, and having as an anion carboxylate, halide, fulminate, azide, persulfate, sulfate, sulfites, phosphates, phosphites, nitrate, nitrites, hypochlorite, chlorite, bicarbonates, perfluoroborates, and the like.

In other examples, the presence of different aldehyde comonomers can reduce the freezing point. Types of aldehyde comonomers that can be incorporated into poly(phthalaldehyde) (PPHA) homopolymer include, but are not limited to, acetaldehyde, propanal, butanal, pentanal, pentenal, hexanal, heptanal, octanal, nonanal, decanal, and 10-undecenal.

The presence of as little as 1 wt % freezing point depression agents can significantly lower the freezing point of the depolymerized polymer by disrupting the crystallization process. The presence of 10 wt % to 50 wt % freezing point depression compound can lower the freezing point of the depolymerization products more than 30° C. It was found that the presence of compounds containing quaternary ammonium or suflonium moieties can lower the freezing point of decomposed poly(phthalaldehyde) below −50° C. Without the freezing point depression agent, decomposed poly(phthalalsdehyde) freezes between 55° C. and 20° C.

Delayed Photo-Response of Poly(Phthalaldehyde) Depolymerization

In some situations, transient materials with extended operational time of use in the presence of a photo trigger is desirable. Device comprising these materials can finish the mission or product life cycle within the expected duration of time under continuous exposure to the photo triggers and vanish after completing its function.

Influence of organic additives on transient time is demonstrated herein to extend the operation time of the materials under the presence of a trigger. These organic additives contain weakly basic moieties that can coordinate and dissociate with a photo generated super acid. This can hinder the diffusion of the acid and potentially reduce the rate of depolymerization. In some examples, the disclosed copolymers can comprise agents that delay depolymeriation or reduce the rate of depolymerization. These agents can be present in the disclosed copolymers as additives to a composition comprising the copolymer, or as a covalently bound moiety onto the copolymer. Organic additives include but not limited to tertiary amine (e.g. n-methyl-2-pyrrolidone (NMP), dimethylformamide (DMF)), solvents with lone pair electrons (e.g. gamma butyrolactone (GBL)), tertiary phosphine, imidazole, different ionic liquids including but not limited to quaternary ammonium ionic liquid, phosphonium ionic liquid, imidazolium ionic liquid, sulfonium ionic liquid.

Suitable examples of ionic liquids that can be added include salts where a cation is imidazolium, alkyl-imidazole, alkyl-ammonium, alkyl-sulfonium, alkyl-piperidinium, alkyl-pyridinium, alkyl-phosphonium, or alkyl-pyrrolidinium and the anion is a halogen (fluoride, chloride, bromide, or iodide), perchlorate, a thiocyanate, cyanate, $C_1$-$C_6$ carboxylate, fulminate, azide, persulfate, sulfate, sulfites, phosphates, phosphites, nitrate, nitrites, hypochlorite, chlorite, bicarbonates, perfluoroborates, and the like. In specific examples, the ionic liquid comprises an imidazolium ion, e.g., a $C_n$ alkyl-methylimidazolium [$C_n$mim] where n is an integer of from 1 to 10. Allyl methylimidazolium ion and diethylimizazolium ion can also be used. The anion in the salt can be a halogen (fluoride, chloride, bromide, or iodide), perchlorate, a thiocyanate, cyanate, $C_1$-$C_6$ carboxylate, fulminate, azide, persulfate, sulfate, sulfites, phosphates, phosphites, nitrate, nitrites, hypochlorite, chlorite, bicarbonates, perfluoroborates, and the like, including mixtures thereof.

Multi-Layered, Photo/Thermo Activated Polymers

The decomposition and vaporization of polymers is useful in fabricating electronic and other devices where the polymer serves a temporary spatial placeholder. The decomposition and vaporization of polymers is also useful in constructing components that have a fixed lifetime and recovery of the component is undesirable. That is, the component can be made to disappear on command. The trigger mechanism can be an optical trigger from a light source or the sun. The trigger mechanism can also be a thermal trigger from a local heating source such as joule heating from a wire.

When a photosensitive polymer is used, it can be problematic to handle materials because they can be inadvertently exposed to the triggering light. Also, the photosensitive polymer may have a limited temperature range where it is stable. This can make processing the final component difficult if high temperature processes are needed, such as for soldering or curing of compounds.

Thus, it is desirable to fabricate a polymer-containing component without it being photosensitive and add a photosensitive layer later, or at the end of the process. In the disclosed methods, it has been found that a second, photosensitive layer containing a decomposing photocatalyst can be added after component fabrication. Activation of the second, photo-sensitive layer can be initiated and result in decomposition of the second layer. Further, the photocatalyst in the second layer can diffuse into the first, non-photosensitive layer resulting in efficient destruction of it. This is particularly effective when the first step in the photo-decomposition process is the liquefaction of the photo-activated materials because the photo-catalyst has a high diffusion coefficient and can easily penetrate into the non-photo sensitive layer.

Figure 2:
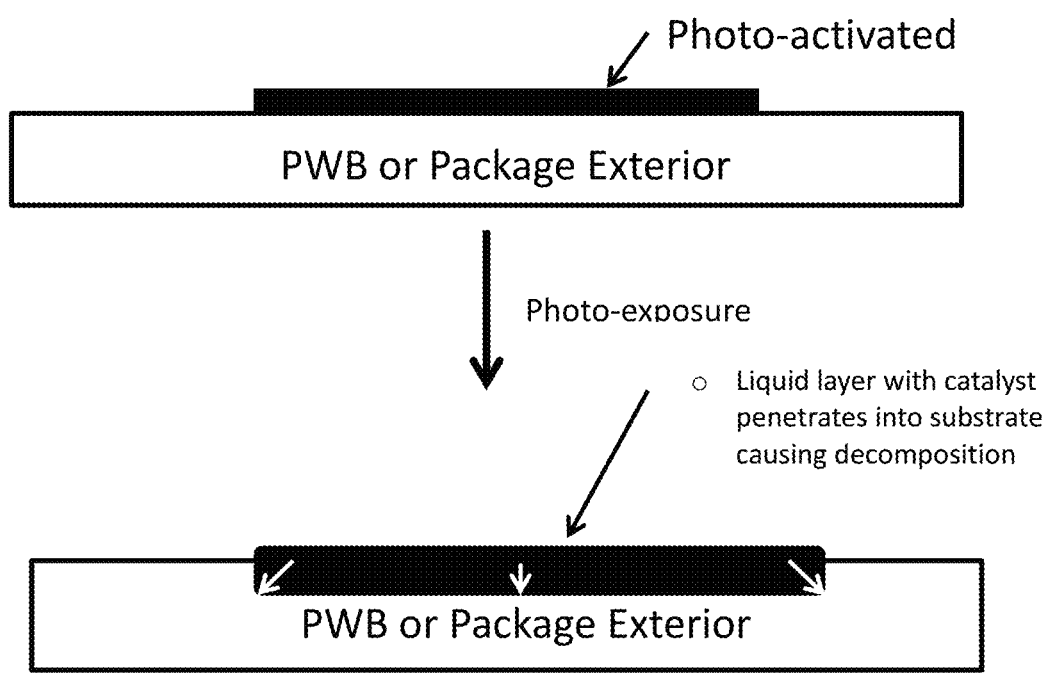
FIG. 2 is a schematic of a two layer structure containing the disclosed polymers.

FIG. 2 is a schematic showing a process of coating a non-photo sensitive substrate with a photo-active layer. Once the photo-active layer has been catalyzed, it liquefies the underlying non-photo active layer.

Figure 3:
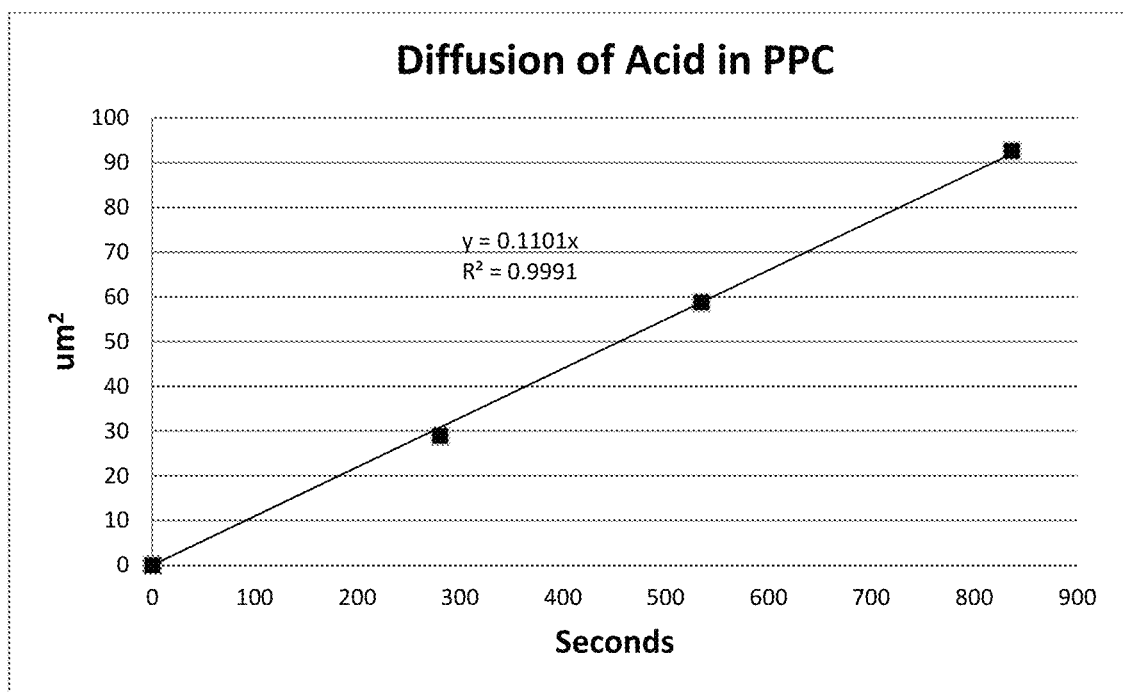
FIG. 3 is a graph of recorded diffusion rates of a multilayer structure.

An example of a multi-layer structure is demonstrated with polypropylene carbonate. A 2.3 micron film of PPC with 3 pphr PAG was pressed onto another 11.7 micron, non-photosensitive film of PPC with no additives. The effective diffusion rate of the acid from top to bottom-layer was monitored with time to give a diffusion rate of 0.11 um2/s as shown in FIG. 3.

Figure 4:
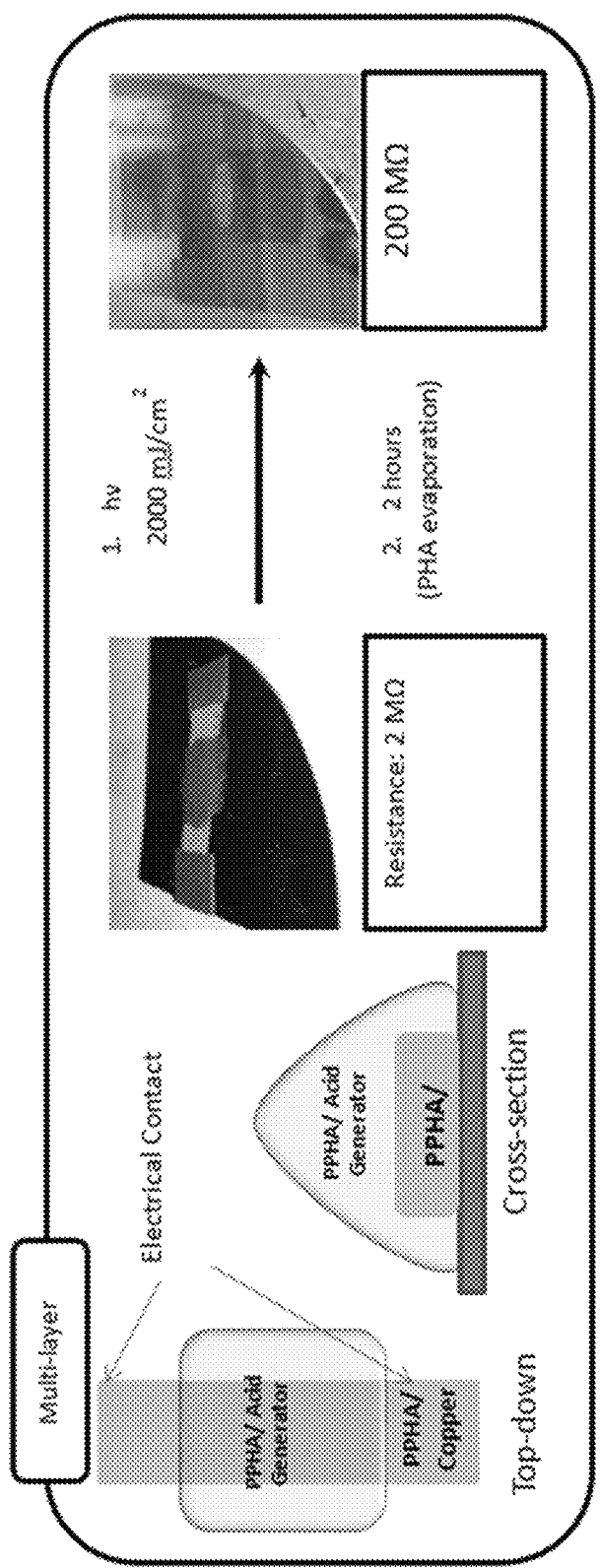
FIG. 4 is a schematic of an exemplary multilayer structure and the destruction of electrical conductivity through photo-exposure.

Another example of a multi-layer structure is demonstrated with poly(phthalaldehyde) (PPHA) in FIG. 4. A film of PPHA containing 10 pphr photo-acid generator was dispensed over a conductive trace of PPHA with copper nanoparticles. The top-layer was exposed to UV light where the acid decomposed the underlying layer and destroyed the electrical conductivity of the conductive line.

Similar structures can be prepared with thermal triggered layers. For example, one can fabricate a polymer-containing component without it being thermally sensitive and add a thermally sensitive layer later, or at the end of the process. Activation of the second, thermally-sensitive layer can be initiated and result in decomposition of the second layer. Further, the thermocatalyst in the second layer can diffuse into the first, non-thermally-sensitive layer resulting in efficient destruction of it.

Thus disclosed herein are various multilayer or multi-regioned compositions. In one example, a polymer composition can comprise a plurality of polymer layers wherein one layer comprises a copolymer as disclosed herein with a photo or thermocatalyst and the other layer comprise a degradable polymer, e.g., a copolymer disclosed herein without the photo or thermocatalyst or with the photo or thermocatalysts and an agent that delays the photo- or thermal-initiated degradation. In another example, a polymer composition comprises a copolymer as disclosed herein, and the polymer composition has a plurality of regions, wherein one region has a photo or thermocatalyst and another region does not. In still another example, a polymer composition can comprise a plurality of polymer layers wherein one layer comprises a photo or thermocatalyst and the other layer comprise a degradable polymer, e.g., a copolymer disclosed herein without the photo or thermocatalyst or with the photo or thermocatalysts and an agent that delays the photo- or thermal-initiated degradation.

Also disclosed herein are various multilayered compositions or devices. In one example, a composition/device can comprise a plurality of layers wherein one layer comprises a copolymer as disclosed herein with a photo or thermocatalyst and the other layer comprise a substrate, e.g., metal, metal alloy, metal oxide, or graphitic oxide, or a non-degradable polymer. The copolymer layer can also comprise photosensitizers and/or chemical amplifiers.

The disclosed multilayer structures can have a variety of different arrangements. For example, the degradable copolymer with photocatalyst can be on top of, covering completed or partially, the layer/region without the photocatalyst, or it can be adjacent to the layer/region without the photocatalyst. In another example, the degradable copolymer can also be sandwiched between layers/regions without the photocatalyst. Conversely, two layers of degradable copolymer can sandwich a layer/region without photocatalyst.

In still other examples, disclosed are multilayered or multi-regioned structures where a degradable polymer having a thermocatalyst is in one layer and a thermal acid generator is in another.

It is also disclosed that the layers in the multilayered composition or device do not have to be discrete layers. Rather, they can be graded layers where the concentration of the constituents within each layer changes gradually from one layer blending into the other layer(s). A gradient in concentration from one layer to another can occur experimentally when fabricating a multilayer structure because the constituents in one layer may partially dissolve the constituents in another layer. Or, the gradient may be intentionally added so that there is not a discrete seam between the two layers. The gradient in concentration may occur with structures with more than two layers, as described above.

Chemical Amplification of the Response into Non-Photosenstive Regions

Constructing devices with the copolymers disclosed herein where a small area can be made photosensitive at the end of fabrication can be highly desirable. The photosensitive region can be limited to a single area at the trigger source (i.e., a photo-catalyst). At this point in the device, the acid or base catalyst can diffuse to other regions which are not photosensitive. However, the diffusion of acid to the non-photosensitive regions of the device is problematic because some of the catalyst can be inadvertently consumed by impurities or other means, and only a limited amount of catalyst can be loaded into a small region. Thus, it is desirable to multiply the number of catalyst species, or chemically amplify the catalyst. Then, the number of catalyst species increases as the catalyst diffuses through the body of the device.

Therefore, in some circumstances it can be desirable to incorporate small molecules within the polymer body of the device that, upon contact with catalyst, will create additional catalyst molecules. This process can be called amplification of the acid catalyst in the non-photosensitive regions. Acid amplifiers are such compounds that can be used to increase the number of acid species created by the trigger source. The loading of the acid amplifier into the non-photosensitive region can thus increase the rate of polymer decomposition, and substantially reduce residue. Furthermore, the amount of catalyst from the trigger source can be reduced.

Thus disclosed herein are various multilayer or multiregioned compositions. In one example, a polymer composition can comprise a plurality of polymer layers wherein one layer comprises a copolymer as disclosed herein with a photocatalyst and the other layer comprise a degradable polymer, e.g., a copolymer disclosed herein with a chemical amplifier (e.g., acid or base amplifier). In another example, a polymer composition comprises a copolymer as disclosed herein, and the polymer composition has a plurality of regions, wherein one region has a photocatalyst and another region has a chemical amplifier. In still other examples, a composition/device can comprise a plurality of layers wherein one layer comprises a photocatalyst and the other layer comprise a degradable polymer, e.g., a copolymer disclosed herein with a chemical amplifier (e.g., acid or base amplifier).

An example of an acid amplifier but not limited to is shown in Formula IV,

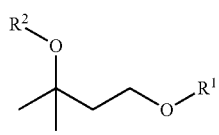

Formula IV where $R^1$ can comprise a number of acid precursors such as sulfonic esters, flouroesters, and carbonic esters; and $R^2$ can comprise a trigger that can contain hydroxyl, methoxy, acetate, carbonic esters, sulfonic esters, and flouro esters.

The acid amplification into other regions for subsequent decomposition and vaporization of the polymer are not limited to light-sensitive applications. It can be desirable to initiate this reaction from a region where the polymer is loaded with acid amplifier so that upon exposure to elevated temperature or a chemical source, acid catalyst will be created from the acid amplifier.

Figure 5:
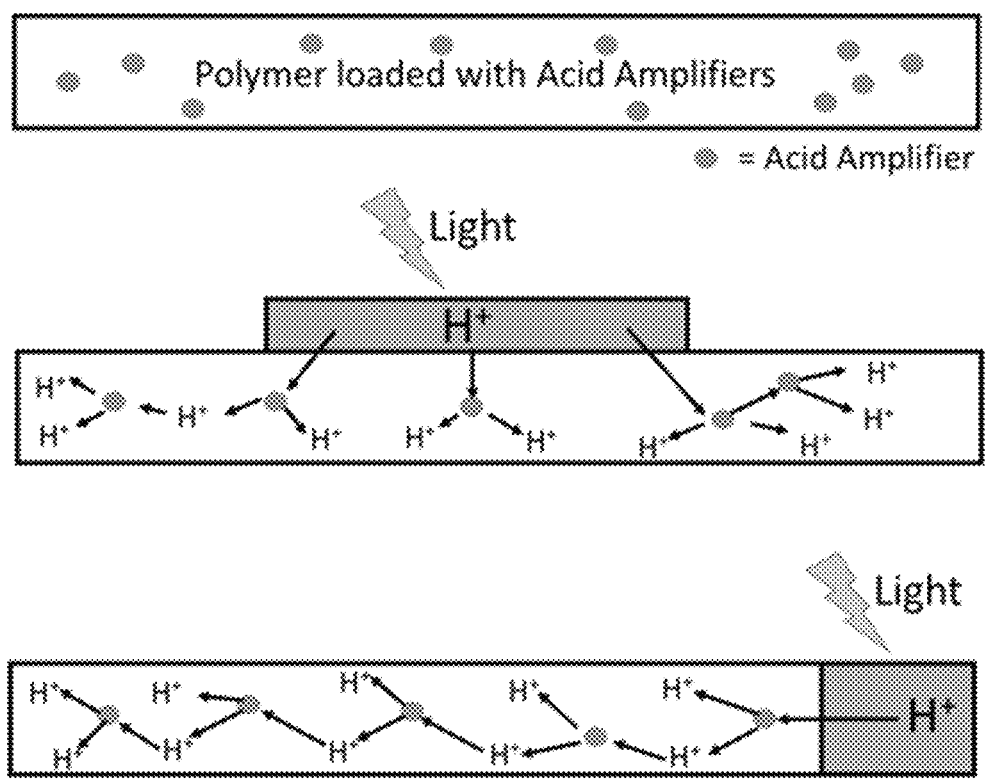
FIG. 5 is a schematic of an exemplary polymer with acid amplifiers and different orientations of photo-catalytic degradation.

FIG. 5 shows a polymer loaded with acid amplifiers. The photo-catalyst can be spray coated onto the top or one end of the non-photosensitive polymer. From exposure of light, acid is generated and amplified through the non-photosensitive regions by acid amplifiers.

Methods of Preparing Polyaldehyde Copolymers

Also disclosed are method of preparing a cyclic copolymer, comprising: contacting phthalaldehyde and one or more different aldehydes in the presence of a solvent and Lew acid catalyst. Specific examples of suitable Lewis acid catalyst include $BF_3$-etherate, $GaCl_3$, $TiCl_4$, $TiF_4$, and $FeCl_3$. In specific examples, the Lew acid catalyst is $BF_3$ or $GaCl_3$. The amount of other aldehydes(s) can vary depending on the intended purpose of the copolymer. For example, the other phthalaldehyde can be present at 30 mol % or more based on total monomer weight (e.g., 35 mol % or more, 40 mol % or more, 45 mol % or more, 50 mol % or more, 55 mol % or more, 60 mol % or more, 65 mol % or more, 70 mol % or more, 75 mol % or more, 80 mol % or more, 85 mol % or more, 90 mol % or more, 95 mol % or more, 97 mol % or more, or 99 mol % or more). In some examples, from 99 mol % or less phthalaldehyde can be used based on the total monomer weight (e.g., 97 mol % or less, 95 mol % or less, 90 mol % or less, 85 mol % or less, 80 mol % or less, 75 mol % or less, 70 mol % or less, 65 mol % or less, 60 mol % or less, 55 mol % or less, 50 mol % or less, 45 mol % or less, 40 mol % or less, or 35 mol % or less). The amount of phthalaldehyde used can range from any of the minimum values described above to any of the maximum values described above. For example, from 30 mol % to 99 mol % phthalaldehyde can be used based on the total monomer content (e.g., from 60 mol % to 99 mol %, from 70 mol % to 97 mol %, from 80 mol % to 95 mol %, from 85 mol % to 99 mol %, from 90 mol % to 99 mol %, or from 80 mol % to 90 mol %).

The ratio of total aldehyde monomers to catalyst used can range from about 1500:1 to about 1:1. For example, ratio of aldehyde monomers to catalyst can be about 1200:1, about 1100:1, about 1000:1, about 750:1, about 500:1, about 100:1, about 50:1, about 10:1, or about 1:1. It has been generally found that the less catalyst used, the higher the molecular weight of the resulting copolymer.

The solvent can be DCM, toluene, or chloroform. The reaction mixture can be left at ambient temperatures or cooled until polymerization is completed. It has been found that the reaction time and temperature have little effect on the copolymer's properties. However, cooling the reaction before catalyst addition can increase the proportion of the other aldehyde in the copolymer.

The resulting copolymer can be precipitated into methanol or hexane. Redissolving the copolymer into THF with a small amount of amine (e.g., triethyl amine) followed by precipitation can be used to purify the copolymer.

The various photocatalysts, thermocatalysts, photosensitizers, chemical amplifiers, freezing point depressing agents, and agents that delay photodegredation can be added to the reaction mixture prior to polymerization or added after polymerization.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention.

Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

PHA was obtained from Alfa Aesar (98% purity) or TCI America (>99%) and sublimated in a nitrogen atmosphere at 45° C. $BF_3$—$OEt_2$ (ca. 48% $BF_3$) was purchased from Acros Organics and used as-received. BA was obtained from Acros Organics and purified by mixing with $CaH_2$ for 16 h followed by distillation over molecular sieves. ACS Reagent-grade dichloromethane (DCM) was obtained from BDH and dried over 3 Å molecular sieves. ACS Reagent-grade hexane, tetrahydrofuran (THF), and methanol were obtained from BDH and used as-received. Triethylamine (TEA) was obtained from AMRESCO and used as-received. $CDCl_3$ (99.5% D with 0.05% v/v TMS) was obtained from Alfa Aesar and used as-received. Rhodorsil-FABA, a photoacid generator (PAG), was provided by Promerus LLC and used as-received.

$^1$H-NMR was performed either in a Bruker Avance III 400 MHz tool or a Varian Mercury Vx 400 MHz tool with $CDCl_3$ as the NMR solvent. Molecular weight and polydispersity (Ð) were determined by gel permeation chromatography in a Shimadzu gel permeation chromatography (GPC) tool equipped with an LC-20 AD HPLC pump and a refractive index detector (RID-10 A, 120 V). THF was used as the GPC eluent with a flow rate of 1.0 mL/min at 35° C. The molecular weight was measured by a calibration curve based on polystyrene standards. Thermal gravimetric analysis (TGA) was performed in a TA Instruments TGA Q50 with a ramp rate of 2° C./min to 250° C. An $N_2$ atmosphere was used with a flow rate of 40 mL/min. Tensile testing was performed on an Instron 5800 using ASTM D882 standard tensile test method for thin polymer sheets.

QCM was performed on a Stanford Research Systems QCM 200. The Butterworth-van-Dyke model was used to describe the mechanical changes of the polymer coating on the quartz crystal. The Sauerbrey equation was used to describe the mass loss due to evaporation at long times. Polymer formulations were made with 10 wt % polymer solids in THF with 10 parts per hundred resin (pphr) of PAG. Thin film samples were spin-coated onto a 2.54 cm QCM with 5 MHz unloaded resonant frequency and an active surface area of 0.4 $cm^2$. An open-faced holder was used to allow exposure of the polymer films with an Oriel Instruments flood exposure source with a 1000 W Hg(Xe) lamp filtered to 248 nm light. An exposure dose of 1000 mJ/$cm^2$ is used for all samples.

Linear Copolymer Synthesis

Phthalaldehyde was purified by sublimation. In a nitrogen rich glovebox, 1 equivalent of n-hydroxysuccinimide and 1000 equivalents of phthalaldehyde were combined with anhydrous THF to bring the phthalaldehyde concentration to about 0.75 M. Next 500 equivalents of distilled butanal were added to the reaction before being sealed and cooled to −78° C. in a dry ice-acetone bath. After 30 minutes 2 equivalents of $P_2$-t-Bu Phosphazene base were added. The polymerization proceeded for 4 hours before being quenched with 2 equivalents of acetic anhydride. The reaction was allowed to sit at −78° C. for 30 minutes before being warmed and precipitated into methanol or hexane.

Cyclic Copolymer Synthesis

The mixtures used in polymer synthesis were prepared in a nitrogen filled glove box. Purified PHA (15 mmol) and BA (7 mmol) were added to a 100 mL round bottom flask with 25 mL dried DCM. A specific amount of $BF_3$—$OEt_2$ was added, and the reaction vessel sealed. The vessel was then submerged in a cold bath at a specified temperature for a specific amount of time followed by the addition of pyridine (2 mmol) to quench the reaction. The polymer was precipitated from the reaction solvent into methanol. The precipitate was redissolved in THF with 0.05 mL TEA per gram of precipitate. This solution was precipitated into hexane. The resulting precipitate was again dissolved in THF with TEA, as described above, and precipitated into methanol. The polymer was dried until constant weight was achieved. The PHA homopolymer was synthesized as described in Schwartz, J. M.; et al. Stable High Molecular-Weight Poly (phthalaldehyde), *J. Polym. Sci. Part A Poly. Chem.* 2016, 55:1166-1172, which is incorporated by reference herein for its teachings of polymer synthesis and conditions.

PHA-BA copolymerization was performed with different catalyst loadings, reaction times, and reaction temperatures. Table 1 shows the yield, polydispersity, number average molecular weight, butyraldehyde ratio in the polymer and aldehyde-to-catalyst ratio (catalyst ratio). The BA uptake in the PHA-BA copolymer was determined by $^1$H NMR by integration of the broad peak from 5.2 to 5.6 ppm that represents the BA polymer ether. The PHA ether backbone has peaks from 6.4 to 7.2 ppm. The ratio between the PHA ether backbone and the BA ether backbone peaks was used to calculate the BA mole percentage in the polymer.

TABLE 1

Reaction results for the copolymerization of phthalaldehyde and butyraldehyde. Catalyst ratio is the moles of aldehyde monomer per mole of catalyst

| Number | T (° C.) | Time (min) | Catalyst Ratio | $M_n$ (kDa) | Đ | Yield | BA mol % |
|---|---|---|---|---|---|---|---|
| 1 | −78 | 120 | 750 | 21.8 | 2.23 | 47% | 8% |
| 2 | −78 | 120 | 187.5 | 17.4 | 3.02 | 60% | 7% |
| 3 | −78 | 120 | 46.5 | 41.5 | 1.79 | 65% | 6% |
| 4 | −78 | 120 | 24 | 48.1 | 1.82 | 66% | 6% |
| 5 | −78 | 120 | 6 | 32.1 | 1.66 | 54% | 5% |
| 6 | −78 | 30 | 750 | 103.5 | 2.27 | 60% | 12% |
| 7 | −87 | 480 | 750 | 26.9 | 1.67 | 36% | 10% |
| 8 | −87 | 1440 | 750 | 34.9 | 1.65 | 15% | 7% |
| 10 | −87 | 2880 | 750 | 29.5 | 1.73 | 33% | 8% |
| 9 | −87 | 4320 | 750 | 23.4 | 1.66 | 50% | 9% |
| 11* | −78 | 30 | 750 | 66.3 | 1.95 | 58% | 12% |
| 12 | −78 | 30 | 1125 | 20.7 | 1.70 | 37% | 18% |
| 13 | −78 | 30 | 1536 | 22.9 | 1.70 | 29% | 19% |
| 14 | −78 | 120 | 3 | 26.2 | 1.56 | 53% | 3% |
| 15 | −78 | 120 | 2 | 18.7 | 1.47 | 42% | 1% |
| 16 | −85 | 30 | 1125 | 44.5 | 1.96 | 66% | 12% |
| 17 | −85 | 3830 | 1125 | 57.6 | 2.06 | 62% | 7% |
| 18 | −85 | 30 | 750 | 25.3 | 1.93 | 53% | 6% |
| 19 | −85 | 30 | 1125 | 26.0 | 2.01 | 72% | 9% |
| 20 | −85 | 60 | 1000 | 32.8 | 2.11 | 41% | 10% |
| 21 | −78 | 60 | 750 | 45.4 | 1.68 | 57% | 2% |

The reaction time and temperature did not have a significant effect on the polymer properties. The temperatures were well below the ceiling temperature of PHA polymer, which was shown to produce polymer with high yield. Long polymer reaction times were not expected to affect the polymerization reaction because it was found that polymer equilibrium could be achieved within 30 min (Id.; Kaitz, J. A.; et al., Dynamic Covalent Macrocyclic Poly(phthalaldehyde)s: Scrambling Cyclic Homopolymer Mixtures Produces Multi-Block and Random Cyclic Copolymers. *Macromolecules* 2013, 46(20):8121-8128). Experiment numbers 6 to 9 in Table 1 show that extending the reaction time from 30 to 4320 min did not have a significant effect on the synthesis. It was previously shown that equilibrium was achieved within 30 min for PHA homopolymer. (Schwartz, et al., *J. Polym. Sci. Part A Poly. Chem.* 2016, 55:1166-1172). The ability of $BF_3$ to randomly open and close aldehyde bonds during polymerization has been shown previously (Kaitz, et al., *Macromolecules* 2013, 46(20): 8121-8128). However, Table 1 shows that only a limited amount of BA incorporation into the polymer was achieved. The molecular weight tended to be higher with less catalyst (i.e., higher monomer to catalyst ratio, Catalyst Ratio in Table 1), however, there is considerable scatter in the data. This lack of a clear trend of molecular weight with monomer-to-catalyst ratio can be understood by considering the role of $BF_3$ in the polymerization. $BF_3$ not only initiates the polymerization, it also opens polymer ether bonds and inserts additional monomer units into the growing polymer.

Figure 6:
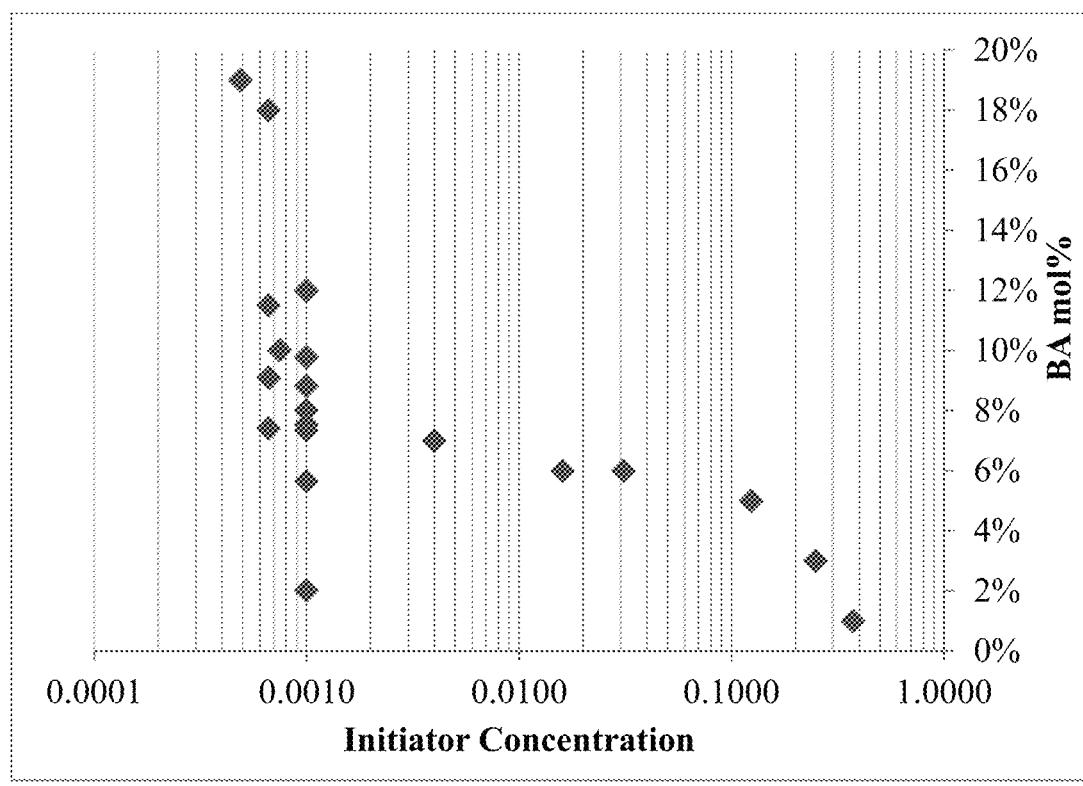
FIG. 6 is a graph of butyraldehyde mol % versus initiator concentration for the copolymerization of phthalaldehyde and butyraldehyde.

It can be desirable to increase the BA ratio in the PHA-BA copolymer so as to improve the vaporization rate of after depolymerization. Lower catalyst loadings (i.e., higher monomer-to-catalyst ratio) favors higher incorporation of BA in the copolymer. FIG. 6 shows the BA mol % versus $BF_3$ concentration on a log scale. More catalyst appears to negatively affect the ability of BA to copolymerize. One possible explanation is the availability of large amounts of catalyst facilitates formation of the BA trimer. Once the BA trimer forms, it is likely less active in the copolymerization with PHA because $BF_3$ does not depolymerize the BA trimer like it does the growing PHA polymer. Another possible explanation is that the catalyst has a much stronger preference for the PHA. $BF_3$ actively opens the growing polymer chain and inserts additional PHA monomer units, which may be favored over BA. This has the net effect of forcing BA out of the growing polymer chain.

Higher incorporation of BA into the copolymer can be desired. Additional reactions were performed to explore ways to increase the BA concentration in the polymer. Avoiding the formation of BA trimer may be one approach to the increasing the BA mole ratio in the copolymer. One method to avoid BA trimer is to rapidly cool the reaction below the $T_c$ of PHA, or to cool the reaction before addition of catalyst. A reaction solution was prepared as described above without catalyst. The reaction solution was brought to the reaction temperature of −78° C., and the catalyst added (750:1 ratio). The reaction was allowed to proceed for 30 min followed by quenching with pyridine. This reaction produced polymer with 12 mol % BA, which is toward the high end of the variation observed with the standard polymerization method.

Another reaction mixture without catalyst was frozen with liquid nitrogen before addition of catalyst. The reaction was allowed to warm to −78° C. until the monomer redissolved followed by addition of pyridine. There was a total of 9 min between the addition of catalyst and quenching with pyridine. The polymer formed by this method contained 16 mol % BA, which is at the high end of the BA mole ratio within the experiments performed in Table 1.

One challenge is to use the BA trimer which forms prior to PHA polymerization in the copolymer to produce a BA-rich copolymer. Additional experiments were performed by changing the polymerization temperature to allow equilibrium of the BA trimer to occur, Table 2 (Hashimoto, K.; et al., Equilibrium Cyclotrimerization of N-Butyraldehyde. *J. Polym. Sci.* 1977, 15(7):1609-1618). One reaction was held at −24° C. for 19 hours and quenched in an attempt to form BA-rich polymer. Another was held at −24° C. for 20 hours, followed by slowly lowering the temperature to −85° C. at a rate of 0.5° C./min to facilitate PHA incorporation. The mixture was quenched after 10 min. A third mixture was held at −40° C., just below the PHA ceiling temperature, for 1 h to encourage BA incorporation over PHA. A fourth mixture was held at −40° C. for 30 min in an attempt to incorporate a lower amount of PHA because PHA polymerization is incomplete at this temperature. This was followed by slowly lowering the temperature to −85° C. at a rate of 0.5° C./min to facilitate additional incorporation of PHA, and quenching after 10 min. As shown in Table 2, there was no improvement in the incorporation of BA. There was little or no BA in the polymer and the yield for each was near zero. Reacting the mixtures for prolonged time near the PHA ceiling temperature is detrimental to polymer formation. This is somewhat surprising because each of the monomers by themselves are reversible with $BF_3$—$OEt_2$ as the catalyst. It is possible that very low molecular weight polymer was formed but could not be precipitated under the conditions used.

TABLE 2

Reaction results for warmer copolymerization of phthalaldehyde and butyraldehyde.

| Number | Temp (° C.) | Time (min) | Catalyst Ratio | Yield | BA mol % |
|---|---|---|---|---|---|
| 1 | −25 | 1140 | 500 | 0% | n/a |
| 2 | −25/−85 | 1200/10 | 500 | 4% | 3% |
| 3 | −40 | 60 | 500 | 0% | n/a |
| 4 | −40/−85 | 60/10 | 500 | 5% | 7% |

The PHA is known to establish a stable complex with $BF_3$. The preference of the catalyst for PHA over BA appears to be a limiting factor in the mechanism and incorporation of BA in the copolymer. Preference of one $BF_3$ complex over another could be attributed to the enthalpy of complex formation. It is also possible that the high molecular weight copolymer with a large mole fraction of BA creates the same crystallinity problems that are observed with the BA homopolymer.

An initiator and terminator were used in the anionic synthesis of linear polyaldehyde copolymers. Phthalaldehyde was purified by sublimation. In a nitrogen purged glovebox, 1 equivalent of n-hydroxysuccinimide and 1000 equivalents of phthalaldehyde were combined with anhydrous THF to bring the phthalaldehyde concentration to about 0.75 M. Next 500 equivalents of distilled butanal were added to the reaction before being sealed and cooled to −78° C., such as in a freezer or dry ice-acetone bath. After 30 minutes, 2 equivalents of P2-t-Bu Phosphazene base were added. The polymerization proceeded for 4 hours before being quenched with 2 equivalents of acetic anhydride. The reaction was allowed to sit at −78° C. for 30 minutes before being warmed and precipitated into methanol or hexane.

It is noted that while the present example focuses on PHA with BA, the synthesis of other copolymers with different aldehydes besides BA will proceed in a similar fashion.

Depolymerization Rate

Determination of the rate of depolymerization and evaporation separately for the BA-PHA copolymer is difficult. Differential scanning calorimetry provides some information regarding the depolymerization energy, but it also captures the heat of evaporation and melting for conversion of the polymer to monomer. Thermal gravimetric analysis can also be used; however, exposure of the polymer to acid prior to measuring mass changes creates either an increase in mass when an acid vapor is used or extraordinarily long exposure times when a PAG is used.

A QCM was used to differentiate the depolymerization reaction from monomer evaporation. The Butterworth-van Dyke equivalent circuit model for the electrical response of a QCM crystal provides information on the softening (i.e., depolymerization) and evaporation (i.e. mass loss) of the polyaldehyde films. The mass change can be monitored by the change in frequency (inductive changes) as a consequence of addition or removal of mass. The depolymerization rate can be monitored by the change in QCM resistance, corresponding to changes in viscosity. As the polyaldehyde depolymerizes and forms a liquid, a sharp rise in the resistance of the QCM is observed as a consequence of viscous losses during oscillation. The liquid formation also causes a decoupling of the mass from the frequency response in the quartz crystal, giving an apparent decrease in the recorded mass. The frequency recovers as the liquid monomer eventually solidifies due to the removal of heat by evaporation and convection, which also returns the resistance to a minimum value. The resistance changes are used to determine the depolymerization rate, and the frequency changes are used to determine the evaporation time.

Figure 7:
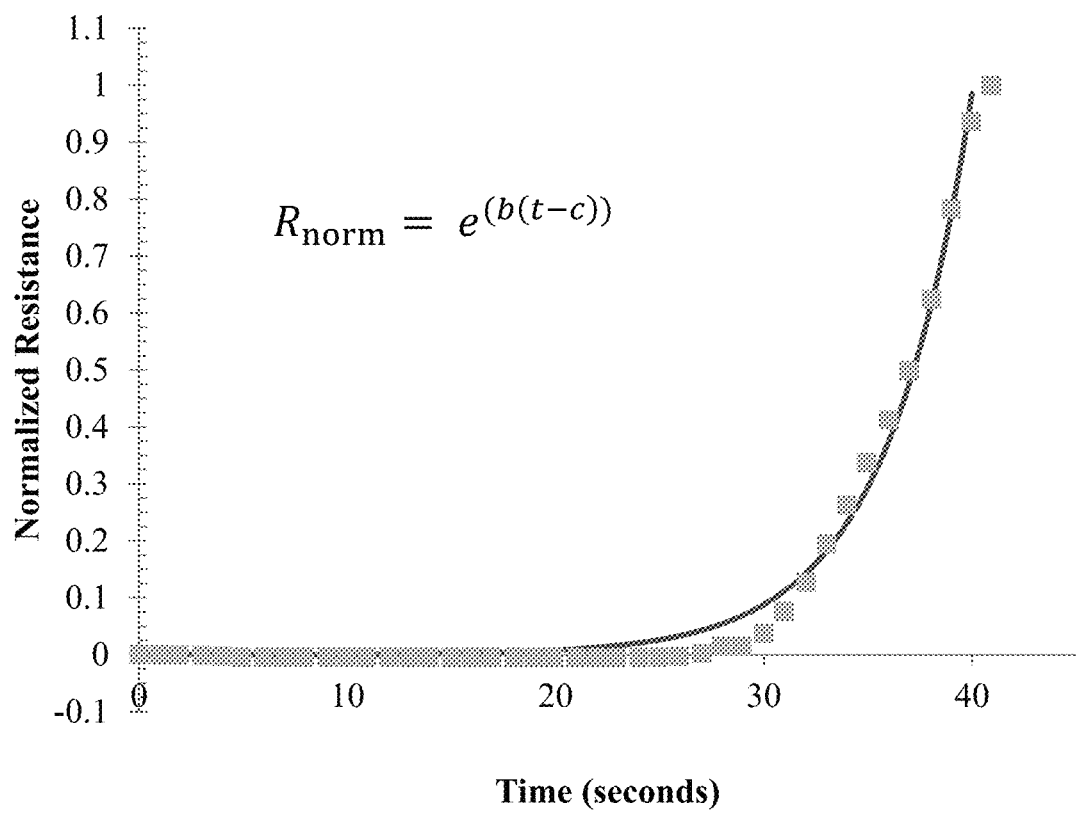
FIG. 7 is a graph of representative QCM resistance for the depolymerization of a butyraldehyde copolymer, 6 mol % BA and 41.5 kDa.

The resistance was normalized to the maximum observed value within each measurement to compare changes across multiple samples. The time was zeroed to the moment of photo-exposure, which created the photoacid from the PAG and initiated the depolymerization. The depolymerization was often complete part way into the photo-exposure of the PAG. The time to complete depolymerization was taken as the point of maximum QCM resistance. The resulting data was fit to an exponential curve of the form $R_{norm}=\exp(b(t-c))$, where $R_{norm}$ is the normalized resistance, t is time in seconds, and b and c are fitting parameters. Both parameters can provide quantitative values for the physical occurrence of depolymerization with b being the rate of depolymerization and c being the delay in the response to light irradiation. FIG. 7 shows the normalized resistance from QCM versus time in seconds for the depolymerization of polymer 3 in Table 1. The best fit line, obtained by minimizing the sum of squared error, for an exponential equation of the form above is also shown.

Figure 8:
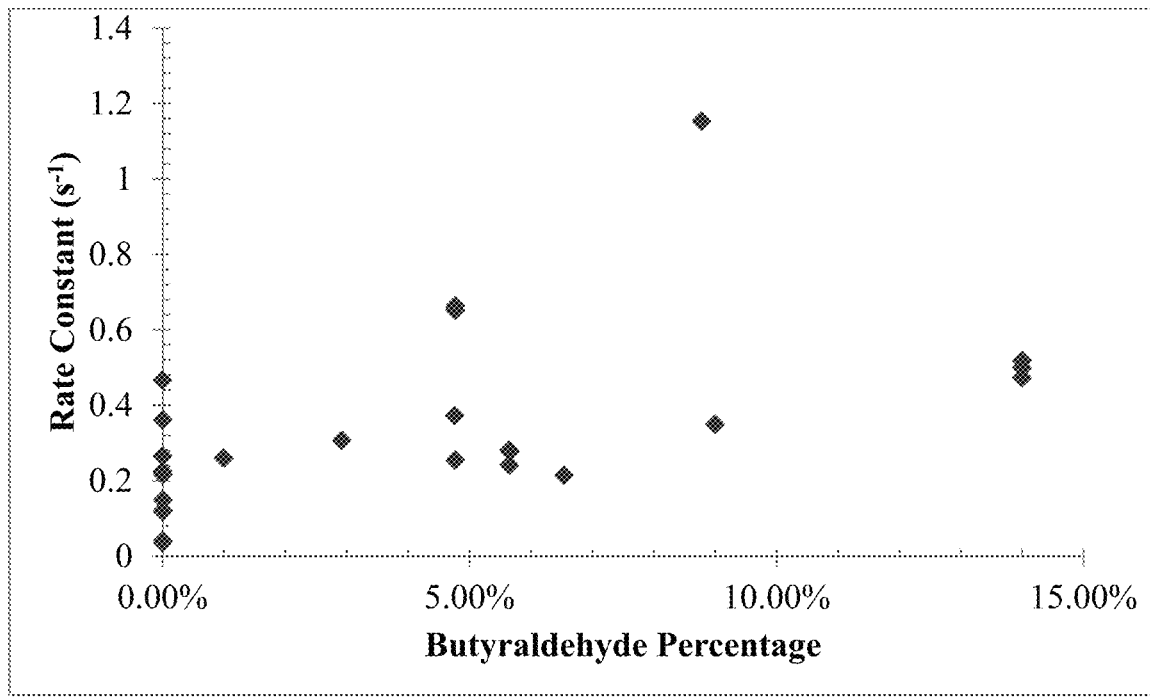
FIG. 8 is a graph of QCM resistance rate constant versus butyraldehyde percentage for the photoacid catalyzed depolymerization of copolymer films.
Figure 9:
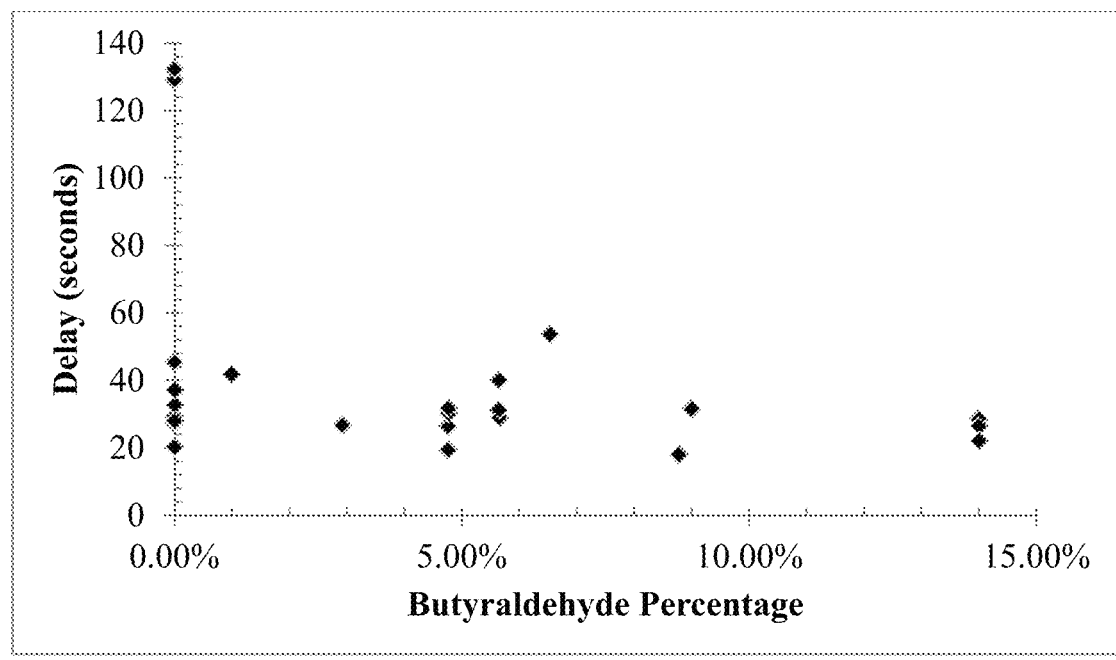
FIG. 9 is a graph of QCM resistance delay versus butyraldehyde percentage for the photoacid catalyzed depolymerization of copolymer films.

The best fit parameters for the data shown in FIG. 7 are 0.24 $s^{-1}$ and 40 s for b and c, respectively. A larger b parameter implies a faster depolymerization rate. A smaller c implies a higher sensitivity to acid, which is desirable to ensure complete depolymerization of the polyaldehyde. The b and c parameters for many samples were compared to determine trends in the depolymerization of the polyaldehydes versus butyraldehyde content. FIG. 8 shows the depolymerization rate constant, b, versus butyraldehyde mol %. An increase in butyraldehyde mole fraction generally trends towards a higher rate constant, which is desired. However, there is considerable scatter in the data. FIG. 9 shows the delay, c, versus butyraldehyde mol %. An increase in butyraldehyde percentage does not affect the delay.

A higher mol % of butyraldehyde in a copolymer likely increases the depolymerization rate by increasing acid diffusion because BA is a low viscosity liquid at room temperature whereas PHA is either a solid or high viscosity liquid. As a copolymer depolymerizes into PHA and BA, the liquid BA can help acid diffuse to unreacted polymer chains. The PHA also liquefies during depolymerization as well due to the highly exothermic reaction, but BA promotes acid diffusion by maintaining the liquid state longer than the time for PHA to solidify. The benefit of this liquid state becomes more apparent as thicker films of polymer are used. The delay shown in FIG. 9 is unaffected by the BA content, because it is not a function of the polymer matrix. Rather, it is dependent on the type and amount of PAG used.

The benefit of incorporating BA into the copolymer is seen in the evaporation time, as determined by QCM, of the depolymerized polymer. A homopolymer of PHA takes 2.5 days for 90 wt % of the monomer to evaporate after depolymerization. The copolymer of PHA and BA evaporated in 5.25 h, which is an order of magnitude improvement.

Figure 10:
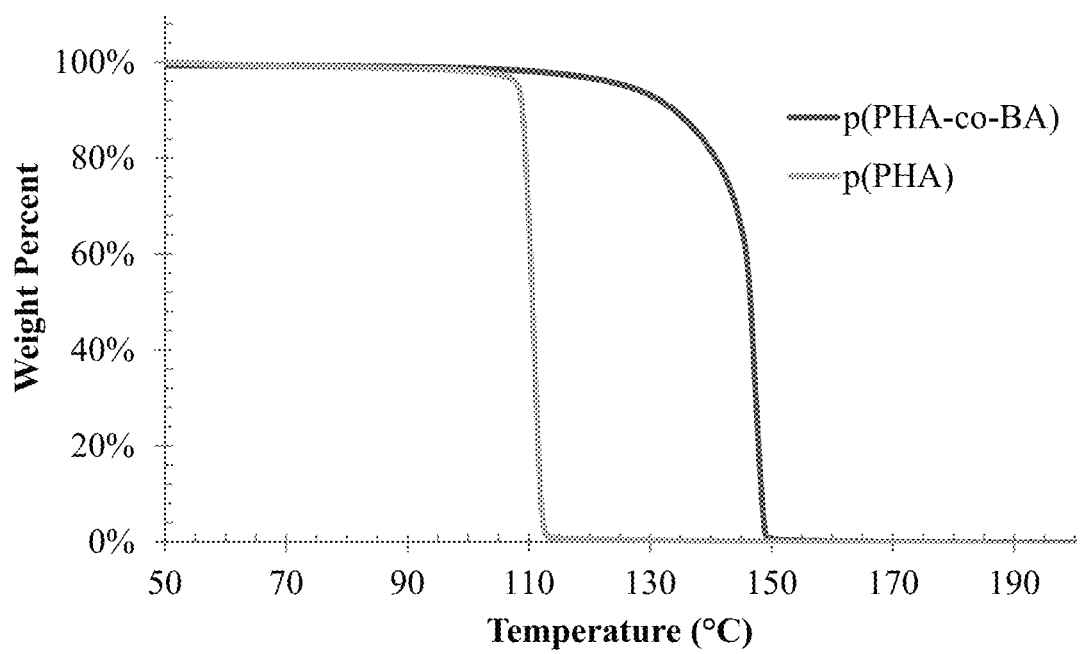
FIG. 10 is a graph of dynamic TGA of a homopolymer of phthalaldehyde (61 kDa) and the copolymer of phthalaldehyde and butyraldehyde (12 mol % BA, 66 kDa).

An unintended consequence of the incorporation of BA is the increase of the thermal stability of the polyaldehyde, irrespective of the BA incorporation level. The representative dynamic TGA curves of a PHA homopolymer and a BA-PHA copolymer are shown in FIG. 10. The homopolymer has a molecular weight of 63 kDa. The copolymer has a molecular weight of 66 kDa and a BA incorporation of 12 mol %. The onset of thermal degradation is 107° C. for the homopolymer and 141° C. for the copolymer.

Mechanical Properties

The mechanical properties of the copolymer are important for applications when it will be used as a structural material. Table 3 shows a comparison of the Young's modulus and elongation at break of PHA homopolymer and BA-PHA copolymers. There is a decrease in modulus and an increase in elongation at break with BA incorporation. This is likely due to a difference in the polymer packing as a result of the increased degrees of freedom of an aliphatic monomer.

TABLE 3

Tensile data for a homopolymer of phthalaldehyde and PHA-BA copolymers.

| $M_n$ (kDa) | Đ | BA mol % | Modulus (GPa) | Elongation to Break (%) |
|---|---|---|---|---|
| 25.3 | 1.93 | 6 | 0.76 | 1.10 |
| 26.0 | 2.02 | 9 | 1.50 | 0.40 |
| 32.8 | 2.11 | 10 | 1.61 | 0.70 |
| 44.5 | 1.96 | 12 | 1.34 | 0.65 |
| 45.4 | 1.69 | 2 | 1.30 | 0.70 |
| 57.6 | 2.06 | 7 | 1.63 | 1.20 |
| 57.8 | 1.64 | — | 1.57 | 0.40 |
| 91.7 | 1.68 | — | 1.79 | 0.37 |
| 123.0 | 1.71 | — | 1.46 | 0.78 |
| 157.0 | 1.57 | — | 2.38 | 0.40 |
| 170.0 | 1.51 | — | 1.72 | 0.35 |
| 181.4 | 1.50 | — | 2.11 | 0.40 |
| 192.8 | 1.48 | — | 1.59 | 0.95 |
| 216.0 | 1.49 | — | 1.76 | 0.43 |

Chemical Functionalization

Figure 19:
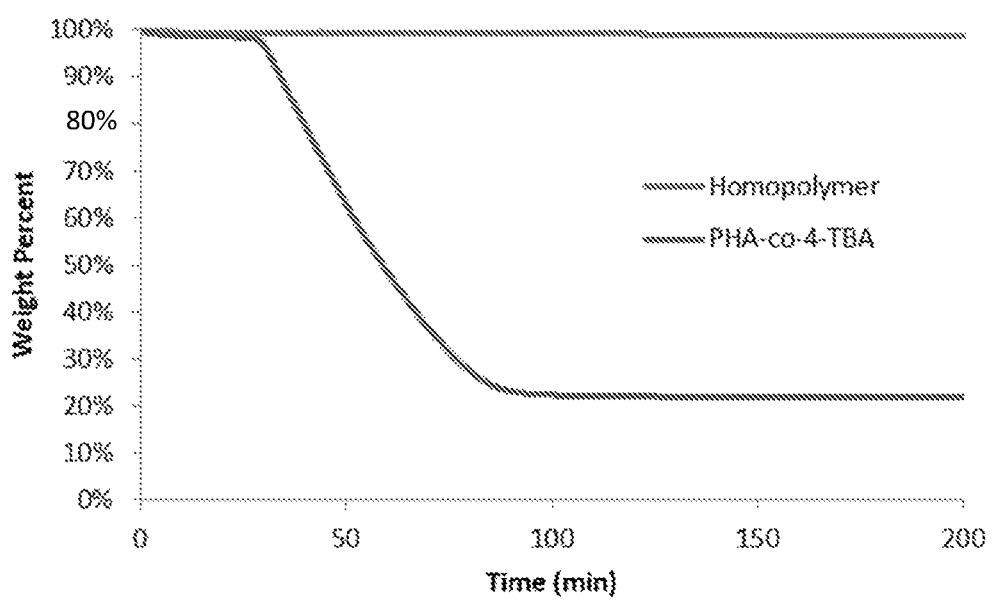
FIG. 19 is a graph of 70° C. isothermal mass loss versus time for homopolymer and copolymer with tethered acid generator.

Chemical functionality can be imparted on the copolymers of aldehydes to alter mechanical and/or thermal properties of the resultant polymer matrix. In this example, an aldehyde monomer with a tethered tosyl ester, 4-tosyloxybutyraldehyde (4-TBA), was incorporated into a copolymer with phthalaldehyde. The purpose of incorporating 4-TBA into a polyaldehyde was to provide a releasable acid capable of depolymerizing the polymer and increasing degradation kinetics. The amount of acid should amplify as more depolymerized monomer units are formed. The thermal decomposition of the 4-TBA copolymer confirms this when isothermal conditions are used. FIG. 19 is the 70° C. isothermal TGA mass loss versus time for PPHA and the copolymer of PHA and 4-TBA. The depolymerization of the 4-TBA copolymer is orders of magnitude faster than that of phthalaldehyde homopolymer.

Photosensitizer Synthesis

The visible light photosensitizers can be synthesized from their corresponding quinones and phenylacetlyene derivatives.

5,12-bis(phenylethynyl)tetracene (BPET)

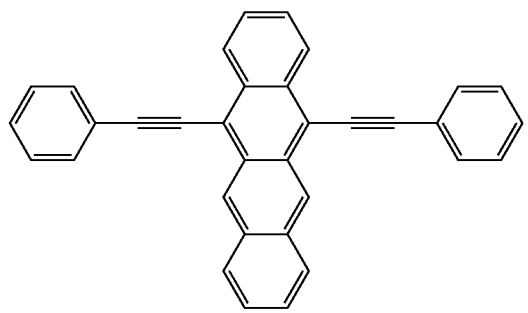 [SMILES: C(#Cc1c2ccccc2c(C#Cc2ccccc2)c2cc3ccccc3cc12)c1ccccc1]

2.05 equivalents of phenylacetylene dissolved at 0.91 M in anhydrous tetrahydrofuran in a flame dried round bottom flask with an argon atmosphere. The solution was cooled to −78° C. before adding 2.02 equivalents of n-butyllithium slowly via a syringe. The reaction vessel was stirred at room temperature for 30 minutes before being cooled to −78° C. 1 equivalent of 5,12-tetracenedione were with anyhdrous tetrahydrofuran to the reaction mixture. After stirring at room temperature for 60 minutes, the reaction was dripped into a 0.78 M concentration solution of tin(II)chloride dihydrate in 10% HCl solution. The solution stirred for 90 minutes before vacuum filtering the crystalline product from the solution. The dark crystals were washed with water, acetone, isopropanol and ethyl acetate.

The following photosensitizers were synthesized with similar methods.

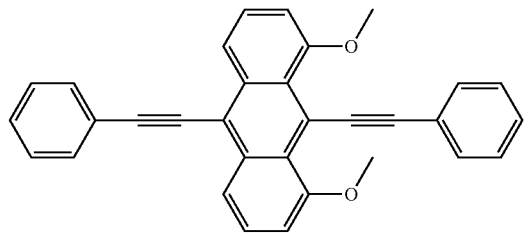

1,8-dimethoxy-9,10-bis(phenylethynyl)anthracene (DMBA)

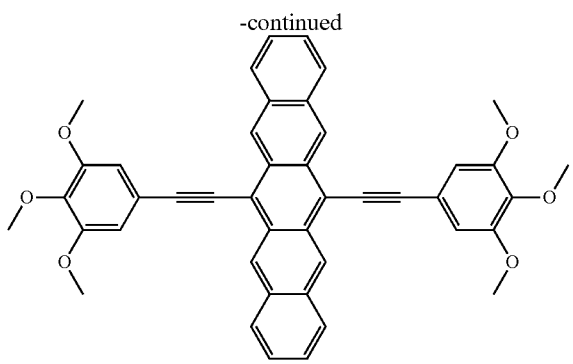

6,13-bis(3,4,5-trimethoxyphenylethynyl)pentacene (BTMP)

Photosensitizer Stability

DMBA, BPET, and BTMP shelf life stability was monitored over a 8 week period. The crystalline sensitizers were stored in clear glass scintillation vials covered with a lab wipe and a rubber band to allow the samples to experience the laboratory atmosphere and be exposed to ambient light. $^1$H-NMR was periodically conducted on the samples over an eight-week period. The samples showed minimal degradation, most likely due to oxidation. The more red shifted sensitizers experienced more damage in the order of BTMP>BPET>DMBA.

Figure 11:
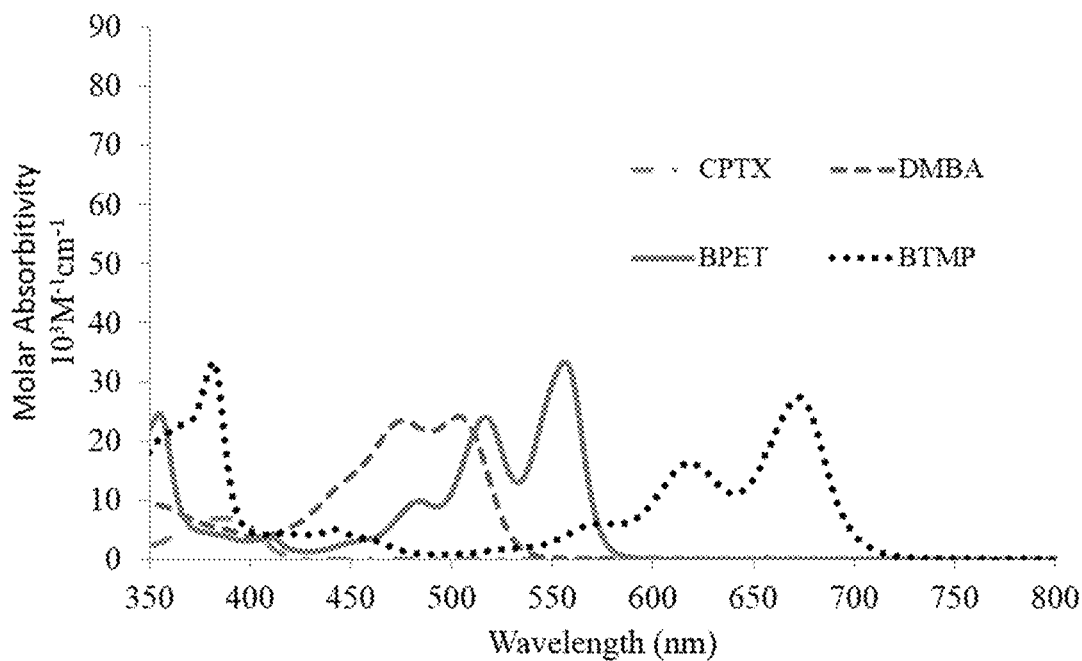
FIG. 11 is a molar absorptivity plot of sensitizers.

The optical properties of the modified acenes were investigated by UV/Vis absorption in dimethylformamide (DMF) as shown in FIG. 11. The four sensitizers of CPTX, DMBA, BPET, and BTMP exhibit strong absorption bands from the near UV into the visible region at 387 nm, 504 nm, 556 nm, and 674 nm, respectively. The three sensitizers that absorb into the visible region display strong molar extension coefficients between 24 to 33 $10^3 M^{-1}$ cm$^{-1}$, which is 3-4 times more than the molar extinction coefficient of CPTX of 6.9 $10^3 M^{-1}$ cm$^{-1}$. However, all absorption bands are significantly red-shifted than their unmodified acene counterparts (anthracene, tetracene, pentacene) due to the halogenation of the acene core and the extension of the π-conjugated system by the appending of phenylethynyl groups.

Photosensitivity of Sensitized Polymer Films

Figure 12:
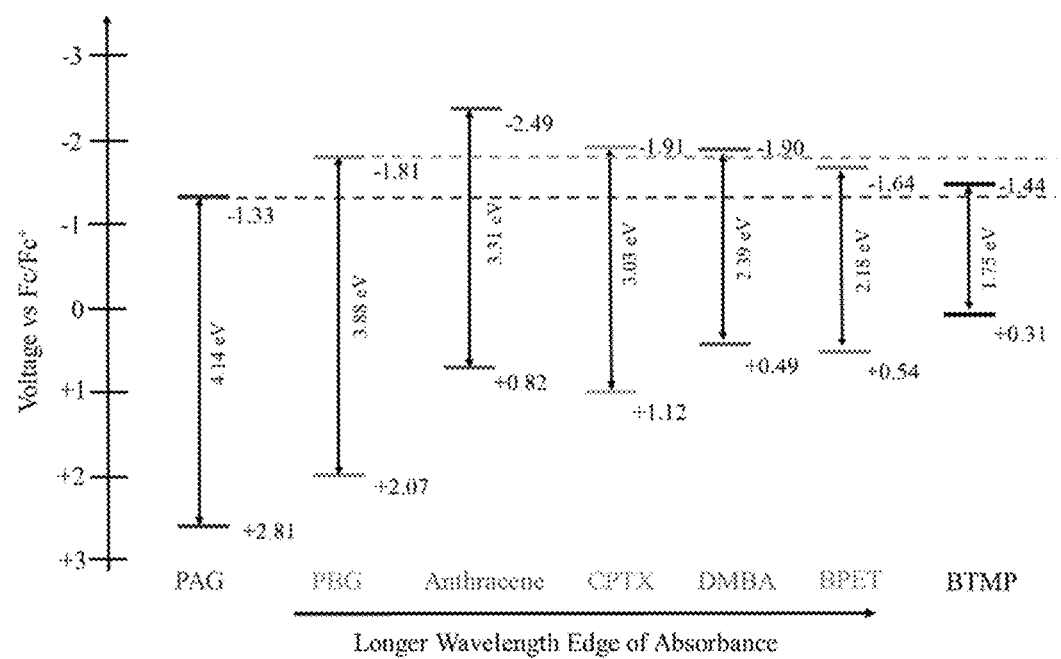
FIG. 12 is a graph showing molecular orbitals of FABA-PAG, TBD-PBG, and modified acenes.

The absorption spectrum of photosensitizers was also investigated on an ultraviolet light-visible (UV/vis) tool, as shown in FIG. 12. Formulations of all polymer solutions with sensitizer and photo-acid/base generator were mixed on a ball roller for 12 hours. Photosensitizer to PAG molar ratios of 1.2:1 were maintained for all formulations. Films were spin-coated onto quartz wafers for UV/vis measurements.

The favorability of electron transfer is determined by the oxidation and reduction potential of the ground and excited states. In this case, the oxidation potential of sensitizer can be compared with the reduction potential of the PAG, thereby giving a free-energy value that can be evaluated by thermodynamic feasibility. The thermodynamic feasibility for the electron-transfer photosensitization of the modified photosensitizer with photo-acid/base generators can be evaluated by the Gibb's energy of photoinduced electron transfer equation (Wallraff, G. M.; et al., "A Chemically Amplified Photoresist for Visible Laser Direct Imaging," *J. Imag. Sci. Technol.* 1992, 36:468-476):

$$\Delta G = (E_{ox}^{1/2} - E_{red}^{1/2}) - E_{oo}$$

The half-wave oxidation potential ($E_{ox}$) and the optical band gap ($E_{oo}$) of the sensitizer was compared with the half-wave reduction potential ($E_{red}$) of the photo-acid/base generator. Photo-acid/base generators with very low reduction potentials are desired as electron-transfer can be favorable with photosensitizers of a wide range of oxidizing powers. If the Gibbs free energy is less than zero ($\Delta G<0$) then the photo-induced electron transfer is favorable. In other words, the lowest unoccupied molecular orbital (LUMO) of the sensitizer must be higher than the LUMO of the photo-acid/base compound for electron-transfer to occur. Cyclic voltammetry can be used to record the redox potentials of the sensitizers and photo-acid/base generators vs ferrocene (Fc/Fc+) as an internal standard. UV-vis can be used to evaluate the optical band gap of the sensitizers as the long wavelength edge of absorbance. Redox potentials and band gaps are reported in Table 4. Molecular orbitals are also plotted in FIG. 13.

TABLE 4

Sensitizer properties of modified acenes for photo-induced electron transfer of photo-acid/base generators. The photosensitizers in this table are: 1,8-dimethoxy-9,10-bis(phenylethynyl)anthracene (DMBA), 6,13-bis(3,4,5-trimethoxyphenylethynyl)pentacene (BTMP), 5,12-bis(phenylethynyl)tetracene (BPET), 1-Chloro-4-propoxythioxanthone (CPTX), 4-methylphenyl[4-(1-methylethyl) phenyl] tetrakis(pentafluorophenyl) borate (FABA-PAG), 1,5,7 triaza-bicyclo [4.4.0] dec-5-ene tetraphenylborate (TBD-PBG).

| Photo-sensitizer | $E_{oo}$ (nm) | $E_{oo}$ (eV) | $E_{ox}$ (V) vs Fc/Fc$^+$ | FABA-PAG $\Delta G$ (eV) | FABA-PAG $\Delta G$ (kcal/mol) | TBD-PBG $\Delta G$ (eV) | TBD-PBG $\Delta G$ (kcal/mol) |
|---|---|---|---|---|---|---|---|
| Anthracene | 375 | 3.31 | 0.82 | −1.15 | −26.57 | −0.67 | −15.55 |
| CPTX | 410 | 3.03 | 1.12 | −0.58 | −13.35 | −0.10 | −2.32 |
| DMBA | 520 | 2.39 | 0.49 | −0.56 | −12.94 | −0.08 | −1.92 |
| BPET | 570 | 2.18 | 0.54 | −3.01 | −7.07 | 0.17 | 3.95 |
| BTMP | 710 | 1.75 | 0.31 | −0.10 | −2.36 | 0.38 | 8.66 |

Photoinduced electron-transfer of all acenes with the FABA-PAG are thermodynamically favorable from the Table 4. This is owed to the low reduction potential or LUMO level of the iodonium salts. However, electron-transfer becomes less favorable as the modified acenes become more red-shifted. The change in Gibbs free energy value is an order of magnitude lower for BTMP ($\Delta G=-2.36$ eV) that absorbs out to 710 nm as opposed to anthracene ($\Delta G=-26.57$ eV) that absorbs only to 375 nm. The photo-induced electron transfer of sensitizers with PBG were not thermodynamically favorable for two of the most red-shifted sensitizers, BPET ($\Delta G=3.95$ eV) and BTMP ($\Delta G=8.66$ eV). This is a consequence of a higher reduction potential or LUMO of the TBD-PBG (−1.88 V vs Fc/Fc+) as opposed to the FABA-PAG (−1.33 V vs Fc/Fc+). Electron transfer from sensitizers is more favorable for photo-acid/base generators with lower LUMO levels.

Contrast curves (FIG. 13) were generated from natural sunlight in Atlanta, Ga. between the hours of 11 am to 1 pm. A variable density mask filter (Model 400 F.S.) was used from Opto-line. Square band-pass filters of 50.8×50.9 mm at wavelengths of 500 nm, 560 nm, and 650 nm were purchased. All filters had a 10±2 nm full-width half-max value. Formulations of PPC films, sensitizer, and photo-acid/base generator were spin-coated onto silicon wafers where the variable density mask filter and corresponding bandpass filter were placed on-top. The intensity of sunlight was recorded with a photometer.

Figure 13:
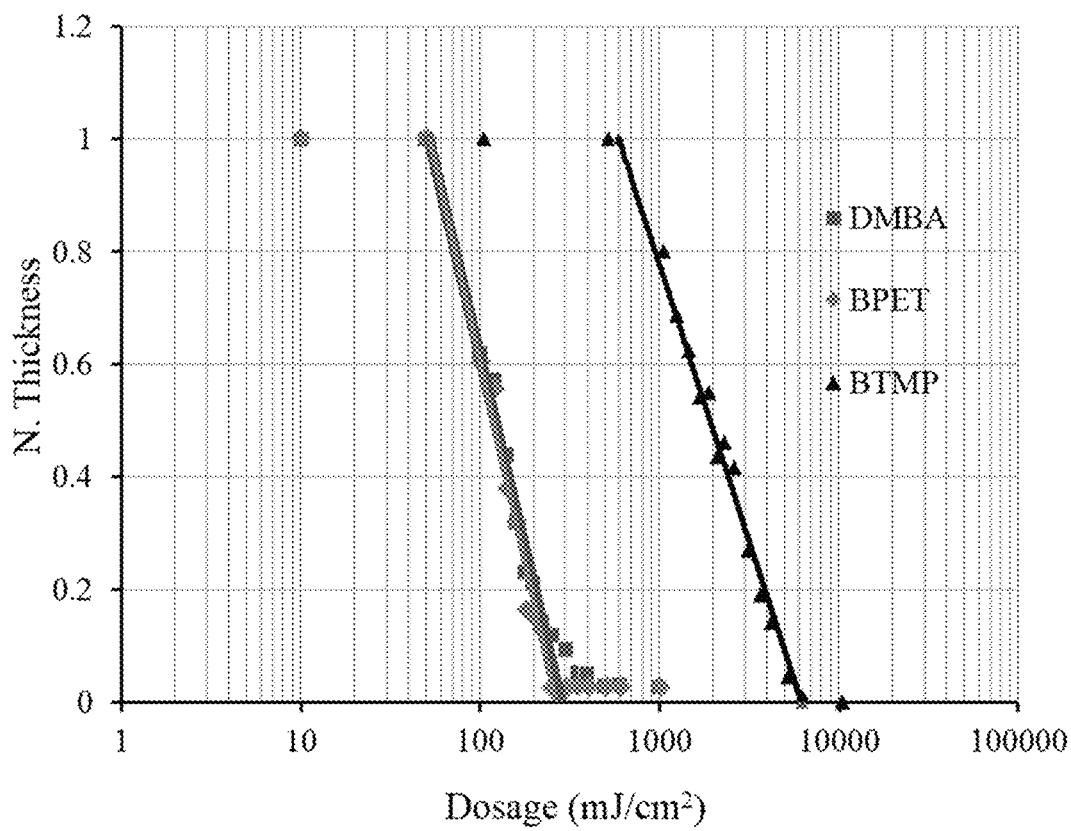
FIG. 13 contains contrast curves of films of PPC with 3 pphr PAG with the following sensitizers: DMBA, BPET, BTMP.

In FIG. 13, the normalized thickness of the film was plotted where each point relates to the transmission of light from 1% to 100% through the variable neutral density mask. The full intensity of light (100% transmission) through the bandpass filters at 500 nm, 560 nm, and 650 nm were recorded from a photometer as 1.38 mW/cm$^2$, 1.40 mW/cm$^2$, and 1.45 mW/cm$^2$ respectively. The linear region was extrapolated to zero on the x-axis where the dosage value was taken as the (D100) or minimum dose required to expose through the entire film. Films of DMBA and BPET recorded a similar minimum dose of 282 and 264 mJ/cm$^2$ to expose through the entire film. However, BTMP recorded a minimum dose of 6,177 mJ/cm$^2$. The BTMP films exposed to the most red-shifted peak is almost 22 times less sensitive than films sensitized with DMBA or BPET. This is expected, as the thermodynamic favorability of the electron-transfer from BTMP to PAG is nearly unfavorable compared to the other sensitizers. The short band gaps of BTMP (1.75 ev) can easily lose its excited state from an absorption of a photon by vibrational decay and back—electron processes to its HOMO level.

Surprisingly, contrast curves with 1.5 pphr TBD-PBG and BPET were successfully generated in films of PPC exposed to sunlight under the 560 nm bandpass filter. The photo-induced electron transfer of BPET to TBD-PBG should not be thermodynamically favorable as the ΔG=+3.95 eV. The dielectric medium for the photo-induced electron transfer may potentially play an important role due to columbic interactions. There is a fourth term in the Rehm Weller Equation free energy for electron-transfer that is often neglected. The last term ($-e^2/\varepsilon d$) corresponds to the coulombic attraction energy where ε is the dielectric constant and d is the distance between charges of the ion pair. The redox potentials are typically recorded and measured in high dielectric (such as DMF and acetonitrile). However, photo-induced electron-transfer are taking place in polymeric films. Most polymers with typical hydrocarbon backbones have dielectric constants between 2-3, an order of magnitude lower than that of DMF.

Figure 14:
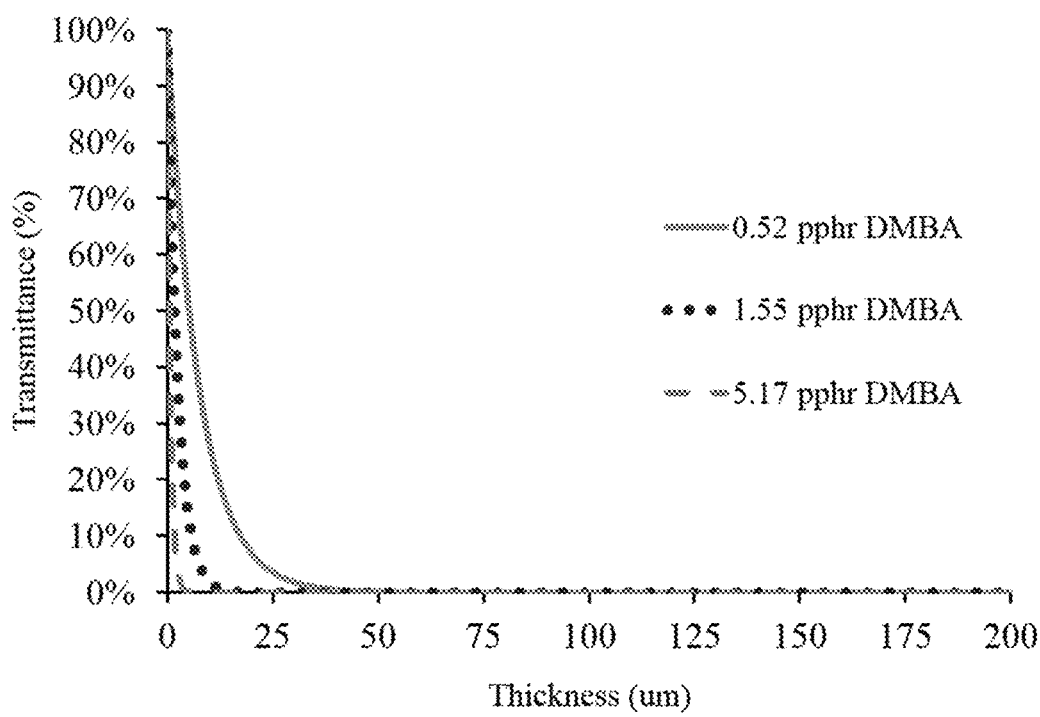
FIG. 14 is a graph of transmittance as a function of thickness for various loadings of DMBA in PPHA films at 480 nm.
Figure 15:
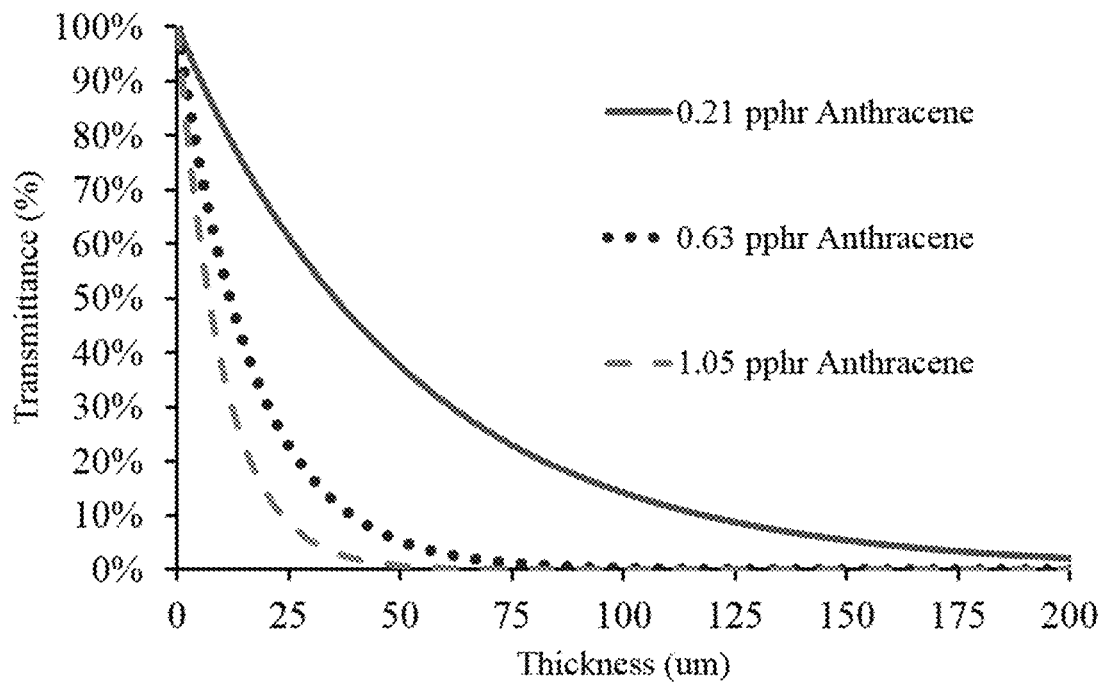
FIG. 15 is a graph of transmittance as a function of thickness for various loadings of anthracene in PPHA films at 363 nm.

The path length of films with anthracene and DMBA was investigated in films of PPHA in FIGS. 14 and 15, respectively. Transmittance of light as a function of thickness was plotted of 0.52 pphr, 1.52 pphr, and 5.17 pphr loadings for DMBA in PPHA film and 0.21 pphr, 0.63 pphr, and 1.05 pphr for Anthracene in PPHA films. The lowest loadings of sensitizers generated in this plots are the molar equivalent of each other.

The optical path length of anthracene and DMBA loaded PPHA films were investigated at their corresponding lamda max values. In FIG. 14, the optical path length decreases with higher loadings of DMBA within PPHA films. The DMBA film with a loading of 0.52 pphr reaches <1% transmittance at a relatively small thickness of 35 microns. PPHA films loaded with 5.71 pphr DMBA had less than 1% transmittance of 4 microns. In FIG. 15, the optical path length at the lowest concentration of 0.21 pphr with Anthracene (molar equivalent to 0.51 pphr DMBA) reaches <1% transmittance at thicknesses above 214 microns. Sensitizers with lower molar absorptivity values will have longer optical path lengths.

The sensitizers absorbance characteristics will likely change after electron-transfer as the compound becomes a cation radical as shown in Scheme 3. The optical path length should not be a significant hinderence to the sensitization of thick films if the absorption bands decrease significantly in the wavelengths of interest. The photo-bleaching of sensitizers has been investigated with ultraviolet light spectroscopy (UV-vis) in FIG. 6. A film of PPC with 3 pphr PAG and BPET was exposed to 560 nm of light with an intensity of 1.03 mW/cm$^2$. Changes in BPET's characteristic absorbance peaks are monitored with time of exposure as shown in FIG. 16.

Figure 16:
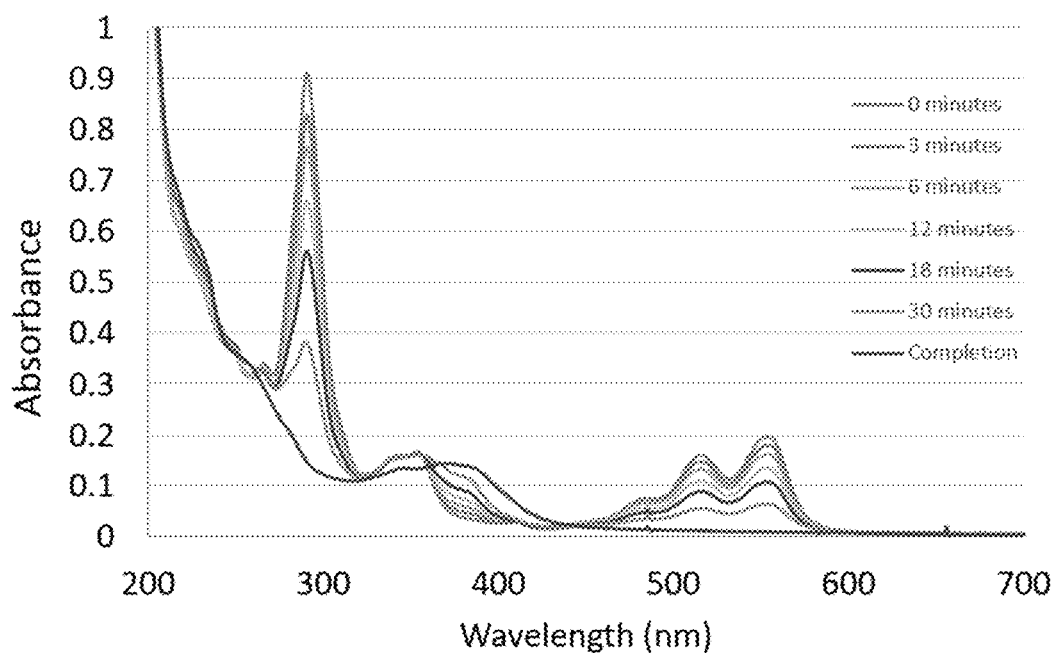
FIG. 16 is a plot of UV-vis of PPC film with 3 pphr PAG and BPET exposed to 560 nm light at various time increments.

In FIG. 16, BPET shows its characteristic lamda-max peaks at 517 and 556 nm. The absorbance of the BPET's characteristic lamda-max peaks drastically decreases with sunlight exposure time until the absorbance is nearly zero. Experiment was repeated with DMBA and the results are similar. This result suggests that the electron-transfer process from BPET to PAG is irreversible and the sensitizers are categorically consumed, which agrees with Scheme 3 eq. 3 and eq. 4. BPET is transformed into cation radicals that can decay and react in a number of ways. The extension of the chomophoric system of BPET is due to the connected pi conjugated orbitals. Formation of the radical disrupts the pi-conjugated network which decreases the absorbance edge to the rising 400 nm peak. Faster depolymerization rates can be achieved with higher loadings of sensitizer and photocatalysts but can drastically reduce the optical path length of the sensitizer loaded films as shown in FIGS. 13 and 14. Photo-bleaching is a highly desired effect as the strong absorption bands of the sensitizer decrease after electron-transfer which ensures photolysis can reach through thicker films.

Side Reactions in Sensitized Poly(phthalaldehyde) Films

Undesired side reactions with the sensitizer cation radical can potentially cause significant residue during the acid-catalyzed depolymerization of PPHA films in ambient conditions. The decomposition mechanism of these polymers is a two-step process: (i) the polymer depolymerizes by going back to the monomers which were used to create the polymer, and (ii) the small molecule products from the first step evaporate. At higher temperatures, the first step is generally rate limiting since evaporation is rapid. However, at low temperatures the second step, evaporation of the monomer is the rate limiting step. Acid-induced depolymerization of polyaldehyde films with photosensitizer and FABA-PAG at ambient temperatures have a higher chance for side reactions with sensitizer by-products as the monomer remains for several hours.

Figure 17:
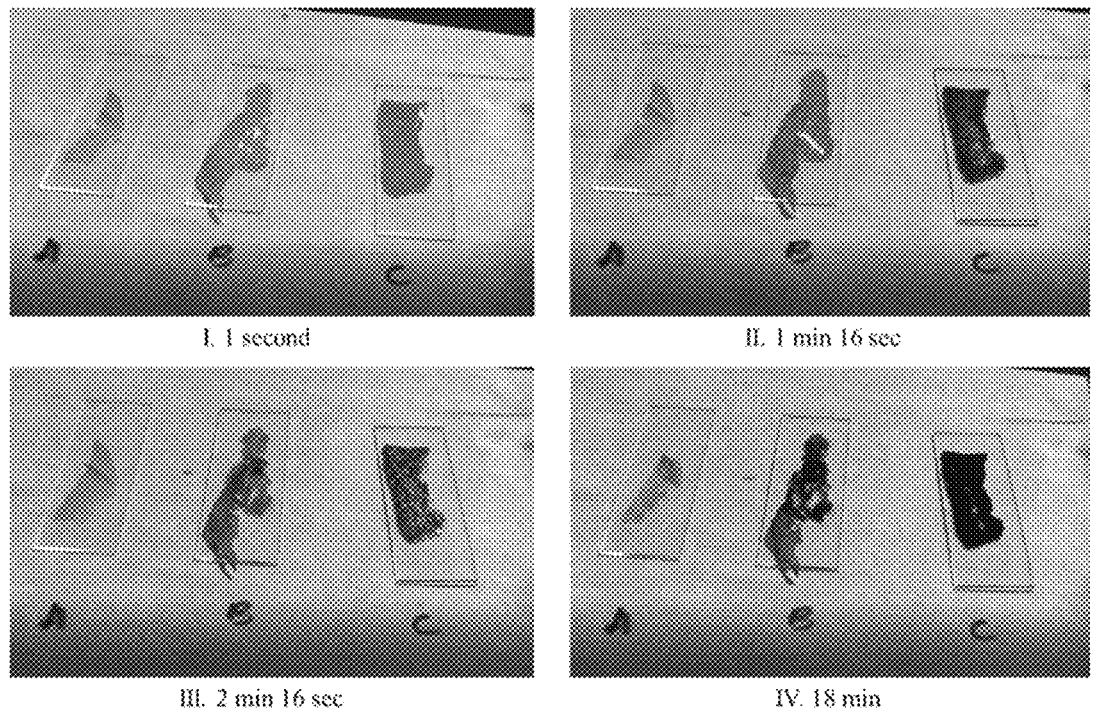
FIG. 17 contains photographs of sunlight-induced depolymerization of PPHA films with FABA-PAG and DMBA over glass substrate. Side reactions evident with high catalyst loadings.

Films of PPHA with various pphr loadings of PAG and DMBA were formulated and casted onto glass substrates as shown in FIG. 17. The full sunlight intensity recorded was 1,034 W/m$^2$. The films were exposed to natural sunlight at 12 PM in Atlanta, Ga.

In FIG. 17, there are 3 PPHA films labeled A, B, and C that contain 1, 3, 10 pphr PAG with DMBA maintaining a 1.2:1 photosensitizer to PAG ratio, respectively. Sample C begins to show liquification and very dark discoloration within less than 10 seconds after exposure to sunlight. After 1 minute, Sample B begins to show liquification and some discoloration after 1 minute. Sample A begins to show liquification and little discoloration after 2 minutes and 30 seconds. All loadings of film eventually depolymerized into a liquid monomer and subsequently sublimated. It is evident that as the loading of the PAG increases in the films, there is rampant side-reactions that appears to occur with the formation of the black, nonvolatile residue.

The cation-radical of the photosensitizer can decay in a number of ways as shown in Scheme 4. The sensitizer radical can react with the radical products of the iodonium salt, create dimers by reacting with other photosensitizer cation radicals, or directly react with monomer phthalaldehyde units post-depolymerization. As the concentration of the PAG and sensitizer increases within the polymer film, these side reactions became more prevalent as seen in the most concentrated film of 10 pphr PAG. The cation-radical of the photosensitizer could have potentially reacted with by-products of the iodonium salt and the phthaladehyde monomer units extending the chomophoric system to give the black colored residue. Reaction with monomer units is undesired as the vapor pressure of the monomer will likely drastically decrease and induce crystallization of the monomer. Mitigation of the side reaction can be controlled with lower loadings of the PAG and sensitizer.

Scheme 4: Competing Side Reactions of Sensitizer Cation Radical.

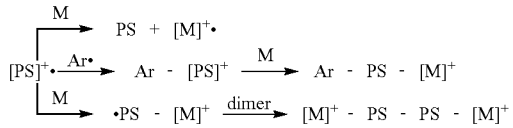

Figure 18:
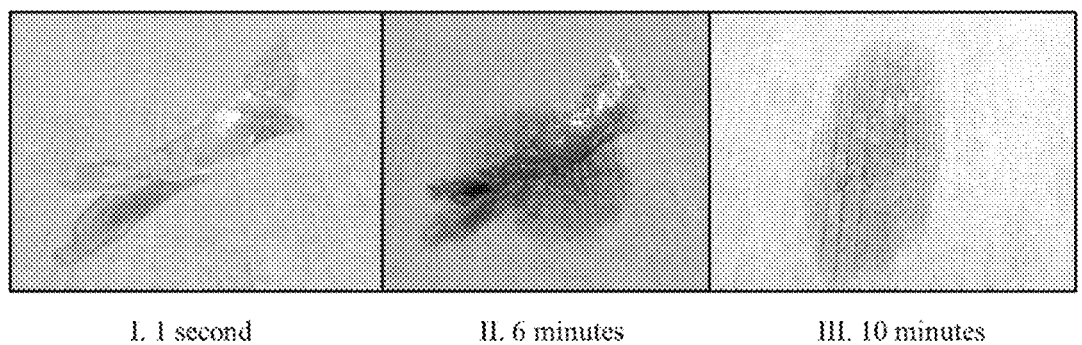
FIG. 18 contains photographs of sunlight-induced depolymerization of 1.5 pphr PAG and DMBA over tex-wipe.

Formulations of 1.5 pphr PAG with DMBA (1.2:1 PS to PAG ratio) were casted and placed onto a tex-wipe as seen in FIG. 18. The sunlight intensity of an overcast day recorded a reading of 560 W/m². FIG. 18 shows the depolymerization of the PPHA film after 6 minutes. The monomer absorbs into the surrounding environment where the evaporation of the phthalaldehyde will require days.

Crosslinking Reaction

PHA-4PE was prepared as described above for PHA-BA. Irgacure 379 was added to the PHA-4PE copolymer solution. A film was cast by spreading the copolymer/Irgacure solution with a doctor blade and allowing the solvent to evaporate. Irgacure can be used to generate a free radical by heating to modest temperatures, such as 40° C. to 60° C., or by exposure to ultraviolet radiation. The copolymer/Irgacure film was heated to 40-50° C. and irradiated with ultraviolet radiation. The free radical created by Irgacure can react with the carbon-carbon double bond creating a carbon radical. The carbon radical can further react with a neighboring carbon-carbon double bond, followed by the addition of the neighboring 4PE side group to the first 4PE side group, as shown in Scheme 1 above. In this way, the new covalent bonds are formed between monomer units and polymer chains. It was observed that the crosslinked PHA-4PE copolymer with Irgacure was slightly yellow colored and was significantly tougher than the starting polymer. $^1$H NMR analysis showed a loss of signal corresponding to the alkene protons in the polymer after crosslinking. The amount of crosslinking can be controlled by incorporating different amounts of 4PE into the p(PHA-4PE) copolymer. In addition, 4PE or other monomers containing unsaturated carbon bonds can be copolymerized with two other aldehydes making terpolymers. More than three monomers can be polymerized to further refine the properties of the polymer.

In another example, p(PHA-4PE) was crosslinked with thiol-ene chemistry using a multifunctional thiol additive, pentaerythritol tetrakis(3-mercaptopropionate), using an amine catalyst. The polymer obtained from the reaction was no longer soluble in tetrahydrofuran solvent due to the molecular weight becoming so large from chemical crosslinks.

Freezing Point Depression

The effect of various additives and monomers on freezing point depression of phthalaldehyde was studied. PHA monomer alone has a freezing point of 33.51° C. An amount of 20.3 mol % butanal comonomer depressed the freezing point of PHA to 24.7° C. An amount of 24.3 mol % of pentanal comonomer depressed the freezing point of PHA to 19.88° C. An amount of 20 wt % poly(ethylene glycol) bis(2-ethylhexanoate) (PEO) depressed the freezing point of PHA to 21.6° C. An amount of 3 wt % of Rhodorsil Faba (a photo-acid generator) and 0.63 wt % anthracene (a sensitizer) depressed freezing point of PHA to 16° C. The combination of 3 wt % of Rhodorsil Faba, 0.63 wt % anthracene, and 20 wt % PEO depressed the freezing point of PHA to 8° C.

Further, it was found that the combination of 2:1 weight ratio of PPHA:poly(PHA-co-Butanal) (poly(PHA-co-BA), which contains 10 mol % incorporation of butanal) with 15 wt % PEO, 3 wt % Rhodorsil Faba, 0.63 wt % anthracene, and 15 wt % butyltrimethylammonium bis(trifluromethylsulfonyl)imide was depolymerized with freezing point below –50° C. Table 5 summarizes the freezing point test of above mentioned combination of additives.

TABLE 5

| Additive combination | Freezing point (° C.) |
|---|---|
| PHA | 33.51 |
| PHA + 20.3 mol % butanal | 24.7 |
| PHA + 24.3 mol % pentanal | 19.88 |
| PHA + 20 wt % PEO | 21.6 |
| PHA + 3 wt % Rhodorsil Faba + 0.63 wt % anthracene | 16 |
| PHA + 3 wt % Rhodorsil Faba + 0.63 wt % anthracene + 20 wt % PEO | 8 |
| 2:1 weight ratio of PPHA:poly(PHA-co-BA) + 3% wt % Rhodorsil Faba + 0.63 wt % anthracene + 15 wt % PEO + 15 wt % butyltrimethylammonium bis(trifluromethylsulfonyl) | <–50 |

Qualitative tests on different combinations of additives with PPHA alone are also described here. For samples with 1.2:1 molar ratio of anthracene to Rhodorsil Faba, 15 wt % PEO, 15 wt % butyltrimethylammonium bis(trifluromethylsulfonyl)imide, the depolymerized film stayed as liquid in –85° C. deep freezer for formulations containing 1 wt %, 3 wt % and 5 wt % of Rhodorsil Faba. The depolymerized film stayed as liquid for 10 minute for sample containing 10 wt % of Rhodorsil Faba in –7° C. freezer. For samples with 1.2:1 molar ratio of 1,8-dimethoxy-9,10-bis(phenylethynyl) anthracene (DMBA) to Rhodorsil Faba, 15 wt % PEO, 15 wt % butyltrimethylammonium bis(trifluromethylsulfonyl)imide, the depolymerized film stayed as liquid for 10 minutes for sample containing 1 wt % and 3 wt % Rhodorsil Faba in –7° C. freezer. The depolymerized film containing 5 wt % and 10 wt % Rhodorsil Faba stayed as liquid for 10 minutes in 4° C. fridge. Table 6 summarizes the qualitative description of films stressed at different temperatures.

TABLE 6

| Samples* | 4° C. | –7° C. | –85° C. |
|---|---|---|---|
| PPHA + 1 wt % Rhodorsil Faba + 0.21 wt % anthracene | Liquid | Liquid | Liquid for at least 15 minutes |
| PPHA + 3 wt % Rhodorsil Faba + 0.63 wt % anthracene | Liquid | Liquid | Liquid for at least 15 minutes |
| PPHA + 5 wt % Rhodorsil Faba + 1.05 wt % anthracene | Liquid | Liquid | Liquid for at least 15 minutes |
| PPHA + 10 wt % Rhodorsil Faba + 2.1 wt % anthracene | Liquid | Liquid for 10 minutes | Crystallize |
| PPHA + 1 wt % Rhodorsil Faba + 0.21 wt % DMBA | Liquid | Liquid for 10 minutes | Crystallize |
| PPHA + 3 wt % Rhodorsil Faba + 0.63 wt % DMBA | Liquid | Liquid for 10 minutes | Crystallize |

TABLE 6-continued

| Samples* | 4° C. | −7° C. | −85° C. |
|---|---|---|---|
| PPHA + 5 wt % Rhodorsil Faba + 1.05 wt % DMBA | Liquid for 10 minutes | Crystallize | Crystallize |
| PPHA + 10 wt % Rhodorsil Faba + 2.1 wt % DMBA | Liquid for 10 minutes | Crystallize | Crystallize |

*Note all samples contain 15 wt % PEO and 15 wt % butyltrimethylammonium bis(trifluromethylsulfonyl)

Another example of depolymerized film is described using a different ionic liquid, triethylsulfonium bis(trifluoromethylsulfonyl)imide. A film containing 2:1 weight ratio of poly(phthalaldehyde):poly(90.26% PHA-co-9.74% BA), 10 wt % PEO, 50 wt % triethylsulfonium bis(trifluoromethylsulfonyl)imide, 10 wt % Rhodorsil Faba, 2.1 wt % anthracene was depolymerized with freezing point below −50° C., as measured by differential scanning calorimetry. The liquid was stored in the freezer at −7° C. for more than three hours without freezing.

Delayed Photoresponse

An example of an organic additive that delays the photoresponse is NMP. FIG. 1 shows the effect of amount of NMP on photo-response of PPHA depolymerization. Loadings of NMP tested include 0 wt % NMP, 0.1 wt % NMP and 1 wt % NMP in 15% wt PPHA solution dissolved in THF. All sample solutions contain 3 wt % of Rhodorsil Faba and 0.63 wt % of Anthracene. Films were exposed under 365 nm UV exposure tool. 0 wt % NMP in PPHA film took 8 minutes to liquefy. 0.1 wt % NMP in PPHA film took 12 minutes to liquefy. 1 wt % NMP in PPHA film took 30 minutes to liquefy. While not being held to a particular theory, it is hypothesized that NMP, a tertiary amine, reacts with the photo-generated proton from the photoacid generator in an acid-base reaction creating a quaternary ammonium cation. The catalytic properties of the quaternary ammonium form of NMP for depolymerizing the poly(aldehyde) is slower than that of the original photoacid created from this photoacid generator. Thus the photo speed of the poly(aldehyde) films decreases with the increasing loadings of NMP.

Another example of an additive that delays the photoresponse is an imidazolium ionic liquid, 1-methyl-3-octylimidazolium tetrafluoroborate. Two films both containing PPHA only, 10 wt % PEO, 5 wt % Rhodorsil Faba, 1.05 wt % anthracene were casted. One film contained 30 wt % butyltrimethylammonium bis(trifluoromethylsulfonyl)imide, while the other contained 30 wt % 1-methyl-3-octylimidazolium tetrafluoroborate. Both films were exposed under sunlight with intensity of 1153 W/m$^2$ at 55° F. It took 6.8 minutes for the butyltrimethylammonium bis(trifluoromethylsulfonyl)imide containing film to start liquefying, while it took 13.5 minutes for the 1-methyl-3-ocitylimidazolium tetrafluoroborate containing film to start liquefying.

Enhancement of Mechanical Properties

The additives used to depress the freezing point of phthalaldehyde also have the additional ability to impart flexibility and/or toughness to polyaldehydes films for use as structural materials for a variety of applications.

Examples of mechanical property of films casted in THF and air-dried are described. A film containing PPHA and 10 wt % PEO has a modulus of 0.374 GPa. The elongation to break is 22.5%. Another film containing PPHA, 10 wt % glass fiber, and 10 wt % PEO has a modulus of 0.438 GPa. The elongation to break is 16.4%.

Example of PEO amount effect on mechanical property of films are also described. Three films were made containing PPHA and 0 wt %, 5.77 wt %, 9.85 wt %, and 15.08 wt % PEO respectively. The modulus were 2.100 GPa, 1.777 GPa, 1.398 GPa, and 0.540 GPa respectively. The elongation to break were 0.40%, 0.80%, 1.40% and 4.25% respectively.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A copolymer, comprising: a repeating unit as shown in Formula I:

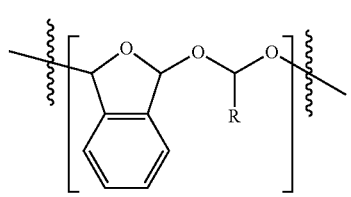

Formula I wherein R is substituted or unsubstituted $C_1$-$C_{20}$ alkyl, $C_1$-$C_{20}$ alkoxyl, $C_2$-$C_{20}$ alkenyl, $C_2$-$C_{20}$ alkynyl, $C_6$-$C_{10}$ heteroaryl, $C_3$-$C_{10}$ cycloalkyl, $C_3$-$C_{10}$ cycloalkenyl, $C_3$-$C_{10}$ heterocycloalkyl, or $C_3$-$C_{10}$ heterocycloalkenyl; and, when substituted, R is substituted with $C_1$-$C_{20}$ alkyl, $C_1$-$C_{20}$ alkoxy, $C_2$-$C_{20}$ alkenyl, $C_2$-$C_{20}$ alkynyl, $C_6$-$C_{10}$ aryl, $C_6$-$C_{10}$ heteroaryl, aldehyde, amino, sulfonic acid, sulfinic acid, fluoroacid, phosphonic acid, ether, halide, hydroxy, ketone, nitro, cyano, azido, silyl, sulfonyl, sulfinyl, or thiol.

2. The copolymer of claim 1, wherein the copolymer is linear or branched.

3. The copolymer of claim 1, wherein the copolymer is cyclic and has Formula II:

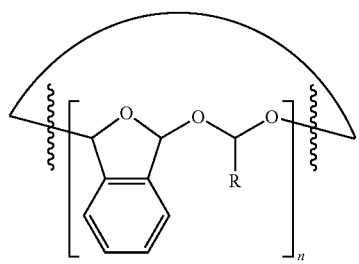

Formula II wherein n is an integer from 1 to 100,000;

and is a backbone of the copolymer and comprises any one or any combination of the following repeating units:

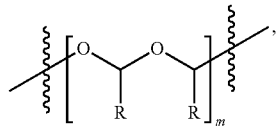

-continued

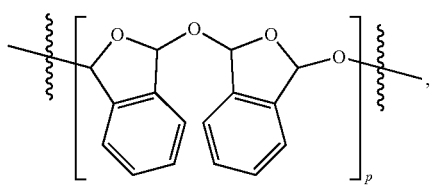

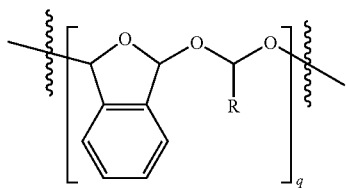

where m is an integer from 1 to 100,000; p is an integer from 1 to 100,000; and q is an integer from 1 to 100,000.

4. The copolymer of claim 1, wherein the copolymer is cyclic and has Formula III:

Formula III

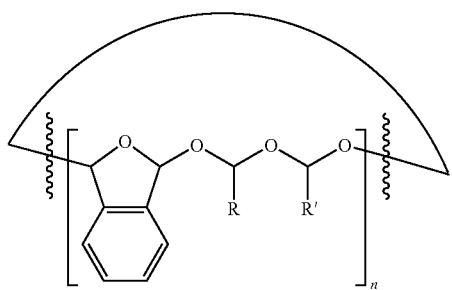

wherein R and R' are different; and R' is chosen from substituted or unsubstituted $C_1$-$C_{20}$ alkyl, $C_1$-$C_{20}$ alkoxyl, $C_2$-$C_{20}$ alkenyl, $C_2$-$C_{20}$ alkynyl, $C_6$-$C_{10}$ aryl, $C_6$-$C_{10}$ heteroaryl, $C_3$-$C_{10}$ cycloalkyl, $C_3$-$C_{10}$ cycloalkenyl, $C_3$-$C_{10}$ heterocycloalkyl, or $C_3$-$C_{10}$ heterocycloalkenyl; and, when substituted, R' can be substituted with $C_1$-$C_{20}$ alkyl, $C_1$-$C_{20}$ alkoxy, $C_2$-$C_{20}$ alkenyl, $C_2$-$C_{20}$ alkynyl, $C_6$-$C_{10}$ aryl, $C_6$-$C_{10}$ heteroaryl, aldehyde, amino, carboxylic acid, sulfonic acid, sulfinic acid, fluoroacid, phosphonic acid, ester, ether, halide, hydroxy, ketone, nitro, cyano, azido, silyl, sulfonyl, sulfinyl, or thiol; and

is a backbone of the copolymer and comprises any one or any combination of the following repeating units:

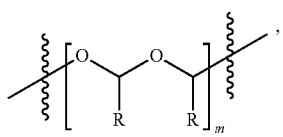

-continued

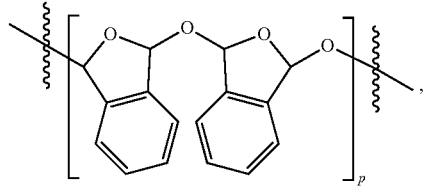

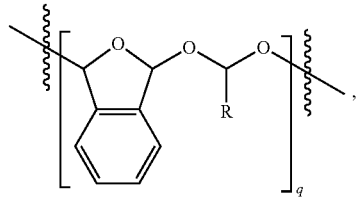

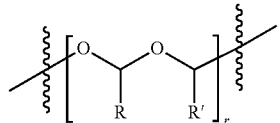

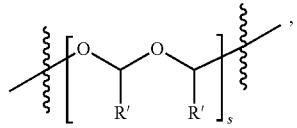

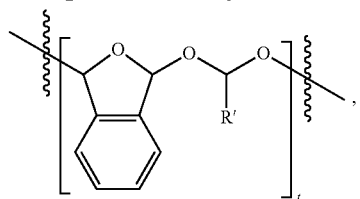

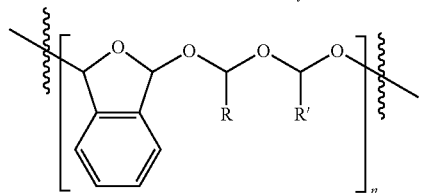

wherein m is an integer from 1 to 100,000; p is an integer from 1 to 100,000; q is an integer from 1 to 100,000; r is an integer from 1 to 100,000; s is an integer from 1 to 100,000; and t is an integer from 1 to 100,000.

5. The copolymer of claim 1, wherein R is $C_1$-$C_{10}$ alkyl, $C_2$-$C_{10}$ alkenyl, or $C_2$-$C_{10}$ alkynyl, or cycloalkenyl, or heterocycloalkenyl.

6. The copolymer of claim 1, wherein R is an unsubstituted $C_2$-$C_{20}$ alkenyl, unsubstituted $C_2$-$C_{20}$ alkynyl, unsubstituted, cycloalkenyl, unsubstituted heterocycloalkenyl, $C_6$-$C_{10}$ heteroaryl; or R is $C_1$-$C_{20}$ alkyl, $C_3$-$C_{10}$ cycloalkyl, or $C_3$-$C_{10}$ heterocycloalkyl substituted with amino, sulfonic acid, sulfinic acid, fluoroacid, phosphonic acid, ester, halide, hydroxyl, ketone, nitro, cyano, azido, thiol, sulfonic acid, or fluoroacid.

7. The copolymer of claim 1, wherein the copolymer is a copolymer of phthalaldehyde monomers and one or more of acetaldehyde, propanal, butanal, pentanal, hexanal, heptanal, octanal, nonanal, decanal, undecanal, propenal, butenal, pentenal, hexenal, heptenal, octenal, nonenal, decenal, and undecenal.

8. The copolymer of claim 1, wherein the copolymer has a ratio of phthalaldehyde units to other aldehyde units of from about 1:50 to about 50:1.

9. The copolymer of claim 1, wherein the copolymer has from 30 mol % to 99 mol % phthalaldehyde units based on the total monomer content.

10. The copolymer of claim 1, wherein the copolymer has from 90 mol % to 99 mol % phthalaldehyde units based on the total monomer content.

11. The copolymer of claim 1, wherein the copolymer has a molecular weight of from 2,000 g/mol to 80,000 g/mol.

12. The copolymer of claim 1, wherein the copolymer has a ceiling temperature of ambient temperature to −50° C.

13. A composition, comprising: the copolymer of claim 1.

14. A composition, comprising: the cyclic copolymer of claim 2.

15. The composition of claim 13, further comprising a photocatalyst.

16. The composition of claim 15, wherein the photocatalyst is a diaryliodonium salt, a triarylsulfonium salt, tetraphenylborate salt, an onium salt or sulfonium salt having perfluorinated anions, a bissulfonyldiazomethane compound, an N-sulfonyloxydicarboximide compound, an O-arylsulfonyloxime compound, tetrakis-(pentafluorophenyl) borate-4-methylphenyl[4-(1-methylethyl)phenyl]iodonium (Rhodorsil-FABA), tris(4-tert-butylphenyl)sulfonium tetrakis-(pentafluorophenyl) borate (TTBPS-FABA), triphenylsulfonium tetrakis-(pentafluorophenyl) borate (TPS-FABA), bis(4-tert-butylphenyl)iodonium triflate (BTBPI-TF), tert-(butoxycarbonylmethoxynaphthyl)-diphenylsulfonium triflate (TBOMDS-TF), N-hydroxynaphthalimide triflate (NHN-TF), diphenyliodonium perfluoro-1-butanesulfonate (DPI-NF), tris(4-tert-butylphenyl)sulfonium perfluoro-1-butanesulfonate (TTBPS-NF), N-hydroxynaphthalimide perfluoro-1-butanesulfonate (NHN-NF), N-hydroxy-5-norbornene-2,3-dicarboximide perfluoro-1-butanesulfonate (NHNDC-NF), bis(4-tert-butylphenyl)iodonium tris(perfluoromethanesulfonyl) methide, (BTBPI-TMM), bis(4-tert-butylphenyl)iodonium bis(perfluorobutanesulfonyl) imide (BTBPI-BBI), diphenyliodonium 9,10-dimethoxyanthracene-2-sulfonate (DPI-DMOS), bis(4-tert-butylphenyl) iodonium p-toluenesulfonate (BTBPI-PTS), (1Z,1'Z)-1,1'-((ethane-1,2-diylbis(oxy))bis(4,1-phenylene))bis(2,2,2-trifluoroethan-1-one) O,O-dipropylsulfonyl dioxime, bis(4-tert-butylphenyl)iodonium perfluoro-1-octanesulfonate (BTBPI-HDF), or any combination thereof.

17. The composition of claim 13, further comprising a thermocatalyst.

18. The composition of claim 13, further comprising a photosensitizer.

19. The composition of claim 18, wherein the photosensitizer is a modified acene.

20. The composition of claim 18, wherein the photosensitizer is anthracene, 1,8-dimethoxy-9,10-bis(phenylethynyl)anthracene (DMBA), 6,13-bis(3,4,5-trimethoxyphenylethynyl)pentacene (BTMP), 5,12-bis(phenylethynyl) tetracene (BPET), 1-Chloro-4-propoxythioxanthone (CPTX), 4-methylphenyl[4-(1-methylethyl) phenyl] tetrakis (pentafluorophenyl) borate (FABA-PAG), 1,5,7 triaza-bicyclo [4.4.0] dec-5-ene tetraphenylborate (TBD-PBG), or any combination thereof.

21. The composition of claim 13, further comprising a freezing point depressing agent.

22. The composition of claim 21, wherein the freezing point depressing agent is an adipate, azelate, citrate, ether-ester, glutarate, isobutyrate, phosphate, sebacate, tertiary amine, quaternary ammonium compound, diethylene glycol dibenzoate, dipropylene glycol dibenzoate, tripropylene glycol dibenzoate, butyl benzyl phthalate, phosphonium compound, sulfonium compound, or any combination thereof.

23. The composition of claim 13, further comprising a plasticizer.

24. The composition of claim 13, further comprising an ionic liquid.

25. The composition of claim 24, wherein the ionic liquid has a cation selected from imidazolium, alkyl-imidazole, alkyl-ammonium, alkyl-sulfonium, alkyl-piperidinium, alkyl-pyridinium, alkyl-phosphonium, and alkyl-pyrrolidinium, and an anion selected from carboxylate, halide, fulminate, azide, persulfate, sulfate, sulfites, phosphates, phosphites, nitrate, nitrites, hypochlorite, chlorite, bicarbonates, and perfluoroborates.

26. The composition of claim 13, further comprising a tertiary amine, solvents with lone pair electrons, tertiary phosphine, imidazole, quaternary ammonium ionic liquid, phosphonium ionic liquid, imidazolium ionic liquid, or sulfonium ionic liquid, or any combination thereof.

27. The composition of claim 13, further comprising n-methyl-2-pyrrolidone (NMP), dimethylformamide (DMF), or a combination thereof.

28. The composition of claim 13, further comprising a chemical amplifier.

29. The composition of claim 28, wherein the chemical amplifier is an acid amplifier.

30. The composition of claim 28, wherein the acid amplifier has Formula IV:

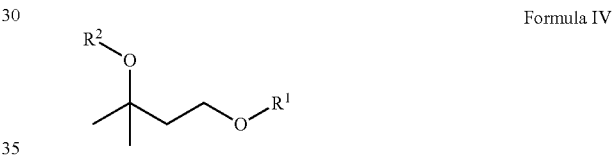

Formula IV where $R^1$ is a sulfonic ester, flouro ester, or carbonic ester; and $R^2$ is a trigger moiety that comprises hydroxyl, methoxy, acetate, carbonic ester, sulfonic ester, or flouro ester groups.

31. The composition of claim 13, wherein the composition has a plurality of layers or regions, and one of the layers or regions comprises a photocatalyst and another of the layers or regions does not comprise a photocatalyst.

32. The composition of claim 31, wherein one or more of the layers or regions comprises a photosensitizer.

33. The composition of claim 31, wherein one of the layers or regions comprises a photocatalyst and different layer or region comprises a chemical amplifier.

34. The composition of claim 31, wherein one of the layers or regions comprises a photocatalyst and a photosensitizer and another layer or region comprises a chemical amplifier.

35. The composition of claim 13, further comprising a crosslinking agent.

36. The composition of claim 35, wherein the crosslinking agent comprises a dienophile or electrophilic group.

37. The composition of claim 13, further comprising a crosslinking catalyst.

38. The composition of claim 13, further comprising a free radical initiator.

39. A method of preparing a copolymer, comprising: contacting phthalaldehyde and one or more different aldehydes in the presence of a solvent and a Lewis acid catalyst, wherein the copolymer comprises a repeating unit as shown in Formula I:

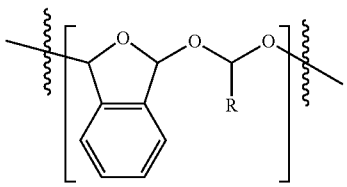

Formula I wherein R is substituted or unsubstituted $C_1$-$C_{20}$ alkyl, $C_1$-$C_{20}$ alkoxyl, $C_2$-$C_{20}$ alkenyl, $C_2$-$C_{20}$ alkynyl, $C_6$-$C_{10}$ heteroaryl, $C_3$-$C_{10}$ cycloalkyl, $C_3$-$C_{10}$ cycloalkenyl, $C_3$-$C_{10}$ heterocycloalkyl, or $C_3$-$C_{10}$ heterocycloalkenyl; and, when substituted, R is substituted with $C_1$-$C_{20}$ alkyl, $C_1$-$C_{20}$ alkoxy, $C_2$-$C_{20}$ alkenyl, $C_2$-$C_{20}$ alkynyl, $C_6$-$C_{10}$ aryl, $C_6$-$C_{10}$ heteroaryl, aldehyde, amino, sulfonic acid, sulfinic acid, fluoroacid, phosphonic acid, ether, halide, hydroxy, ketone, nitro, cyano, azido, silyl, sulfonyl, sulfinyl, or thiol.

40. The method of claim 39, wherein the solvent is $CH_2Cl_2$, toluene, or $CHCl_3$.

41. The method of claim 39, wherein the Lewis acid catalyst is $BF_3$-etherate, $GaCl_3$, $TiCl_4$, $TiF_4$, or $FeCl_3$.

42. The method of claim 39, wherein the one or more of said different aldehydes are chosen from acetaldehyde, propanal, butanal, pentanal, hexanal, heptanal, octanal, nonanal, decanal, undecanal, propenal, butenal, pentenal, hexenal, heptenal, octenal, nonenal, decenal, undecenal, and any combination thereof.

43. The method of claim 39, wherein phthalaldehyde is contacted with a $C_2$-$C_{20}$ alkenyl, cycloalkenyl, or heterocycloalkenyl.

44. The method of claim 39, further comprising contacting the copolymer with a crosslinking catalyst and crosslinking the copolymer.

45. The method of claim 39, further comprising contacting the copolymer with a free radical initiator and crosslinking the copolymer.

46. The method of claim 39, further comprising contacting the copolymer with a crosslinking agent, wherein the crosslinking agent comprises a dienophile or electrophilic group.

* * * * *